(12) United States Patent
Suzuki et al.

(10) Patent No.: US 7,098,433 B2
(45) Date of Patent: Aug. 29, 2006

(54) APPARATUS AND METHOD FOR ESTIMATING AND ADJUSTING DEVIATIONS IN AN OPTICAL SYSTEM BASED ON WAVEFRONT ABERRATIONS ASCRIBABLE TO MISALIGNMENT

(75) Inventors: Jiro Suzuki, Tokyo (JP); Toshiyuki Ando, Tokyo (JP); Hiroshi Suzuki, Tokyo (JP); Shusou Wadaka, Tokyo (JP); Yoshihito Hirano, Tokyo (JP); Izumi Mikami, Tokyo (JP); Tadashi Matsushita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 305 days.

(21) Appl. No.: 10/415,936

(22) PCT Filed: Jan. 17, 2002

(86) PCT No.: PCT/JP02/00284

§ 371 (c)(1),
(2), (4) Date: May 5, 2003

(87) PCT Pub. No.: WO03/025537

PCT Pub. Date: Mar. 27, 2003

(65) Prior Publication Data

US 2004/0027566 A1    Feb. 12, 2004

(30) Foreign Application Priority Data

Sep. 18, 2001    (JP)    .............................. 2001-283674

(51) Int. Cl.
*G01J 1/20*    (2006.01)
(52) U.S. Cl. .................................. 250/201.9; 359/399
(58) Field of Classification Search ............. 250/201.9; 359/399
See application file for complete search history.

(56) References Cited

U.S. PATENT DOCUMENTS 6,158,694 A * 12/2000 Gowrinathan ................ 244/171

FOREIGN PATENT DOCUMENTS

| JP | 2-312304 A | 12/1990 |
|----|------------|---------|
| JP | 5-296879   | 11/1993 |
| JP | 5-296879 A | 11/1993 |

(Continued)

OTHER PUBLICATIONS

Bhatia et al., "Using the Shack-Hartmann system for a complete analysis of optical telescopes", Nov. 1997, Proceeding of SPIE, vol. 3134 Optical Manufacturing and Testing II, pp. 167-176.*

(Continued)

*Primary Examiner*—Thanh X. Luu
(74) *Attorney, Agent, or Firm*—Birch, Stewart, Kolasch & Birch, LLP

(57) ABSTRACT

An optical system deviation estimating apparatus includes an erected/inverted attitude setting means 9 for changing dispositional attitude of an optical system under test, a non-interferometric type wavefront measuring means 10 for measuring wavefronts at the attitudes as set up without resorting to interference phenomenon of light, a polynomial approximation means 15 for expanding measured wavefront values determined by the non-interferometric type wavefront measuring means 10 to a polynomial, an averaging arithmetic means 11 for averaging the measured values derived from output of the non-interferometric type wavefront measuring means 10 or alternatively arithmetic values derived from output of the polynomial approximation means 15, and a polynomial specific coefficient extraction arithmetic means 16 for extracting specific coefficient values of the polynomial.

18 Claims, 31 Drawing Sheets

FOREIGN PATENT DOCUMENTS

| | | |
|---|---|---|
| JP | 5-323213 A | 12/1993 |
| JP | 8-86689 A | 4/1996 |
| JP | 8-166209 A | 6/1996 |
| JP | 9-280841 A | 10/1997 |
| JP | 9-281315 A | 10/1997 |

OTHER PUBLICATIONS

Suzuki, Jiro, et al. Optics Japan 2001, p. 159, Nov. 5-7, 2001.

Ando, Toshiyuki, et al. Optics Japan 2001, p. 161, Nov. 5-7, 2001.

* cited by examiner

72 : OPTICAL FIBER CONNECTOR HOLDING FIXTURE

73 : COLLIMATE LENS HOLDING FIXTURE

75 : MICROMETER (MOVING MECHANASM, MOVING MEANS)

76 : FIXING SCREW (RELATIVE POSITION FIXING MEANS)

WAVEFRONT ERROR MAP OF Ck1
(CONTOUR DIAGRAM)

WAVEFRONT ERROR MAP OF Ck2
(CONTOUR DIAGRAM)

ESTIMATE ASSEMBLING
ADJUSTMENT ERROR

FIG. 27

| COEFFICIENT | | | Polynomial |
|---|---|---|---|
| | n | m | |
| A | 0 | 0 | 1 |
| A | 1 | 1 | X |
| B | 1 | 1 | Y |
| A | 2 | 2 | X^2-Y^2 |
| A | 2 | 0 | -1+2*(X^2+Y^2) |
| B | 2 | 2 | 2*X*Y |
| A | 3 | 3 | X^3-3*X*Y^2 |
| A | 3 | 1 | X*(-2+3*(X^2+Y^2)) |
| B | 3 | 1 | Y*(-2+3*(X^2+Y^2)) |
| B | 3 | 3 | 3*X^2*Y-Y^3 |
| A | 4 | 4 | X^4-6*X^2*Y^2*Y^4 |
| A | 4 | 2 | -3*X^2+4*X^4+3*Y^2-4*Y^4 |
| A | 4 | 0 | 1-6*(X^2+Y^2)+6*(X^2+Y^2)^2 |
| B | 4 | 2 | 2*X*Y*(-3+4*(X^2+Y^2)) |
| B | 4 | 4 | 4*X*Y*(X^2+Y^2) |
| A | 5 | 5 | X^5-10*X^3*Y^2+5*X*Y^4 |
| A | 5 | 3 | X*(5*X^4+3*Y^2*(4-5*Y^2)-2*X^2*(2+5*Y^2)) |
| A | 5 | 1 | X*(3-12*(X^2+Y^2)+10*(X^2+Y^2)^2) |
| B | 5 | 1 | Y*(3-12*(X^2+Y^2)+10*(X^2+Y^2)^2) |
| B | 5 | 3 | Y*(15*X^4+4*Y^2-5*Y^4+2*(-6+5*Y^2)) |
| B | 5 | 5 | 5*X^4*Y-10*X^2*Y^3+Y^5 |
| A | 6 | 6 | X^6-15*X^4*Y^2+15*X^2*Y^4-Y^6 |
| A | 6 | 4 | 6*X^6-30*X^2*Y^2*(-1+Y^2)+Y^4(-5+6*Y^2)-5*X^4*(1+6*Y^2) |
| A | 6 | 2 | 15*X^6-6*Y^2+20*Y^4-15*Y^6+5*X^4*(-4+3*Y^2)+X^2*(6-15*Y^4) |
| A | 6 | 0 | -1+12*(X^2+Y^2)-30*(X^2+Y^2)^2+20*(X^2+Y^2)^3 |
| B | 6 | 2 | 2*X*Y*(6-20*(X^2+Y^2)+15*(X^2+Y^2)^2) |
| B | 6 | 4 | 4*X*Y*(-5*X^2+6*X^4+5*Y^2-6*Y^4) |
| B | 6 | 6 | 6*X^5*Y-20*X^3*Y^3+6*X*Y^5 |

FIG. 31
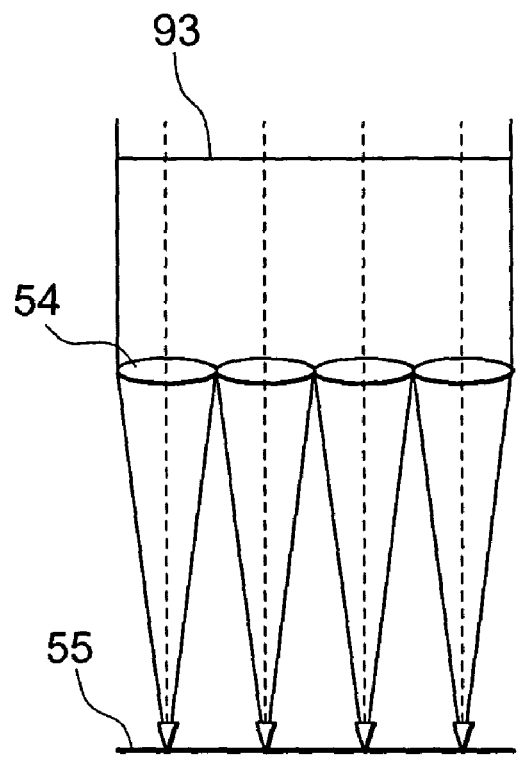
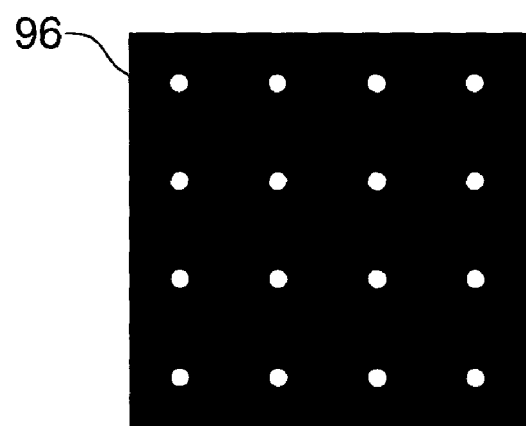
FOCUSED LIGHT SPOTS
FOR PLANE WAVE

FOCUSED LIGHT SPOTS FOR
WAVEFRONT CONTAINING
WAVEFRONT ERROR

APPARATUS AND METHOD FOR ESTIMATING AND ADJUSTING DEVIATIONS IN AN OPTICAL SYSTEM BASED ON WAVEFRONT ABERRATIONS ASCRIBABLE TO MISALIGNMENT

This application is the national phase under 35 U.S.C. § 371 of PCT International Application No. PCT/JP02/00284 which has an International filing date of Jan. 17, 2002, which designated the United States of America.

TECHNICAL FIELD

The present invention relates to an inspection apparatus, an axis adjusting apparatus, an inspection method and an axis adjusting method for an optical system such as a reflecting telescope and the like, and more particularly the invention is concerned with an optical system deviation estimating apparatus, an optical system deviation adjusting apparatus, an optical system deviation estimating method and an optical system deviation adjusting method which are capable of measuring only the wavefront error ascribable to misalignment or alignment deviation in the optical system destined for use in the zero-gravity environment and which are capable of carrying out such measurement on the earth without difficulty.

RELATED BACKGROUND

A large-scale high-precision optical system destined for use and operation in the outer space has to be assembled, adjusted and evaluated on the earth or ground before being located in the outer space. In general, for the adjustment of the high-precision optical system on the ground, image forming performance or capability of the optical system concerned is measured, whereon the optical system is adjusted on the basis of the data acquired through the measurement.

A method of inspecting the high-precision optical system such as a telescope is described comprehensively, for example, in an article titled "TESTS OF OPTICAL SYSTEMS, (1) METHOD BASED ON INTERFERENCE" contained in the literature "0 plus E", No. 143, pp. 109–113. According to this known method, a collimated light beam is caused to impinge onto an optical system under test, whereon wavefront error ascribable to aberrations occurring internally of the optical system under test is measured.

As the causes or factors for the wavefront error, there can be mentioned the following.
(1) Wavefront aberration ascribable to deviation in the optical disposition of optical elements or optics in the optical system under test (hereinafter referred to as the optical system deviation or optic deviation),
(2) wavefront aberration ascribable to polishing error of optical elements or optics incorporated in the optical system under test,
(3) wavefront aberration ascribable to fluctuation of the atmosphere,
(4) wavefront aberration ascribable to gravitational deformation of the optical elements incorporated in the optical system under test, and
(5) wavefront aberration ascribable to vibration of the optical system under test and the measuring apparatus.

Of the causes or factors for the wavefront error mentioned above, the wavefront aberration (2) of high order is suppressed to a possible minimum because the optical elements are ordinarily polished to the highest degree of precision.

However, the wavefront aberrations (3), (4) and (5) mentioned above make appearance because of the very measurement or test performed on the ground. Accordingly, in the case where the optic disposition is adjusted such that the measured value of the wavefront error becomes extremely small without compensating for the influences of the wavefront aberrations (3), (4) and (5), the optic deviation will take place in the optical system and the wavefront error will become remarkable as compared with the optical system which suffers no deviation, when the optical system is used or operated in the outer space.

Further, it is noted that a light source of low luminance such as e.g. an electric lamp has heretofore been employed as the light source in most of the practical applications. Consequently, image data have to be acquired by resorting to an extended-time exposure with the number of data reading times being correspondingly decreased, while minimizing the dark current of the image pickup device by cooling with a view to realizing the signal-to-noise ratio (SNR) demanded for the processing.

In general, the wavefront aberration ascribable to the fluctuation of the atmosphere is considered to vary or change temporally at random. Accordingly, the influence of the fluctuation of the atmosphere can certainly be mitigated by taking advantage of the time-integration effect which inherently accompanies the extended-time exposure. In that case, however, a lot of time is taken for each measurement, and it is difficult or impossible to analyze the time-based change rate and the period of change of the wavefront aberration ascribable to the fluctuation of the atmosphere within the time period set for the measurement.

For the reason mentioned above, optimization of the measurement environment for the fluctuation of the atmosphere on the basis of the measured data and reduction of the integration time in dependence on the measurement environment could not be realized. In particular, in the case where the non-interferometric type wavefront measuring apparatus is employed for the alignment adjustment, it is required to repeat the measurement and the adjustment at as high a rate as possible while optimizing the environment for the measurement.

On the other hand, when the source of low luminance (electric light bulb) is employed as the light source, a pin hole is used for collimating the light rays emitted from the source, and thus the light rays exiting the pin hole constitute the light source, as is known in the art. With this arrangement, the utilization efficiency of luminous energy of the light source is degraded, necessitating it to extend further the exposure time duration. Besides, it is necessary to install the light source in the main housing of the non-interferometric type wavefront measuring apparatus or in the close vicinity thereof, providing an obstacle for implementation of the main housing in small size and light weight. In addition, the influence of heat generation of the light source can not be neglected, because the wavefront aberrations are caused to change due to expansion and contraction of the main housing and the individual optical elements or optics and under application of stress, riving rise to a problem.

Furthermore, for effecting the extended-time exposure, the influence of the dark current in the image pickup device must be suppressed to a minimum. Such being the circumstances, the cooling arrangement is usually adopted particularly when the semiconductor image pickup device is employed.

However, incorporation of the cooling unit in the image pickup device will naturally result in increasing of size and weight of the main housing portion of the non-interferometric type wavefront measuring apparatus, providing an obstacle to the attempt for miniaturization of the non-interferometric type wavefront measuring apparatus. In order to cope with this problem, it is necessary to use the light source of high luminance and dispose it separately from the main housing of the non-interferometric type wavefront measuring apparatus.

By the way, in the field of the astronomical observation, there has arisen in recent years a demand for improvement of the image forming performance or image quality of the optical system. In reality, in conjunction with the reflecting telescope for the astronomical observation, efforts are being made for developing and realizing a reflecting mirror of large aperture and ideal geometrical precision with a view to making available the high-definition images of dark celestial bodies.

As a technical matter which exerts remarkable influence to the image forming performance or the image quality of the large-scale reflecting telescope such as mentioned above, there can be mentioned a so-called assembling adjustment error. More specifically, in order to ensure the prescribed image forming performance or image quality, it is necessary that deviation of relative positional relation between the reflecting mirrors falls within a predetermined range. Parenthetically, the deviation mentioned just above is referred to as the assembling adjustment error. By way of example, in the Gregory-type reflecting telescope disclosed in Tuneta-Saku's "Solar-B VISIBLE LIGHT TELESCOPE" contained in "KOKURITSU TENMONDAI NEWS (National Astronomical Observatory News)", No. 91, January 2001, the assembling adjustment error must not exceed 10 µm at the least in the arrangement in which a primary mirror having the aperture of 500 mm and a secondary mirror of a smaller size are disposed with a distance of 1500 mm therebetween. Such high degree of precision is of course difficult to realize with the assembling process which is not accompanied with adjustment. Accordingly, as a means for coping with this problem, there is adopted a method of inspecting the image forming performance of the reflecting telescope and then adjustment is so performed that the image forming performance of the reflecting telescope lies within a predetermined range.

As a method of visibly displaying the measured wavefront error, there are generally adopted a contour plotting method such as illustrated in FIG. 33 and a three-dimensional plotting method such as illustrated in FIG. 34.

Further, there is a method of displaying by plotting mode-based wavefront error components such as comma aberration, astigmatism, etc. by mathematically fitting the wavefront error to an appropriate function.

In this conjunction, it is noted that as the deviation of the relative positional relation between the primary mirror and the secondary mirror in the reflecting telescope from the design value thereof becomes greater, the plotted value of the wavefront error mentioned above become more remarkable. By repeating the assembling adjustment of the primary mirror and the secondary mirror as well as the inspection or test concerning the wavefront error described above, it is certainly possible to reduce the wavefront error to within the predetermined range.

For solving the problem mentioned above, it is required to eliminate the wavefront aberrations making appearance due to the measurement on the earth from the measured data to thereby extract only the wavefront error ascribable to the so-called optical system deviation or optic deviation and carry out the adjustment process until the wavefront error ascribable to the optic deviation becomes zero.

In particular, in the adjustment of the optic disposition with high accuracy, the wavefront error components ascribable to the factors or aberrations (3), (4) and (5) mentioned previously make appearance relatively remarkably. Thus, it is required that the wavefront measuring apparatus can ensure sufficiently large dynamic range and high measurement resolution.

Among the wavefront error factors, the aberrations (3) and (5) change temporally at random. Accordingly, it is possible to reduce the wavefront error ascribable to these factors or aberrations by resorting to a time-average processing. In that case, the wavefront error components other than those ascribable to the factors (3) and (5) can be measured with the dynamic range being enlarged.

However, in the interference measuring method adopted in the inspection of high-precision mirror surface, the wavefront error is ordinarily determined on the basis of the interference fringe produced between a reference wavefront and the measured wavefront. Consequently, the time-average processing executed upon formation of the interference fringe results in disappearance of the interference fringe.

For mathematically integrating the interference fringes, it is required to acquire once the interference fringe images and perform the summation average arithmetic operation on the images after correctively compensating for the interference fringe shifts brought about by the vibration and the fluctuation of the atmosphere. To this end, there is demanded a processing system which is capable of measuring massive interference fringe images, estimating the fringe correcting quantities and effectuating the fringe correction before summation. Besides, lots of time must be assigned to the fringe correction processing in each measurement.

As will now become apparent from the foregoing, in order to shorten the time taken for the measurement and analysis, such wavefront measuring means is demanded which is capable of correctively canceling out the wavefront error components ascribable to the factors or aberrations (3), (4) and (5) from the measured wavefront and executing the processing of extracting from the measurement data only the component ascribable to the optic disposition deviation within a short time. Further, severe requirement is imposed that magnitude of optical system deviation, i.e., optic disposition deviation, and direction thereof be estimated from the extracted wavefront error quantity to thereby adjust the reflecting telescope so that the optics or optical elements thereof assume the optimal optical disposition in the zero-gravity state.

It is further noted that according to the optical system assembling and adjusting method of the prior art, operator is required to estimate the assembling adjustment error of the optical system from the visibly indicated or plotted values of the wavefront error as described above. However, the components of the wavefront error plotted reflect the factors which depend on the environmental conditions such as temperature change, fluctuation of the atmosphere, deformation under the dead load and the like in addition to the assembling adjustment error. Consequently, there has arisen the problem that the assembling adjustment accuracy undergoes degradation in dependence on the environmental conditions.

Moreover, the assembling adjustment error contains a plurality of parameters concerning position, angle, direction and magnitude. However, difficulty is encountered in determining discriminatively these parameters on the basis of the visibly indicated or plotted wavefront error. Under the circumstances, it is necessary to repeat the adjustment and the test a large number of times, which of course means remarkable degradation in the process efficiency.

With the preset invention which has been made with a view to solving the problems mentioned above, it is contemplated as an object thereof to provide an optical system deviation estimating apparatus, an optical system deviation adjusting apparatus, an optical system deviation estimating method, and an optical system deviation adjusting method which are capable of correctively adjusting only the wavefront error ascribable to the optical system deviation and capable of measuring or inspecting the optical system destined for use in the zero-gravity environment without any appreciable difficulty on the earth.

Further, it is an object of the present invention to provide an optical system deviation estimating apparatus which can carry out inspection or test as to the assembling adjustment error of the optical system with high accuracy and at high rate without undergoing the influence of environmental conditions and which can indicate the assembling adjustment error visibly intelligibly.

DISCLOSURE OF THE INVENTION

The optical system deviation estimating apparatus according to this invention is designed for measuring wavefront propagating through space after having passed through an optical system under test for thereby estimating deviation quantities of optic disposition in the optical system under test on the basis of the measured wavefront, and the apparatus includes a) an erected/inverted attitude setting means for changing dispositional attitude of the optical system under test among a plurality of attitudes, b) a non-interferometric type wavefront measuring means for measuring wavefronts at each of the attitudes as set up without making use of interference phenomenon of light, c) a polynomial approximation means for expanding measured wavefront values determined by the non-interferometric type wavefront measuring means to a polynomial, d) an averaging arithmetic means for averaging the measured values derived from output of the non-interferometric type wavefront measuring means or alternatively arithmetic values derived from output of the polynomial approximation means, and e) a polynomial specific coefficient extraction arithmetic means for extracting specific coefficient values of the polynomial.

In the optical system deviation estimating apparatus according to this invention, the erected/inverted attitude setting means may be provided with a horizontality measuring means for measuring a degree of horizontality relative to gravity.

Furthermore, in the optical system deviation estimating apparatus according to this invention, the non-interferometric type wavefront measuring means may be directly coupled to the optical system under test.

Furthermore, in the optical system deviation estimating apparatus according to this invention, the non-interferometric type wavefront measuring means may be disposed at a position spatially distanced from the optical system under test.

Furthermore, in the optical system deviation estimating apparatus according to this invention, the non-interferometric type wavefront measuring means may be so designed as to split the light beam having passed through the optical system under test, to thereby determine inclinations of wavefronts of the split light beams, respectively.

Furthermore, in the optical system deviation estimating apparatus according to this invention, the non-interferometric type wavefront measuring means may include a) a collimated light beam generating means for generating a collimated light beam, b) a deflecting means for deflecting the collimated light beam outputted from the collimated light beam generating means toward the optical system under test, c) an imaging means for focusing the light beam having passed through the optical system under test while splitting the light beam, d) an image pickup means disposed on a focal plane of the imaging means, e) a centroid position measuring means for determining centroid positions of focused light intensity spots from the image picked up by the image pickup means, and f) a wavefront inclination arithmetic means for determining an inclination quantity of the wavefronts on the basis of the centroid positions derived from the output of the centroid position measuring means.

Furthermore, in the optical system deviation estimating apparatus according to this invention, the non-interferometric type wavefront measuring means may be designed to determine a curvature of the wavefront of the light beam having passed through the optical system under test.

Furthermore, in the optical system deviation estimating apparatus according to this invention, the averaging arithmetic means may be designed to average through integration the image outputted from the image pickup means.

Furthermore, in the optical system deviation estimating apparatus according to this invention, an image pickup means having charge storing function may be employed as the image pickup means, while the averaging arithmetic means may be designed to average the values by making use of the charge storing function.

Furthermore, in the optical system deviation estimating apparatus according to this invention, the averaging arithmetic means may be so designed as to average the coordinate values of positions of the focused light intensity spots as determined by the centroid position measuring means.

Furthermore, in the optical system deviation estimating apparatus according to this invention, the polynomial approximation means may be designed to expand the measured wavefront values to a polynomial of Zernike form.

Furthermore, in the optical system deviation estimating apparatus according to this invention, the polynomial specific coefficient extraction arithmetic means may be so designed as to extract coma aberration coefficient term and focus coefficient term from the coefficient terms of Zernike form.

Furthermore, in the optical system deviation estimating apparatus according to this invention, the averaging arithmetic means may be designed for summing and averaging the wavefront values measured, respectively, in the erected attitude state and the inverted attitude state set up relative to the direction of gravity with the aid of the erected/inverted attitude setting means.

The optical system deviation adjusting apparatus according to this invention includes optical-element-disposition adjusting means for adjusting optic dispositions orientations of individual optical elements of the optical system under test and is arranged for adjusting the optic dispositions of the optical elements of the optical system under test with the aid of the optical system deviation estimating apparatus described above.

An optical system deviation estimating method according to this invention is designed for measuring wavefront propagating through space after having passed through an optical system under test for thereby estimating deviation quantities of optic disposition in the optical system under test on the basis of the measured wavefront, and the method includes a) an erected/inverted attitude setting step of changing dispositional attitude of the optical system under test to a plurality of attitudes, b) a non-interferometric type wavefront measuring step of measuring wavefronts, respectively, at the attitudes set up without resorting to the interference phenomenon of light, c) a polynomial approximation step of expanding measured wavefront values determined in the non-interferometric type wavefront measuring step to a polynomial, d) an averaging arithmetic step of averaging the measured values obtained in the non-interferometric type wavefront measuring step or alternatively arithmetic values obtained in the polynomial approximation step, and a polynomial specific coefficient extraction arithmetic step of extracting specific coefficient values of the polynomial.

In the optical system deviation estimating method according to this invention, the erected/inverted attitude setting step may include a horizontality measuring step of measuring a degree of horizontality relative to gravity.

Further, in the optical system deviation estimating method according to this invention, the non-interferometric type wavefront measuring step may be designed to split the light beam having passed through the optical system under test, to thereby determine inclinations of wavefronts of the split light beams, respectively.

The optical system deviation adjusting method according to this invention includes an optical element disposition adjusting step of adjusting optic dispositions of individual optical elements of the optical system under test and is designed for adjusting optic disposition of the optical elements of the optical system under test by making use of the optical system deviation estimating method described above.

Additionally, the optical system deviation adjusting apparatus according to this invention may further include an external driving means for driving externally the optical-element-disposition adjusting means, wherein the measured value outputted from the optical system deviation estimating apparatus may be fed back to the optical-element-disposition adjusting means as an error signal.

Besides, in the optical system deviation estimating apparatus according to this invention, a reference light source of high luminance and low coherence may be employed in the collimated light beam generating means in combination with the image pickup means which is capable of performing image pickup operation at a high rate.

Moreover, in the optical system deviation estimating apparatus according to this invention, the collimated light beam generating means may include a light source capable of emitting a spot light beam as the reference light source, and additionally a collimating means for transforming the light beam emitted from the reference light source into a collimated light beam.

Besides, in the optical system deviation estimating apparatus according to this invention, the collimated light beam generating means may further include a light source having a luminescent center wavelength in a visible wavelength band as the reference light source.

Additionally, in the optical system deviation estimating apparatus according to this invention, the collimated light beam generating means may further include a waveguide means for guiding light emitted from the reference light source.

Furthermore, in the optical system deviation estimating apparatus according to this invention, the waveguide means may include a single mode fiber or alternatively a polarization-preserving fiber, and an optical fiber connector having a fiber terminating face polished in a planar surface or alternatively in a spherical surface.

Further, in the optical system deviation estimating apparatus according to this invention, the collimating means may include a collimate lens, wherein the collimated light beam generating means may include a collimate lens holding fixture for holding the collimate lens, an optical fiber connector holding fixture for holding the optical fiber connector, and a moving means for moving the collimate lens holding fixture and the optical fiber connector holding fixture relative to each other along an optical axis of the collimate lens while maintaining coincidence in center between the collimate lens and the optical fiber connector.

Further, in the optical system deviation estimating apparatus according to this invention, the moving means may be composed of a first fitting surface provided on an outer peripheral surface of either one of the collimate lens holding fixture or the optical fiber connector holding fixture and a second fitting surface provided on the other of the collimate lens holding fixture and the optical fiber connector holding fixture so as to engage with the first fitting surface, and a moving mechanism for moving the collimate lens holding fixture and the optical fiber connector holding fixture relative to each other.

Furthermore, in the optical system deviation estimating apparatus according to this invention, the collimate lens holding fixture and the optical fiber connector holding fixture may be fabricated of different materials, respectively.

Furthermore, the optical system deviation estimating apparatus according to this invention may additionally include a relative position securing means for securing fixedly a relative position between the collimate lens holding fixture and the optical fiber connector holding fixture, wherein the moving mechanism may be detachably mounted on the collimate lens holding fixture and the optical fiber connector holding fixture.

Furthermore, in the optical system deviation estimating apparatus according to this invention, arrangement may be made such that the intensity of the reference light source can be adjusted externally.

Furthermore, the optical system deviation estimating apparatus according to this invention may further include a light source intensity control means for adjusting the intensity of the reference light source so that all pixel signal values acquired through the image pickup means become maximum without exceeding a predetermined threshold value.

Moreover, the optical system deviation estimating apparatus according to this invention may further include a temperature sensor for measuring a temperature of the reference light source, a Peltier cooler for maintaining the temperature of the reference light source to be constant in response to the output of the temperature sensor, and driving means for driving the Peltier cooler, wherein a casing of the reference light source may serve also as a heat dissipating means of the Peltier cooler.

Further, in the optical system deviation estimating apparatus according to this invention, the image pickup means may include a device of square pixels for enabling image pickup operation to be performed at a high rate.

Furthermore, the optical system deviation estimating apparatus according to this invention may further include a wavefront error calculating means for arithmetically determining a relation between an assembling adjustment error and a wavefront error, and a wavefront error plotting means for representing the wavefront error outputted from the wavefront error calculating means in an orthogonal coordinates system having coordinate axes, wherein the assembling adjustment error of at least on element is taken along a coordinate axis.

Furthermore, in the optical system deviation estimating apparatus according to this invention, the wavefront error calculating means may be so designed as to use coefficients of a given polynomial to which the wavefront error is expanded.

Furthermore, in the optical system deviation estimating apparatus according to this invention, the wavefront error calculating means may be so designed as to use Zernike polynomial as the polynomial for expanding the wavefront error.

Furthermore, the optical system deviation estimating apparatus according to this invention may further include a wavefront error calculating means for arithmetically determining a relation between an assembling adjustment error and a wavefront error, a wavefront error plotting means for representing two factors of the wavefront error outputted from the wavefront error calculating means in a two-dimensional coordinate system having coordinate axes along which the assembling adjustment errors are taken, respectively, wherein the wavefront error plotting means represents simultaneously two coefficients of a polynomial which are used by the wavefront error calculating means as the wavefront error factors, and wherein the deviation estimating apparatus may further include an assembling adjustment error estimating means for estimating assembling adjustment errors on the basis of an intersection between straight lines or alternatively curves representing the wavefront error factors and plotted by the wavefront error plotting means.

Further, in the optical system deviation estimating apparatus according to this invention, the wavefront error plotting means may be so designed as to plot the wavefront error in the form of a contour in the two-dimensional orthogonal coordinates system.

Further, in the optical system deviation estimating apparatus according to this invention, the wavefront error plotting means may be designed to plot the two factors of the wavefront error in a three-dimensional orthogonal coordinates system having coordinate axes along which the assembling adjustment error and the wavefront error are taken, respectively.

Furthermore, in the optical system deviation estimating apparatus according to this invention, the wavefront error plotting means may be so designed as to set as a threshold value a permissible value of the wavefront error to thereby represent a region underlying the threshold value in a predetermined color or pattern while representing a region overlying the threshold value in another color or pattern.

The optical system deviation adjusting apparatus according to this invention may include an optical-element-disposition adjusting means for adjusting optic dispositions of individual optical elements of the optical system under test and may be arranged for adjusting optic dispositions of the optical elements of the optical system under test with the aid of the optical system deviation estimating apparatus described above.

BRIEF DESCRIPTION OF THE DRAWINGS

FIG. 27 is a view showing individual terms of Zernike polynomial, FIG. 31 is a conceptual view showing an image of focused light spots picked up by an image pickup means in the case where assembling adjustment errors of a reflecting telescope are sufficiently small.

BEST MODES FOR CARRYING OUT THE INVENTION

EMBODIMENT 1

Figure 1:
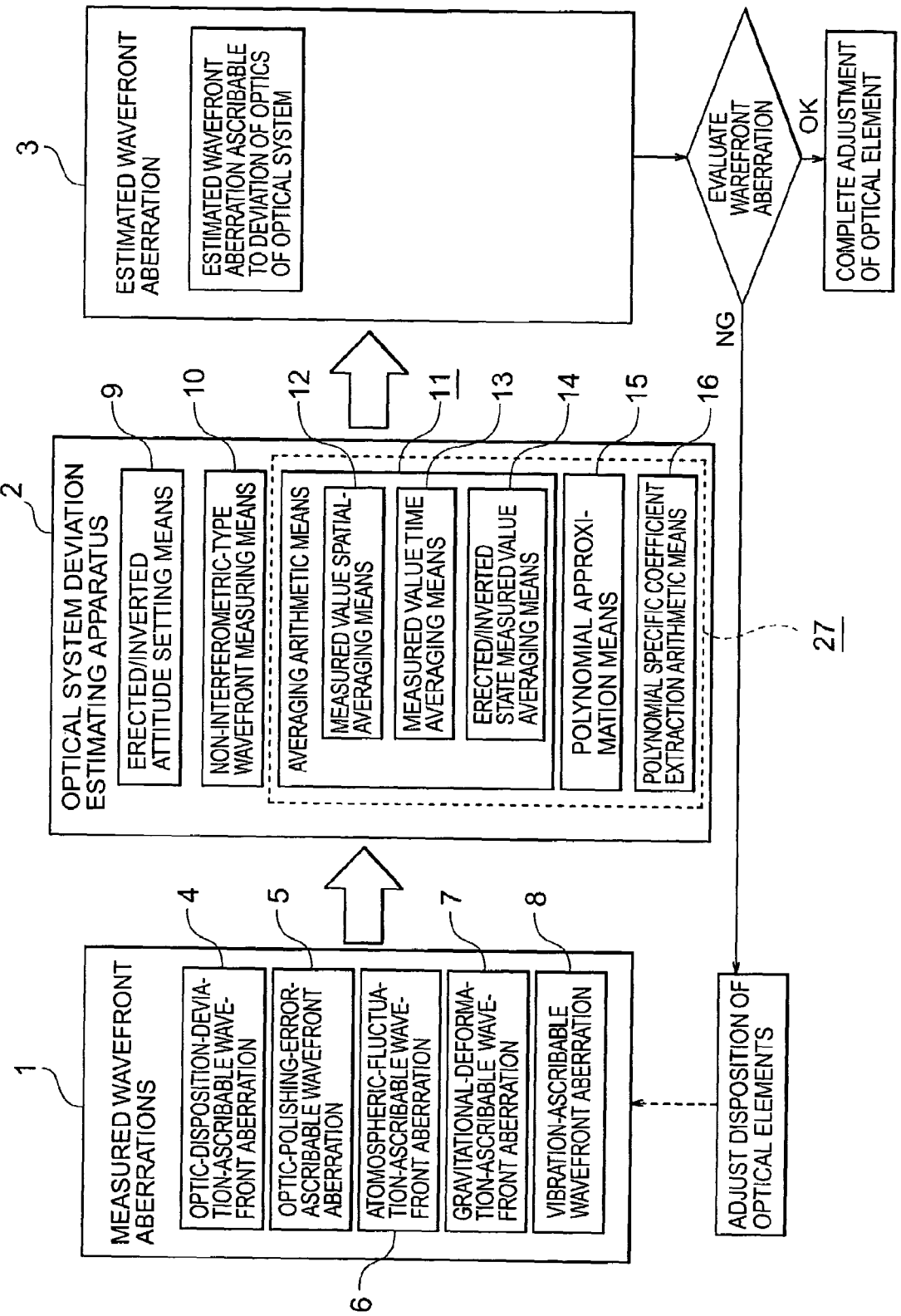
FIG. 1 is a view for illustrating functions of an optical system deviation estimating apparatus according to the present invention.

FIG. 1 is a view for illustrating functions of the apparatus for estimating deviation in an optical system, i.e., optical system deviation estimating apparatus. As the measured wavefront aberrations 1 of an optical system under test, there can be mentioned the wavefront aberration which is ascribable to the deviation of the disposition of the optical elements or optics in the optical system, i.e., optic-disposition-deviation-ascribable wavefront aberration 4, the wavefront aberration ascribable to polishing errors of the optical elements or optics, i.e., optic-polishing-error-ascribable wavefront aberration 5, the wavefront aberration ascribable to fluctuation of the atmosphere, i.e., atmospheric-fluctuation-ascribable wavefront aberration 6, the wavefront aberration due to gravitational deformation, i.e., gravitational-deformation-ascribable wavefront aberration 7 and the wavefront aberration ascribable to vibration, i.e., vibration-ascribable wavefront aberration 8.

The optical system deviation estimating apparatus 2 according to the present invention is comprised of an erected/inverted attitude setting means 9 for setting up or positioning the optical system under test exchangeably in the erected and inverted states, respectively, a non-interferometric type wavefront measuring means 10, an averaging arithmetic means 11, a polynomial approximation means 15 for approximating a measured value with a polynomial, and a polynomial specific coefficient extraction arithmetic means 16 for extracting only the coefficient relevant to the alignment aberration. Further, the averaging arithmetic means 11 is composed of a means for spatially averaging the measured value, i.e., measured value spatial averaging means 12, a means for temporally averaging the measured value, i.e., measured value time averaging means 13, a means for summing and averaging the measured values in the erected and inverted states, i.e., erected/inverted state measured value averaging means 14.

Of the wavefront aberrations 4 to 8, only the optic-disposition-deviation-ascribable wavefront aberration 4 of the optical system of concern is extracted as the estimated wavefront aberration 3 by the means enumerated above. Subsequently, the estimated wavefront aberration 3 is evaluated. If the estimated wavefront aberration 3 lies out of a predetermined prescribed value range, adjustment is performed on the disposition of the optics in the optical system. On the other hand, if the estimated wavefront aberration 3 falls within the predetermined prescribed value range, adjustment of the disposition of the optics is then terminated.

Figure 2:
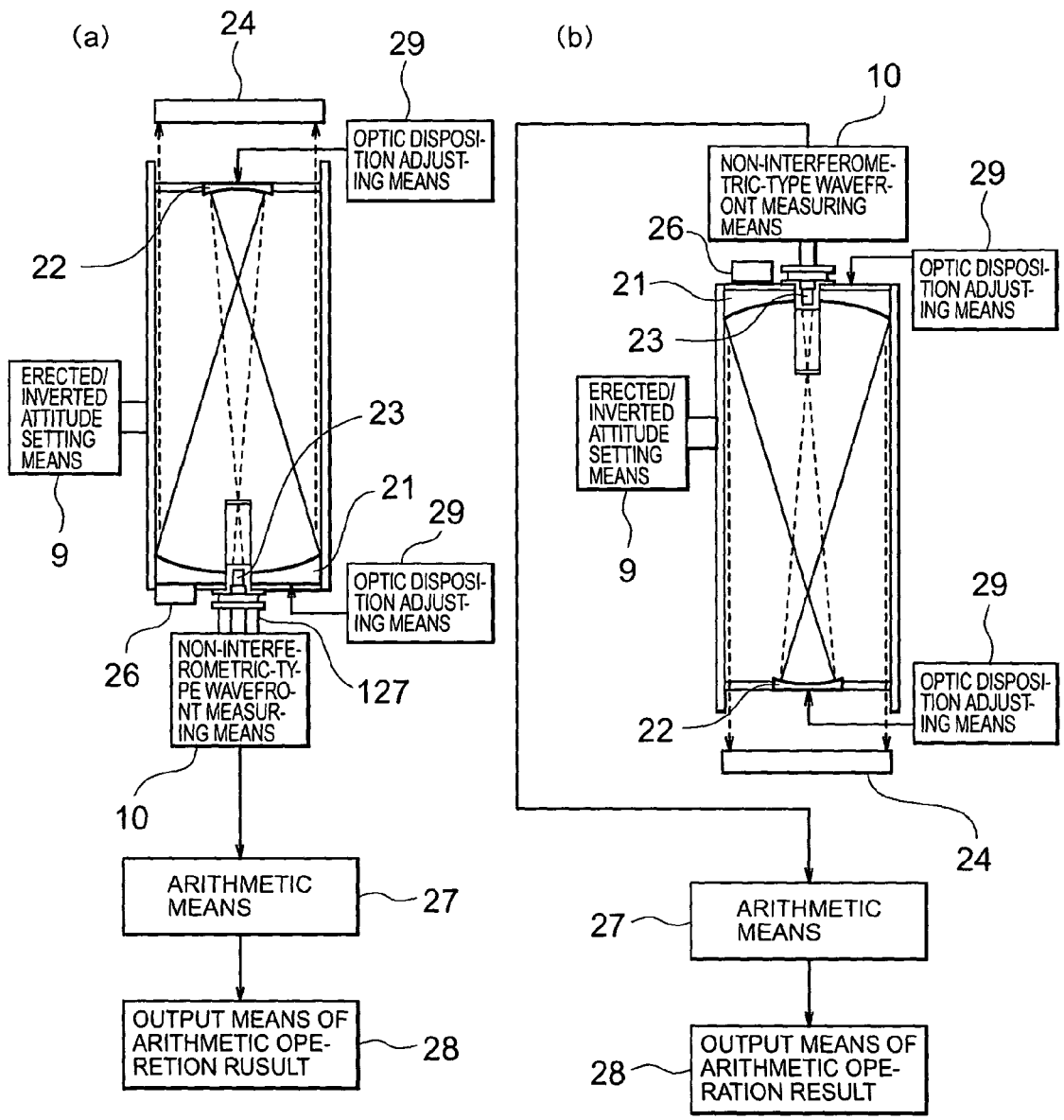
FIG. 2 is a view for illustrating the optical system deviation estimating apparatus according to the present invention, wherein an under-test optical system is shown in an erected state at (a), while the under-test optical system is shown in an inverted state at (b)

FIG. 2 is a view for illustrating the optical system deviation estimating apparatus according to the present invention. Shown at (a) in FIG. 2 is an under-test optical system, i.e., optical system under test, in the erected state, while at (b) the under-test optical system is shown in the inverted state. In the case of the instant embodiment of the invention, it is presumed that the under-test optical system is a reflecting telescope which is comprised of a primary mirror 21, a secondary mirror 22 and a collimate lens 23 and that inspection or test is performed as to alignment of the reflecting telescope.

In the optical system shown in FIG. 2, a collimated light beam incident on the reflecting telescope in the outer space is condensed at a focal point of the telescope so far as it suffers no deviations. On the other hand, in the case where the wavefront aberrations 4 to 8 are influential, the position of the focal point is caused to shift from the optical axis or displace along the direction of the optical axis. In this conjunction, it is noted that the causes of the wavefront aberrations which make appearance in the outer space are only the optic-disposition-deviation-ascribable wavefront aberration 4 and the optic-polishing-error-ascribable wavefront aberration 5. Accordingly, there arises the necessity for a means for eliminating the influences of the atmospheric-fluctuation-ascribable wavefront aberration 6, the gravitational-deformation-ascribable wavefront aberration 7 and the vibration-ascribable wavefront aberration 8 from the wavefront aberrations 1 measured on the earth.

As other constituents than the under-test optical system, there are provided a non-interferometric type wavefront measuring means 10, an erected/inverted attitude setting means 9, an arithmetic means 27, an output means 28 for outputting the result of arithmetic operation, optical-element-disposition adjusting means 29 for adjusting the optic disposition in the under-test optical system, and a horizontality measuring means 26 for measuring the degree of horizontality with reference to the direction of gravity.

Figure 3:
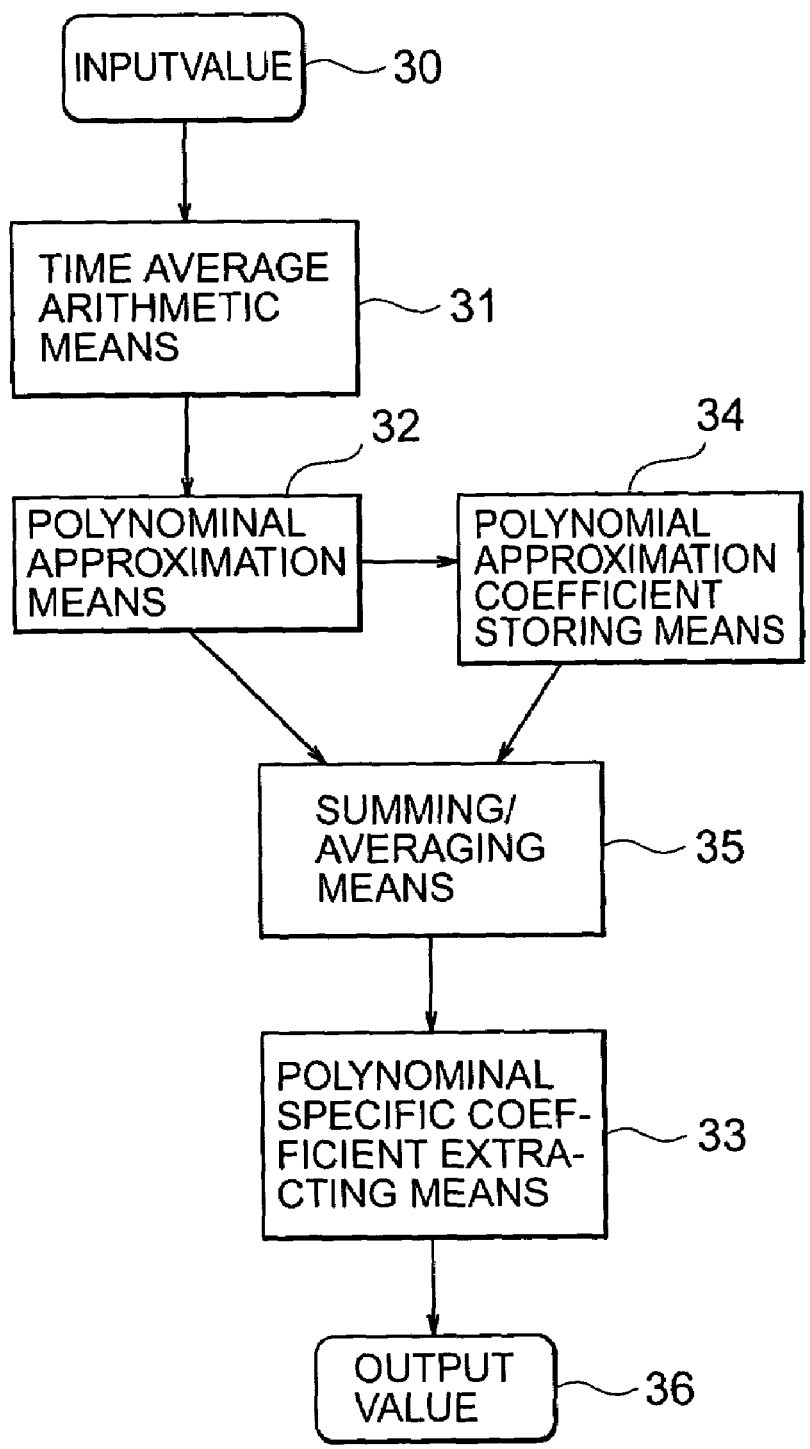
FIG. 3 is a diagram showing a structure of an arithmetic means.

FIG. 3 is a functional diagram for illustrating a structure of the arithmetic means 27. The arithmetic means 27 is comprised of a time average arithmetic means 31 for averaging in time the measured wavefront value, a polynomial approximating means 32 for expanding the measured wavefront value to polynomial coefficients, a polynomial specific coefficient extracting means 33 for extracting specific coefficients from the polynomial coefficients, a polynomial approximation coefficient storing means 34 and a summing/averaging means 35.

Turning back to FIG. 2, in the case of the instant embodiment, it is presumed, only for the convenience of description, that the primary mirror 21 and the secondary mirror 22 suffer only the decentering or decentricity error and an inclination error and that the polishing errors of the respective mirror surfaces are suppressed to a minimum. Thus, it is also presumed that the optical-element-disposition adjusting means 29 is designed to be capable of adjusting the primary mirror 21 and the secondary mirror 22 in respect to the decentering or decentricity and the inclination independently of each other. Further, it is assumed that the measurement is repetitively carried out in the two attitudes, i.e., in the erected state and inverted state, respectively.

Figure 4:
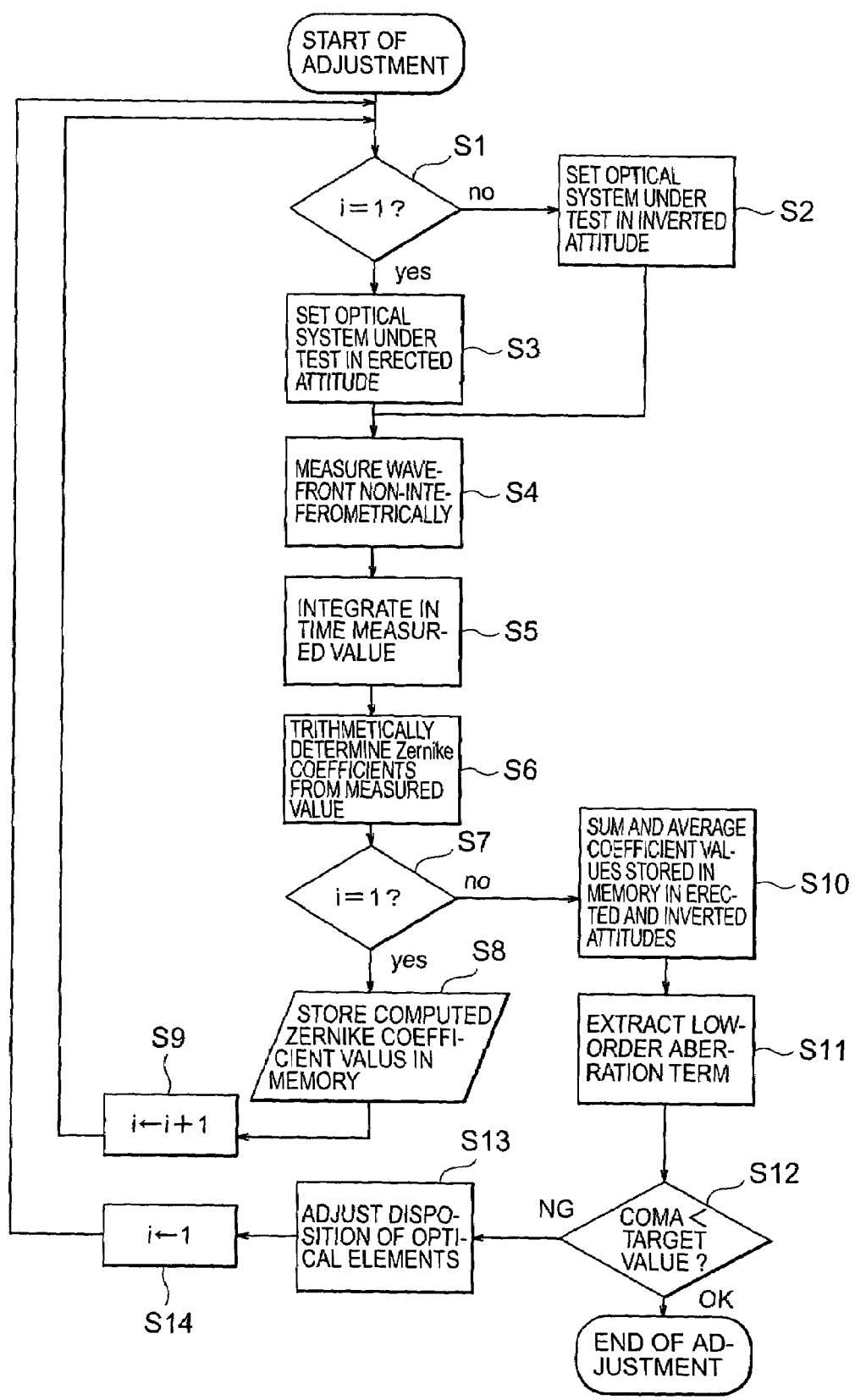
FIG. 4 is a flow chart illustrating a processing procedure in the case where decentricity and inclination deviation exist in a primary mirror and a secondary mirror.

FIG. 4 shows an adjustment procedure according to the instant embodiment of the invention. Referring to FIG. 4 (where i represents the number of repetition times), the under-test optical system is positioned in the erected attitude relative to the direction of gravity at a first time in the adjustment, whereon the wavefront is measured by the non-interferometric type wavefront measuring means 10 (steps S3 and S4: non-interferometric type wavefront measuring steps).

In that case, the horizontality measuring means 26 is employed for measuring the degree of horizontality relative to the direction of gravity to thereby ensure a sufficient horizontality for the attitude of the object under test, i.e., the optical system under test (horizontality measuring step).

The horizontality measuring means 26 mentioned above is installed on a reference plane of the under-test optical system. However, the horizontality measuring means 26 may be set up on a reference plane of the non-interferometric type wavefront measuring means 10 so far as the reference plane of the non-interferometric type wavefront measuring means 10 can be sustained horizontally relative to the reference plane of the under-test object.

Subsequently, the measured wavefront value is integrated in time, i.e., as a function of time (steps S5) to thereby average the atmospheric-fluctuation-ascribable wavefront aberration 6. In the case where the atmospheric fluctuation varies at random in the course of time lapse, the SNR can be improved by $\sqrt{N}$ by extending the integrating time by a multiple N, where S represents a fixed component of the measured wavefront aberrations 1.

With the time averaging for which a sufficient integrating time is taken, the atmospheric-fluctuation-ascribable wavefront aberration 6 can be eliminated from the measured wavefront aberrations 1.

In succession, the output of the time average arithmetic means 31 is approximated with a polynomial through the polynomial approximating means 32 to thereby arithmetically determine polynomial coefficients (step S6).

The coefficient values as derived are stored in the polynomial approximation coefficient storing means 34 (step S8) Subsequently, the under-test object is set up in the inverted attitude (step S2: erected/inverted attitude setting step) to measure the wavefront in the inverted attitude through the procedure described above, whereon Zernike coefficients are arithmetically determined (step S6).

Next, the Zernike coefficient values of the wavefront aberrations arithmetically determined in the different attitudes are summed and averaged (step S10: averaging arithmetic step). Through this averaging step, the gravitational-deformation-ascribable wavefront aberration 7 can be eliminated from the measured wavefront aberrations 1, as will be described below.

Now, elucidation will be made of the principle underlying the method of eliminating the gravitational-deformation-ascribable wavefront aberration 7 described above.

When the under-test optical system is set up in the erected attitude and the inverted attitude, each of the primary mirror 21 and the secondary mirror 22 undergo gravitational deformation. In this conjunction, it is noted that magnitude of the gravitational deformation remains unchanged before and after the change of the attitude and that only the direction of the deformation changes. This means that magnitude of the gravitational-deformation-ascribable wavefront aberration 7 remains unchanged before and after the change of the attitude and that polarity or sign of the gravitational-deformation-ascribable wavefront aberration is inverted.

On the other hand, in the case where the primary mirror 1 and the secondary mirror 22 are supported at asymmetrical points or in the case where the stiffness of the supporting points differ from each other, the decentricity and the inclination change before and after the change of the attitude, which in turn results in change of the wavefront aberration components. However, magnitude of the change remains same before and after the change of the attitude with only the direction of the change being different. Thus, it is safe to say that the wavefront aberration components due to the decentricity or decentering and the inclination remain unchanged before and after the change of the attitude or alternatively the polarity or sign of the wavefront aberration components are inverted with the magnitude thereof remaining unchanged.

For the reasons described above, the gravitational-deformation-ascribable wavefront aberration 7 can be eliminated by summing and averaging the measured wavefront aberrations 1 acquired before and after the change of the attitude.

In this way, the optic-deviation-ascribable wavefront aberration 4 and the optic-polishing-error-ascribable wavefront aberration 5 can be taken out.

At this juncture, it is noted that magnitude of the optic-polishing-error-ascribable wavefront aberration 5 is sufficiently smaller than that of the optic-disposition-deviation-ascribable wavefront aberration 4. Thus, the aberration ascribable to the polishing error can be neglected.

Subsequently, only the low-order aberration components are extracted from the Zernike coefficient values determined by the summing/averaging process (step S11: polynomial approximation step, polynomial specific coefficient extraction arithmetic step) Since the wavefront aberration components relating to the decentricity and the inclination make appearance only in the low-order term of the polynomial coefficient, as described below, it is sufficient to make evaluation only about this component.

Figure 5:
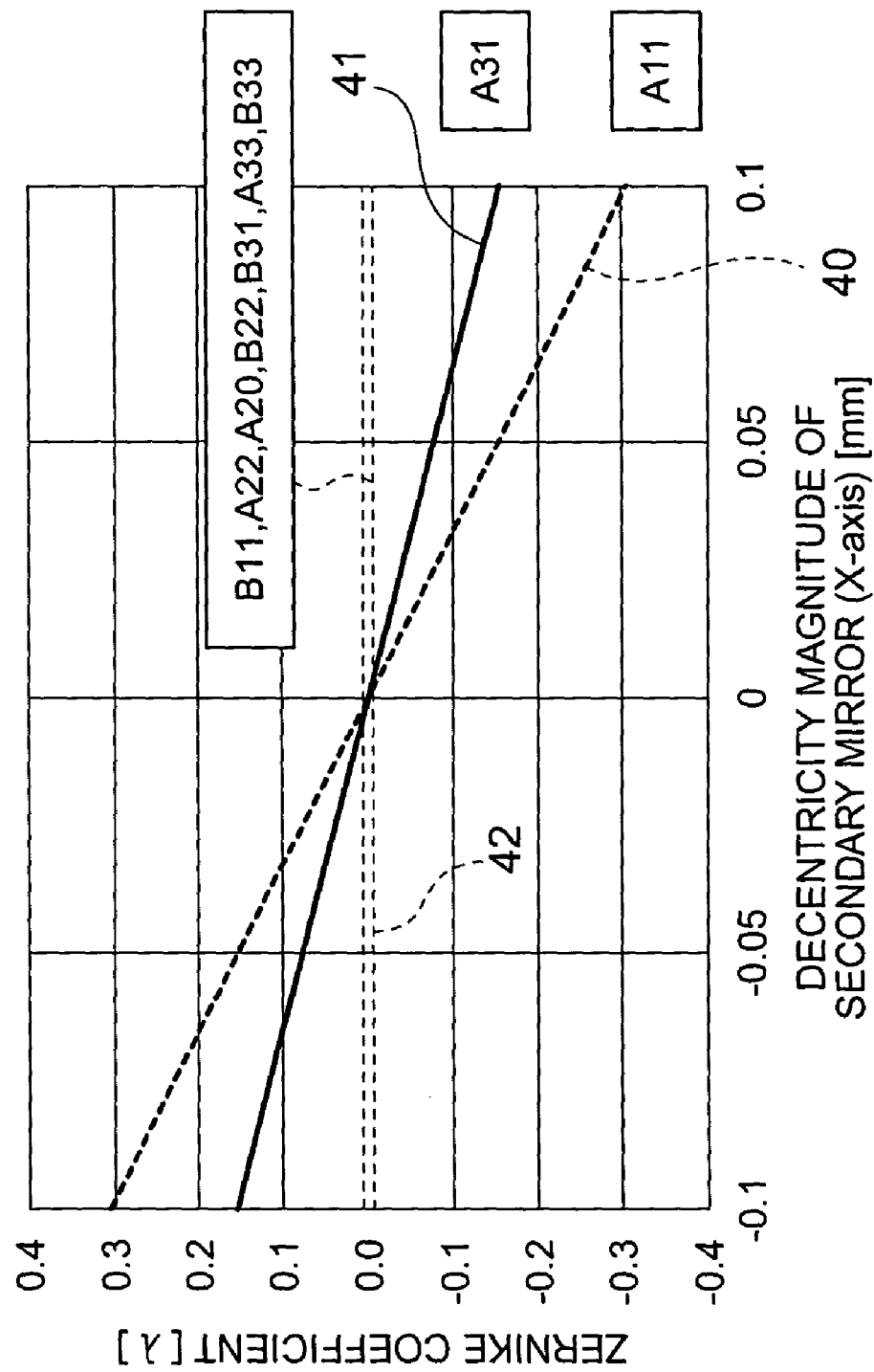
FIG. 5 is a view for graphically illustrating changes of wavefront aberrations as a function of decentricity of a secondary mirror.

In the Zernike polynomial defined by the orthogonal coordinates system, the orthogonal coordinates system is presumed to be represented by (X, Y). FIG. 5 shows wavefront aberrations which make appearance when the secondary mirror 22 is decentered in the X-axis direction. In the figure, magnitude of the decentering or decentricity of the secondary mirror 22 is taken along the abscissa with the wavefront aberrations which make appearance being taken along the ordinate. As can be seen in the figure, of the polynomial coefficients, only the coefficient (A11) 40 representing the inclination of the wavefront and the coefficient (A31) 41 representing the coma aberration change in proportion to the magnitude of the decentricity while the other coefficients 42 remain unchanged.

Figure 6:
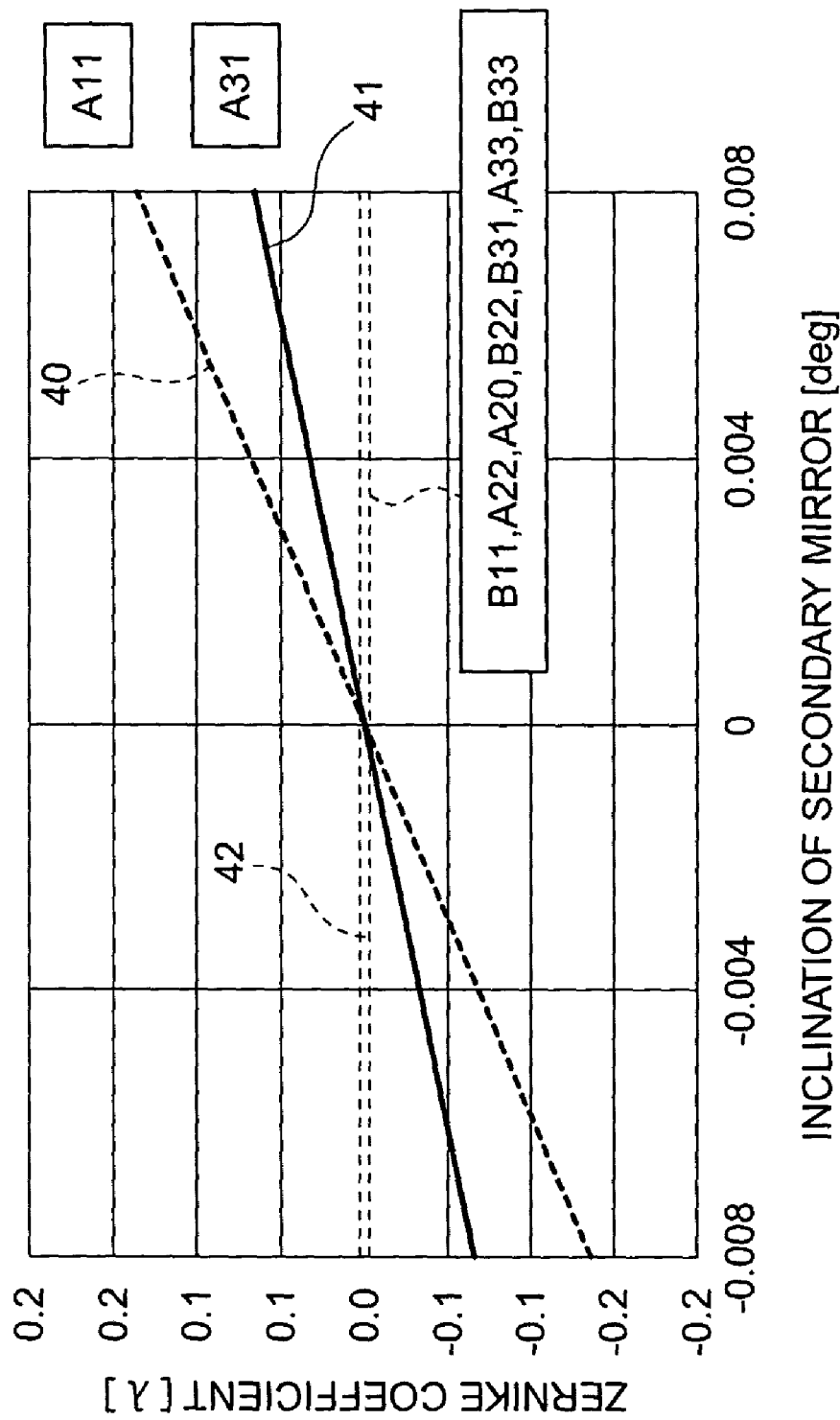
FIG. 6 is a view for graphically illustrating changes of wavefront aberrations as a function of inclination of the secondary mirror.

FIG. 6 shows the wavefront aberrations which make appearance when inclination of the secondary mirror 22 changes in the X-axis direction. In the figure, magnitude of the inclination of the secondary mirror 22 from the ideal value thereof is taken along the abscissa while the wavefront aberrations making appearance are taken along the ordinate. As can be seen from the figure, only A11 (wavefront inclination component) 40 and A31 (coma aberration component) 41 change in proportion to the magnitude of inclination similarly to the case of the decentricity or decentering.

Accordingly, by determining only the component (A11) 40 or (A31) 41 of the low-order aberration components extracted and adjusting the optic disposition so that the value of the above-mentioned component falls within the permissible range of the desired value, the adjustment can be accomplished (step S13).

The desired value mentioned above should ideally be zero. In practice, however, the desired value may be set to a value closer to zero in dependence on the desired adjustment accuracy.

In the case of the example illustrated in FIG. 4, the conditions are so set up that the coma aberration component (A31) 41 becomes smaller than the desired or target value. However, the conditions may be set up by taking into account the wavefront inclination component (A11) 40.

In the foregoing description of the first embodiment of the invention, it has been presumed that only the decentering and the inclination remain in the under-test optical system. However, deviation of the distance between the primary mirror 21 and the secondary mirror 22 can equally be coped with, as described below.

Figure 7:
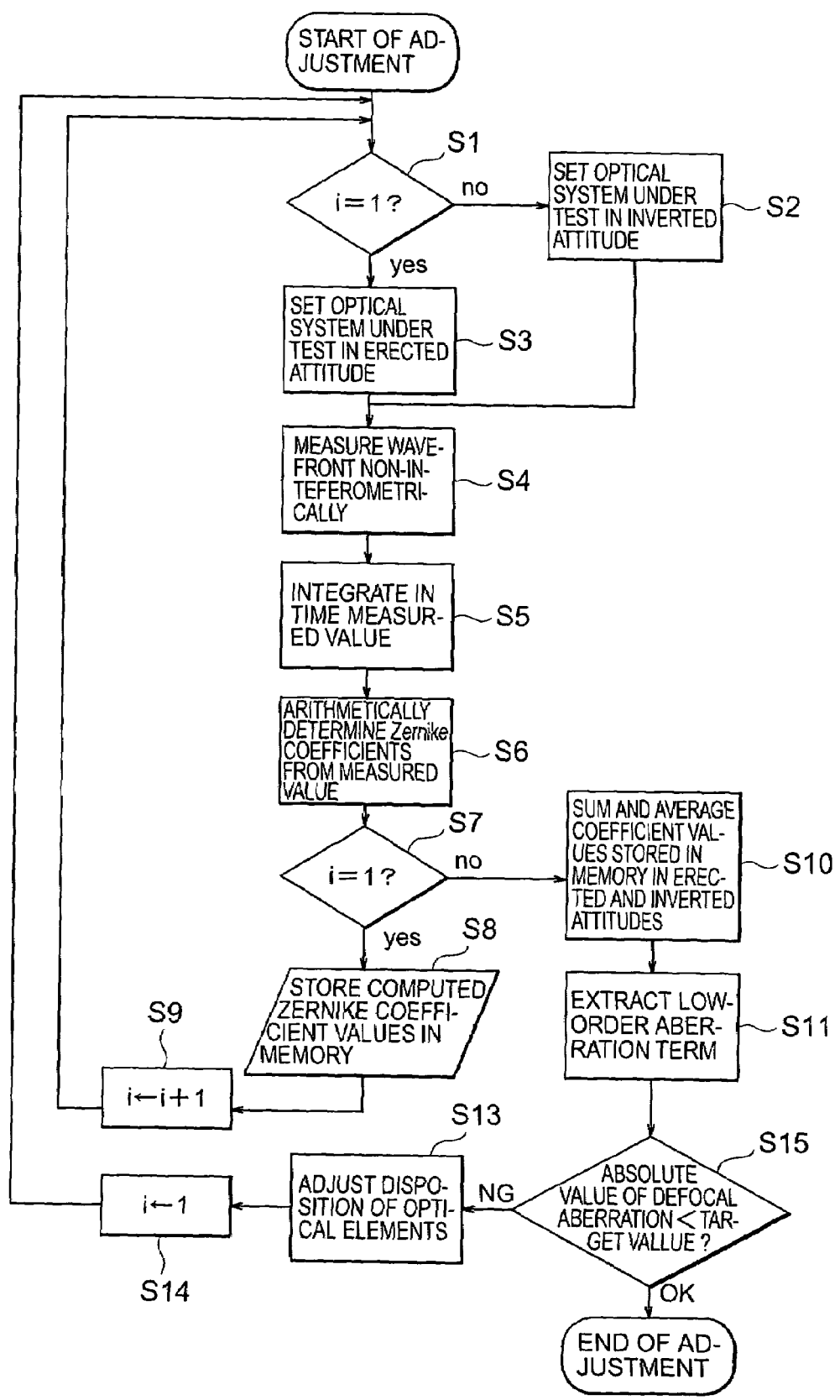
FIG. 7 is a flow chart for illustrating processing procedure in a case where a distance between the primary mirror and the secondary mirror changes.

FIG. 7 shows flows of the processings involved in measurement of the wavefront aberration ascribable to the deviation of the distance between the primary mirror 21 and the secondary mirror 22 as well as adjustment of the distance. Difference from the procedure illustrated in FIG. 3 can be seen in respect to the evaluation of the wavefront aberration and the conditional branching effected before completion of the adjustment.

In the case of the example illustrated in FIG. 6, defocus component (A20) is used in place of the coma aberration component (A31) 41 used in the evaluation described previously by reference to FIG. 4 (step S15).

Figure 8:
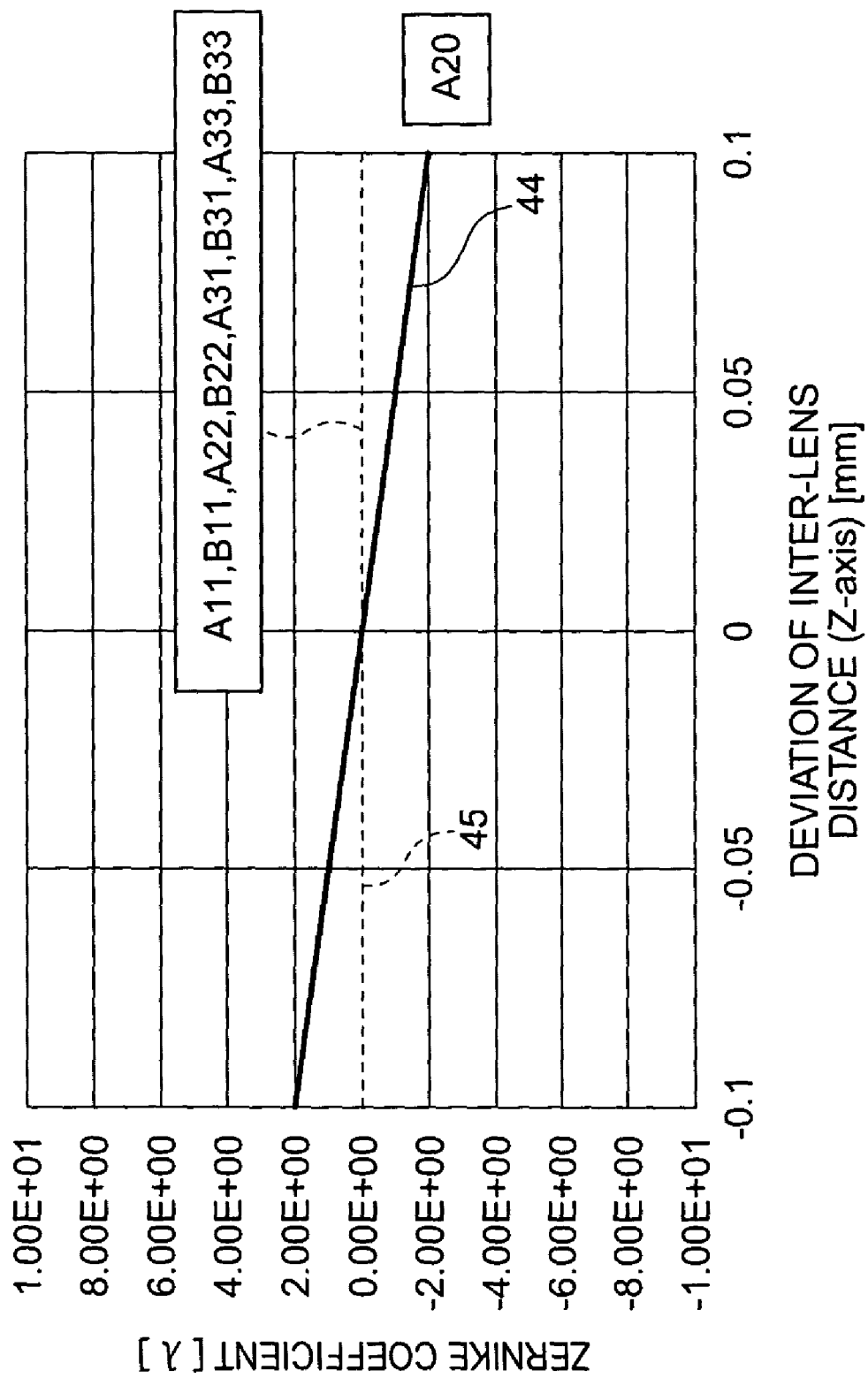
FIG. 8 is a view for graphically illustrating showing a change of wavefront aberration brought about by deviation of a distance between the primary mirror and the secondary mirror.

FIG. 8 shows a change of the wavefront aberration brought about by deviation of the inter-lens distance between the primary mirror 21 and the secondary mirror 22. In the figure, deviation of the inter-lens distance from an ideal value thereof is taken along the abscissa with the wavefront aberration being taken along the abscissa.

As can be seen in FIG. 8, only the defocal wavefront aberration component (A20) 44 is proportional to the deviation of the inter-lens distance, whereas the other wavefront aberration components 45 remain unchanged.

Accordingly, it is sufficient to adjust the inter-lens distance such that the value of the defocal component (A20) 44 selected as the quantity for evaluation does not exceed the desired or target value inclusive.

In the case of the example illustrated in FIG. 7, the condition is so set up that the defocus component (A20) becomes smaller than a desired value inclusive. However, the condition may be set up on the basis of the spherical aberration component (A40).

The desired or target value mentioned above should ideally be zero similarly to the case of the decentricity and the inclination. In practice, however, the desired or target value may be set to a value closer to zero in dependence on the accuracy of the adjustment as desired.

Figure 9:
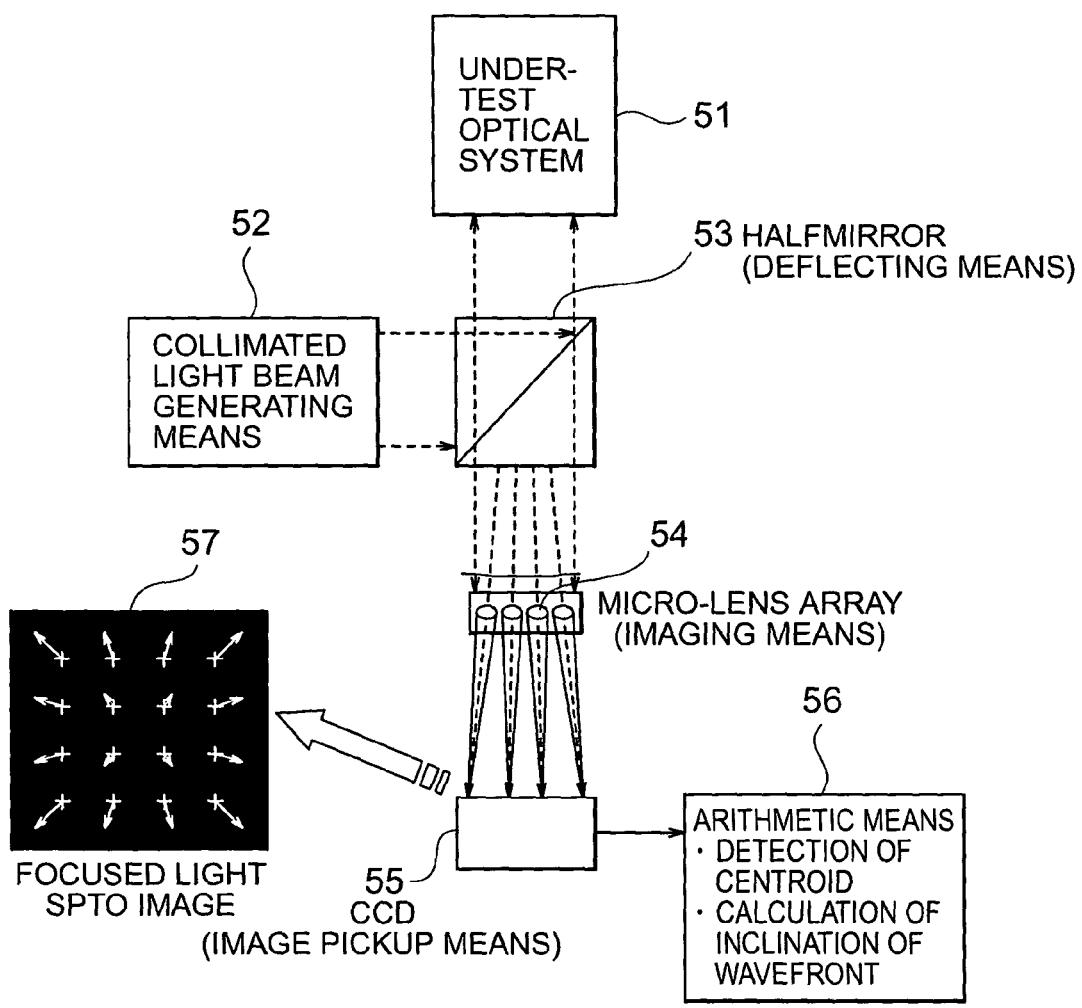
FIG. 9 is a view for illustrating an arrangement of a Schack-Hartmann sensor employed as a non-interferometric type wavefront measuring means.

FIG. 9 is a view for illustrating a typical arrangement of the non-interferometric type wavefront measuring apparatus in which a Schack-Hartmann sensor is employed.

The Schack-Hartmann sensor is comprised of a collimated light beam generating means 52 for generating a collimated light beam, a half mirror 53 serving as a beam path bending or deflecting means, a micro-lens array 54 serving as an image forming means, an image pickup means 55 such as a CCD (charge-coupled-device) or the like, and an arithmetic means 56 serving as a centroid position measuring means and a wavefront inclination arithmetic means.

The collimated light beam generated by the collimated light beam generating means 52 is caused to impinge onto the under-test optical system 51 by way of the half mirror 53. The wavefront of the reflection light beam from the under-test optical system 51 is projected onto the image pickup means (CCD) 55 in the form of a plurality of focused light spot images 57 through the medium of the micro-lens array 54.

At first, an ideal plane mirror is disposed in place of the under-test object to thereby pick up the image of the focused light spots, whereon the centroid positions of the spots are arithmetically determined by the arithmetic means 56. The centroid positions thus obtained are then stored in the arithmetic means 56 as the reference positions of the spot centroid positions.

Subsequently, the under-test optical system 51 is placed in position, and the image of the focused light spots is taken, whereon the spot centroid positions are arithmetically determined through the process similar to that described above, to thereby determine the magnitude of deviation of the spot centroid position from the reference position.

Representing by $\Delta xi$ the displacement of the focused light spot brought about by the i-th lens of the micro-lens array 54 while representing by $f_{MLA}$ the lens focal length, then inclination $\Delta Wi$ of the wavefront in the effective aperture of this lens can be determined in accordance with $$\Delta Wi = \Delta xi / f_{MLA}.$$

In the case where the Schack-Hartmann sensor is employed as described above, the arithmetic means 56 of the Schack-Hartmann sensor may be employed for integrating the focused light spot image obtained through the CCD in place of resorting to the time average arithmetic means 31 described hereinbefore by reference to FIG. 3.

Further, in place of using the time average arithmetic means 31, the charge storing function of the image pickup means 55 may be made use of for performing the time integration.

Further, instead of averaging in time the measured value of the wavefront, the centroid value arithmetically determined from the focused light spot image may be averaged in time, i.e., integrated as a function of time.

As is apparent from the foregoing description, the optical system deviation estimating apparatus implemented in the structure for measuring the wavefront traveling through the space after having passed through the optical system under test for thereby estimating the deviation quantity of the optic disposition in the optical system under test from the measured wavefront is comprised of the erected/inverted attitude setting means 9 for changing the dispositional attitude of the optical system under test, the non-interferometric type wavefront measuring means 10 for measuring the wavefronts at the attitudes as set up without resorting to the interference phenomenon of light, the polynomial approximation means 15 for expanding the measured wavefront value determined by the non-interferometric type wavefront measuring means 10 to a polynomial, the averaging arithmetic means 11 for averaging the measured values derived from the output of the non-interferometric type wavefront measuring means 10 or alternatively the arithmetic values derived from the output of the polynomial approximation means 15, and the polynomial specific coefficient extraction arithmetic means 16 for extracting the specific coefficient values of the polynomial. By virtue of this structure, it is possible to measure or examine the optical system under test in the erected attitude and the inverted attitude, respectively, to thereby cancel out the wavefront aberration components ascribable to gravity through the process of summing and averaging the measured values acquired in the erected and inverted attitudes. Besides, only the wavefront error ascribable to the alignment deviation can be measured through cooperation of the non-interferometric type wavefront measuring means 10 and the polynomial specific coefficient extraction arithmetic means 16. In this way, the optical system destined for use in the zero-gravity environment can easily be measured or inspected on the earth or ground.

Further, the erected/inverted attitude setting means 9 includes the horizontality measuring means 26 for measuring the degree of horizontality relative to the direction of gravity. Owing to this feature, the optical system under test can be set up in the erected attitude and the inverted attitude with high accuracy by means of the horizontality measuring means 26. Thus, the wavefront error component ascribable to the gravitational deformation can perfectly be canceled out.

Furthermore, the non-interferometric type wavefront measuring means 10 is directly coupled to the optical system under test. Thus, the setting-up of the apparatus (disposition and the optical axis adjustment) upon every wavefront measurement in the erected attitude and the inverted attitude can conveniently be simplified. Besides, parasitic errors which accompany change of the setup can be mitigated. Moreover, the measurement time can be shortened. Needless to say, the reduction of the time required for the setup is effective for reduction of work time and load involved in the measurements and adjustments carried out by changing the attitude repetitively. Additionally, the influence brought about by the change of the measurement environment (e.g. long-term variation of the temperature) can be avoided.

Further, the non-interferometric type wavefront measuring means 10 is disposed at a position spatially distanced from the optical system under test. Thus, the measurement can be carried out with the same setting as other wavefront measuring device (e.g. interferometer or the like). Owing to this feature, calibration, for example, of the optical system deviation estimating apparatus can be facilitated.

Moreover, the non-interferometric type wavefront measuring means 10 is so designed as to split the luminous flux having passed through the optical system under test to thereby determine the inclinations of the wavefronts of the split luminous flux, respectively. Thus, it is possible to average through integration the time-dependent change brought about by the fluctuation of the atmosphere.

Further, the non-interferometric type wavefront measuring means 10 includes the collimated light beam generating means 52 for generating a collimated light beam, the deflecting means (half mirror 53) for deflecting the collimated light beam outputted from the collimated light beam generating means 52 toward the optical system under test, the imaging means (micro-lens array 54) for focusing the luminous flux having passed through the optical system under test while splitting the luminous flux, the image pickup means 55 disposed on the focal plane of the imaging means 54, the centroid position measuring means (arithmetic means 56) for determining the centroid positions of the condensed light intensity spots from the image picked up by the image pickup means 55, and the wavefront inclination arithmetic means (arithmetic means 56) for determining inclination of the wavefront on the basis of the centroid positions derived from the output of the centroid position measuring means. With the structure of the non-interferometric type wavefront measuring means mentioned above, it is possible to average through integration the time-dependent change of the wavefront brought about by the fluctuation of the atmosphere.

Further, the non-interferometric type wavefront measuring means 10 is designed for determining the curvature of the wavefront of the luminous flux having passed through the optical system under test. On the basis of the measurement of the curvature of the wavefront, light focusing and divergence action of the optical system under test as well as the deforcal wavefront aberration thereof can effectively be estimated.

The averaging arithmetic means 11 is designed to average through integration the image outputted from the image pickup means 55. Thus, the time-dependent change of the wavefront due to the fluctuation of the atmosphere and the vibration can effectively be averaged.

In this conjunction, the image pickup means having the charge storing function may be employed as the image pickup means. In that case, the averaging arithmetic means 11 can average the values by making use of the charge storing function mentioned above. Thus, the integrating means can integrally be combined with the image pickup means, whereby reduction of the processing time and the cost can be achieved.

Further, the averaging arithmetic means 11 is designed to average the coordinate values of positions of the condensed light intensity spots as determined by the centroid position measuring means (arithmetic means 56). Owing to this feature, the amount of data to be processed can be decreased with the arithmetic operation overhead as involved being reduced, whereby the processing time can effectively be shortened.

Furthermore, the polynomial approximation means 15 is designed to expand the measured wavefront value to a polynomial of Zernike form, which is effective for the analysis of the wavefront error as well as for the estimation of the alignment error.

Moreover, the polynomial specific coefficient extraction arithmetic means 16 is designed to extract the coma aberration coefficient term and the focus coefficient term from the coefficient terms of Zernike form. Thus, the coma aberration coefficient term is effective for enabling estimation of the decentricity and the inclination of the optical system while the focus coefficient term is effective for enabling estimation primarily of the inter-lens distances in the optical system.

Besides, the averaging arithmetic means 11 is designed for summing and averaging the wavefront values measured, respectively, in the erected attitude state and the inverted attitude state relative to the direction of gravity with the aid of the erected/inverted attitude setting means 9. Thus, the wavefront error brought about by the gravitational deformations of the optical element(s) or optic(s) and change of the inter-lens distance in the optical system due to gravity can effectively be canceled out satisfactorily.

Further, the optical system deviation adjusting apparatus according to the instant embodiment of the invention includes the optical-element-disposition adjusting means 29 for adjusting the optic dispositions/orientations of the individual optics or optical elements of the optical system under test with the aid of the optical system deviation estimating apparatus described above. By virtue of this feature, the optical system under test can be adjusted on the basis of the measured values, and thus the optical system destined to be used in the zero-gravity environment can easily be adjusted on the ground (earth). Besides, by arranging the optical-element-disposition adjusting means 29 so that it can be driven from the external, the measured value can be fed back to the optical-element-disposition adjusting means 29 as an error signal. Thus, the adjustment of the optical system under test can automatically be carried out.

EMBODIMENT 2

Figure 10:
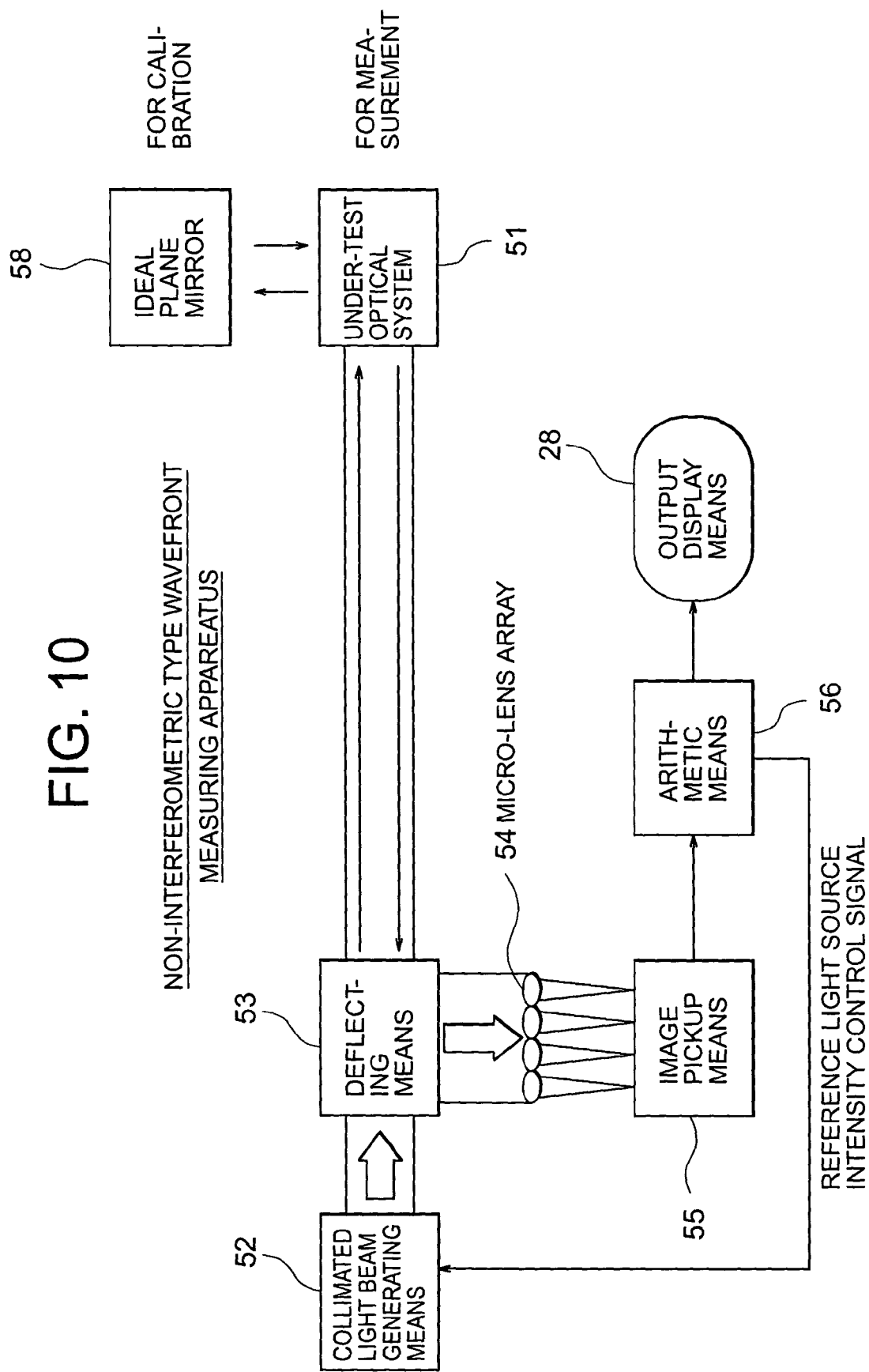
FIG. 10 is a view illustrating a non-interferometric type wavefront measuring apparatus serving as a non-interferometric type wavefront measuring means of the optical system deviation estimating apparatus according to a second embodiment of the present invention.

FIG. 10 is a view for illustrating a non-interferometric type wavefront measuring apparatus which is designed to serve as the non-interferometric type wavefront measuring means in the optical system deviation estimating apparatus according to a second embodiment of the present invention.

Referring to FIG. 10, the light beam generated by a collimated light beam generating means 52 passes through a deflecting means 53 to propagate or travel toward an under-test optical system 51. The wavefront of the light beam reflected by the under-test optical system 51 propagates or travels along the same path in the opposite direction to reach again the deflecting means 53. Thus, the path of the reflected light beam from the under-test optical system 51 is bent or deflected by the deflecting means 53 toward a micro-lens array 54 of the succeeding stage.

Incidentally, in the arrangement shown in FIG. 10, the direction in which the light beam exits from the collimated light beam generating means 52 and the traveling direction of the beam propagating toward the under-test optical system 51 coincide with each other along a same line. It should however be appreciated that such arrangement may equally be adopted in which the direction of the light beam incident on the micro-lens array 54 coincides with the traveling direction of the light beam propagating toward the under-test optical system 51 on and along a same line. In this case, the deflecting means 53 bends the optical path of the beam outputted from the collimated light beam generating means 52, whereas the optical path of the traveling light beam propagating toward the under-test optical system 51 remains unchanged.

The micro-lens array 54 splits the incident wavefront into a plurality of fragmental apertures to form focused or condensed light spots in the vicinity of a rear focal plane located downstream of the micro-lens array 54. An image pickup means 55 of high speed is disposed at the stage succeeding to the micro-lens array 54 such that the photo-surface of the image pickup means 55 is positioned close to the rear focal plane.

As the high-seed image pickup means 55, there is easily commercially available a CCD which is capable of producing the image of high resolution at high signal-to-noise ratio with short-time exposure through AD conversion. By making use of such CCD, it is possible to take the picture or image at an updating rate of 30 frames per second or more.

On the other hand, according to the teaching of the invention incarnated in the instant embodiment, as the high-speed image pickup means 55, the device incorporating square pixels is employed. Thus, the arithmetic operation for calibrating the aspect ratio of the image is rendered unnecessary, whereby the processing can be executed at a correspondingly increased speed. The image or video signal obtained through the image pickup means 55 is transmitted to the arithmetic means 56 of a succeeding stage.

Figure 11:
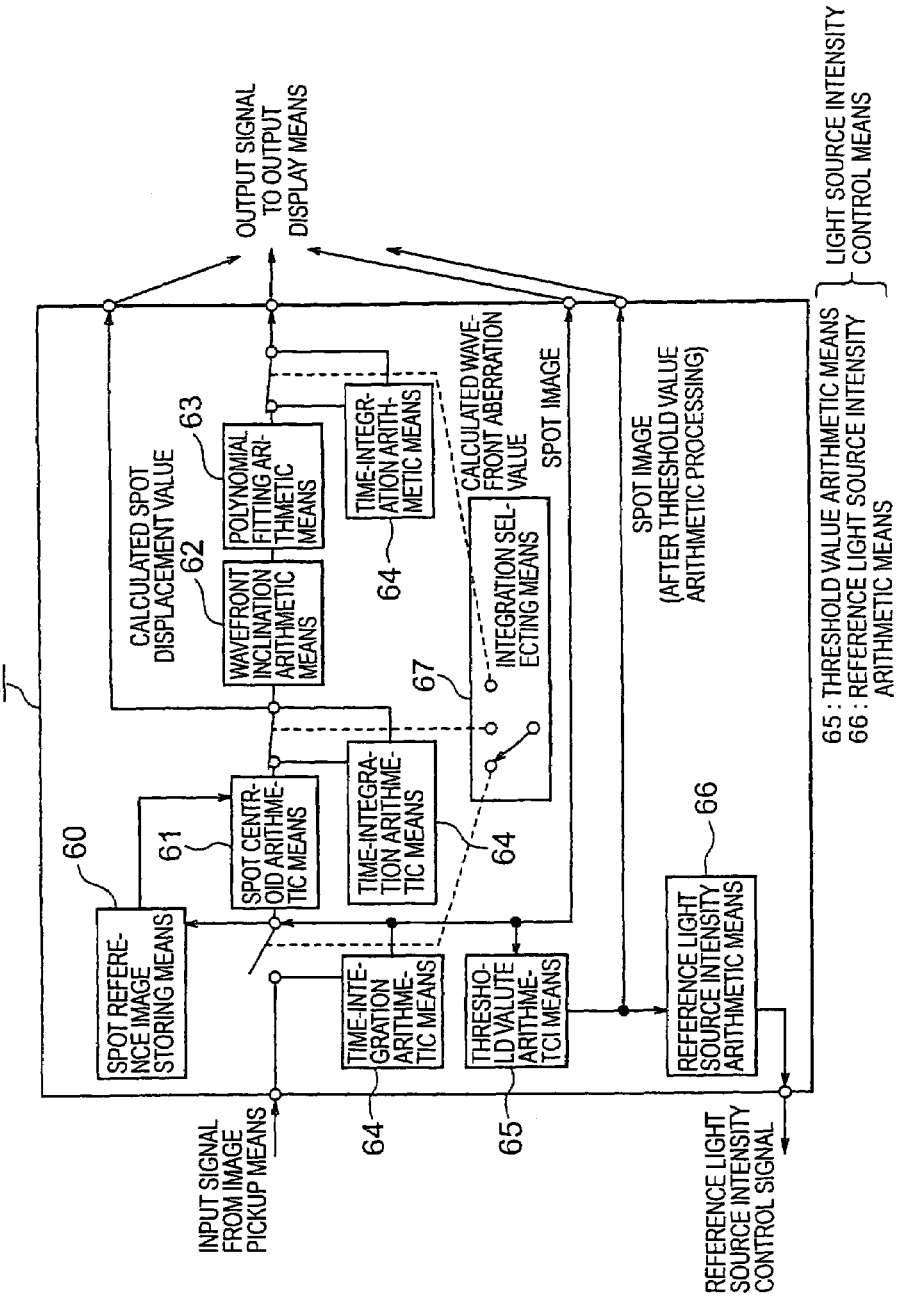
FIG. 11 is a block diagram showing an internal processing arrangement of an arithmetic means.

FIG. 11 is a functional block diagram showing an internal processing arrangement of the arithmetic means 56. The arithmetic means 56 includes a spot reference image storing means 60, a spot centroid arithmetic means 61, a wavefront inclination arithmetic means 62, a wavefront inclination polynomial fitting arithmetic means 63, and a time-integration arithmetic means 64 in order to realize the wavefront error estimating function.

For operation of the arithmetic means 56, an ideal plane mirror 58 is set at first at the position of the under-test optical system 51 in place thereof to pick up the focused light spots, the image of which is then stored in the spot reference image storing means 60. Hereinafter, this operation will be referred to as the calibration.

This calibration process has to be performed again when the wavefront aberrations vary due to change of the optical characteristics of the components except for that of the under-test optical system 51, as brought about by the change of the measurement environment. However, so far as the change or variation of the measurement environment or the influence thereof to the wavefront aberration is negligibly small, the calibration need not be carried out upon every measurement or test, but the reference image once measured may be used in common throughout.

The spot centroid arithmetic means 61 is so designed as to calculate the centroid positions in the individual fragmental apertures to thereby determine differences in the individual centroid positions between the spot reference image and the measured spot image of the object under test.

In determination of the centroids of the spot images, it must be taken into consideration that the incident light intensity is so adjusted as to fall within the finite dynamic ranges of the image pickup means 55 and the quantization means incorporated therein for the light intensity. If the maximum value of the incident light intensity should exceed the dynamic range mentioned above, the spot image as taken will become saturated, incurring undesirably error in the spot centroid position.

To cope with the problem mentioned above, a threshold value arithmetic means 65 is employed. The threshold value for the threshold value arithmetic means 65 should previously be so set as not to exceed the saturation level which is determined on the basis of the dynamic range of the image pickup means 55. In succession, presence/absence of the pixel signal which exceeds the threshold value is searched.

Unless the pixel signal which exceeds the threshold value is present, a reference light source intensity arithmetic means 66 increases the intensity of the reference light source to set ultimately the light intensity to the value just below the threshold value, i.e., the value immediately before the threshold value is exceeded. Thus, the threshold value arithmetic means 65 and the reference light source intensity arithmetic means 66 cooperate to constitute a light source intensity control means for adjusting the intensity of the output of the collimated light beam generating means 52 such that all the pixel signal values acquired through the image pickup means 55 become maximum without exceeding the predetermined threshold value.

In this way, the dynamic range of the image pickup means 55 can be utilized to a possible maximum while suppressing the centroid calculation error to a minimum. Additionally, saturation of the image pickup means 55 which is brought about due to difference in the transmissivity among the optical systems 51 to be tested and difference in the reflectance factor among the reflecting mirrors as well as variation of the background light intensity can automatically be avoided, whereby the operator can carry out the measurement conveniently and comfortably without need for paying attention to the transmissivity and the reflectance factor of the under-test optical systems 51 and the variation of the background light intensity.

In succession, the wavefront inclination arithmetic means 62 calculates the wavefront inclination on the basis of changes of the centroid positions in accordance with the undermentioned expression $$\Delta wi = \Delta xi / fMLA$$

where $\Delta xi$ represents the change of the centroid of the focused light spot formed by the i-th lens of the micro-lens array 3, fMLA represents the focal length of the micro-lens array 3, and $\Delta wi$ represents the inclination of the wavefront within the effective aperture of the i-th lens.

The inclination of the wavefront as calculated is fit to e.g. Zernike polynomial by the polynomial fitting arithmetic means 63 to thereby arithmetically determine the expansion coefficient for each of the orders. The spot image, displacement of the spot centroid position, and the wavefront aberration polynomial expanded value as determined are sent to the output/display means 28 of the succeeding stage.

By repeating the operation sequence described above, the wavefront aberration measurement can be performed repetitively at a high speed.

On the other hand, the time-integration arithmetic means 64 is designed to summate and average in time the measured image or the signals outputted from the individual arithmetic means. In the case where noise component changing at random exists within the measuring time period, the same measurement is repeated N times to perform the integration or summation-averaging operation to thereby reduce the random noise by a factor of $1/\sqrt{N}$.

The time integration- or summation-averaging operation mentioned above is performed for one of the image signal outputted from the image pickup means 55, the output signal of the wavefront aberration polynomial fitting arithmetic means 63, being selected by an integration selecting means 67.

In this conjunction, it is noted that because random noise will be admixed even at the latter stage of the arithmetic operation process, the integration or summation-averaging operation executed at the later arithmetic operation stage is more effective for the reduction of random noise. Besides, because the integration- or summation-averaging operation executed at the later stage allows the number of times the arithmetic operation is executed or overhead therefor to be reduced more effectively than the integration or summation-averaging operation of the spot image, the arithmetic operation process can be carried out at an increased speed on the whole.

Further, although it is presumed that the individual arithmetic means are realized by loading corresponding arithmetic programs in a general-purpose computer (personal computer or workstation), it should be appreciated that the dedicated arithmetic means e.g. DSP (Digital Signal Processor) capable of executing arithmetic operation at a high speed may be employed substantially to the same effect. In that case, the arithmetic module or unit can be realized on a small scale with low power consumption while enjoying high reliability.

Further, although it has been presumed that the function for quantizing the image signal is allocated to the image pickup means 55, an AD conversion means which matches with the above-mentioned DSP may be disposed at a front end of the arithmetic means. In that case, the processing seed for the image collection, transfer and the arithmetic operations can be increased as a whole.

By virtue of the features described above, the wavefront aberration measurement can be performed at a high speed on a per-aberration coefficient basis, whereby frequency analysis can be carried out for the time-dependent dispersion of the wavefront aberrations ascribable to the measurement environment factors (fluctuation of the atmosphere and the vibration), which has been impossible with the hitherto known measurement schemes of low updating rate requiring the extended-time exposure.

By performing the frequency analysis mentioned above, the integration time can be optimized in conformance with the measurement environment, which has heretofore been impossible. Besides, it is also possible to further shorten the integration or summation-average time by taking into consideration only the aberration coefficients which are indispensably required for the measurement.

Figure 12:
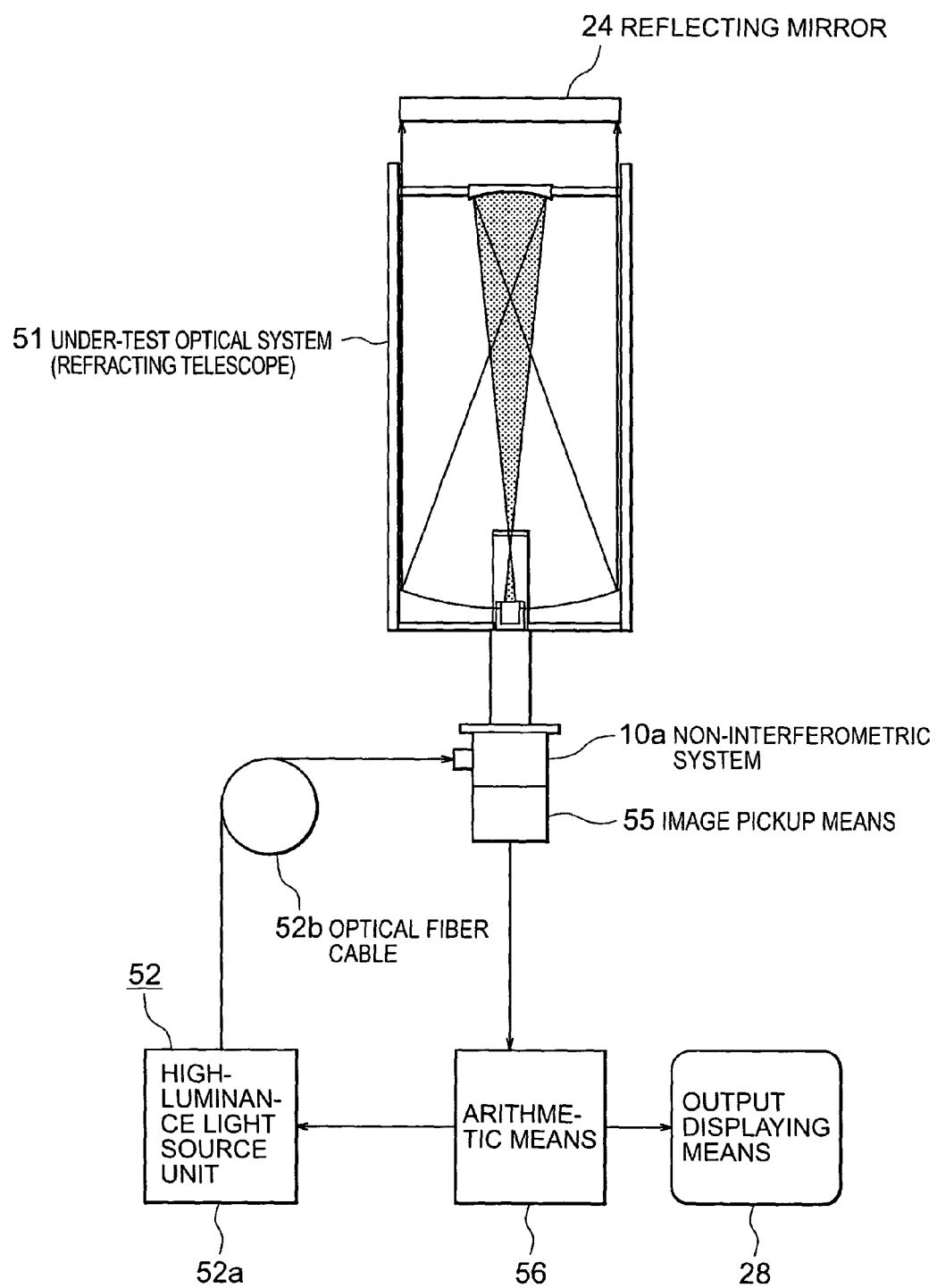
FIG. 12 is a view for illustrating the non-interferometric type wavefront measuring means.

FIG. 12 is a view for illustrating the non-interferometric type wavefront measuring means. In the case of the instant embodiment of the invention, a double-path measurement is performed for a reflecting telescope which is the under-test optical system 51 by using a reflecting mirror 24. A main housing 10a of the non-interferometric type wavefront measuring means is disposed separately from a high-luminance light source unit 52a, the arithmetic means 56 and the output display means 28. Thus, the main housing 10a can be realized in a miniaturized structure of light weight. Further, with this arrangement, the main housing 10a can fixedly be disposed directly on the under-test optical system 51, whereby the influence of the vibration and the fluctuation of the atmosphere to the under-test optical system 51 can be mitigated.

Figure 13:
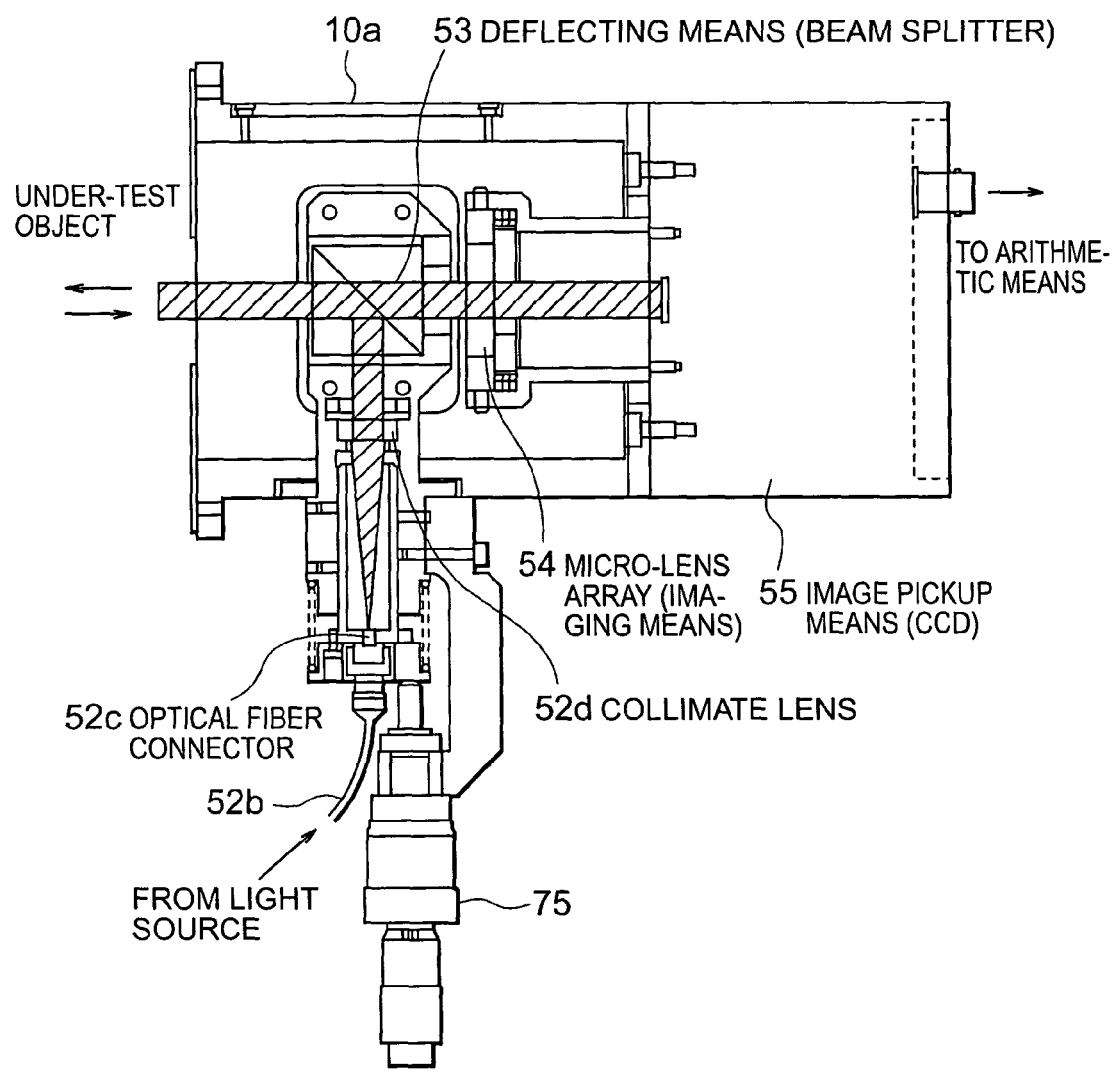
FIG. 13 is a side elevational view showing partially in section an exemplary structure of the non-interferometric type wavefront measuring means.

FIG. 13 is a side elevational view showing partially in section an exemplary structure of the non-interferometric type wavefront measuring means in the concrete. In the case of this example, the non-interferometric type wavefront measuring means is composed of an optical fiber cable 52b serving as a waveguide means for guiding a light beam emitted from a reference light source, an optical fiber connector 52c serving as a light source capable of emitting a light spot for forming a point or spot light source, a collimate lens 52d serving as a collimating means for collimating the light rays, a bending or deflecting means 53 (beam splitter) for bending or deflecting the traveling direction of the reference light beam by 90 degrees, a micro-lens array 54 for condensing the light beam propagating from the under-test optical system into a plurality of focussed light spots for every fragmental apertures, an image pickup means 55 (CCD) for picking up images of the focused light spots, and the main housing 10a for fixedly holding the individual components mentioned above.

In the case of the example now under consideration, light rays emitted from the high-luminance light source unit 52a (not shown) are guided through the optical fiber cable 52b to be emanated from a planar- or spherical-polished end face thereof and subsequently collimated to the light beam by means of the collimate lens 52d. In other words, the high-luminance light source unit 52a, the optical fiber cable 52b, the optical fiber connector 52c and the collimate lens 52d cooperate to constitute a collimated light beam generating means 52.

By making use of the optical fiber cable 52b, the high-luminance light source unit 52a and the main housing 10a of the non-interferometric type wavefront measuring means can be installed separately from each other, whereby the main housing or casing of the wavefront measuring apparatus can be implemented in a small structure and in light weight. Further, distortion of the main housing 10a ascribable to heat generation of the high-luminance light source unit 52a can be avoided in advance.

Furthermore, by using a single mode fiber or a polarization-preserving fiber as the optical fiber cable 52b, the beam profile at the exit end can be made to be of a symmetrical shape (Gaussian distribution), whereby the influence of the wavefront aberration ascribable to the distribution of light emission at the light source can be avoided.

Figure 14:
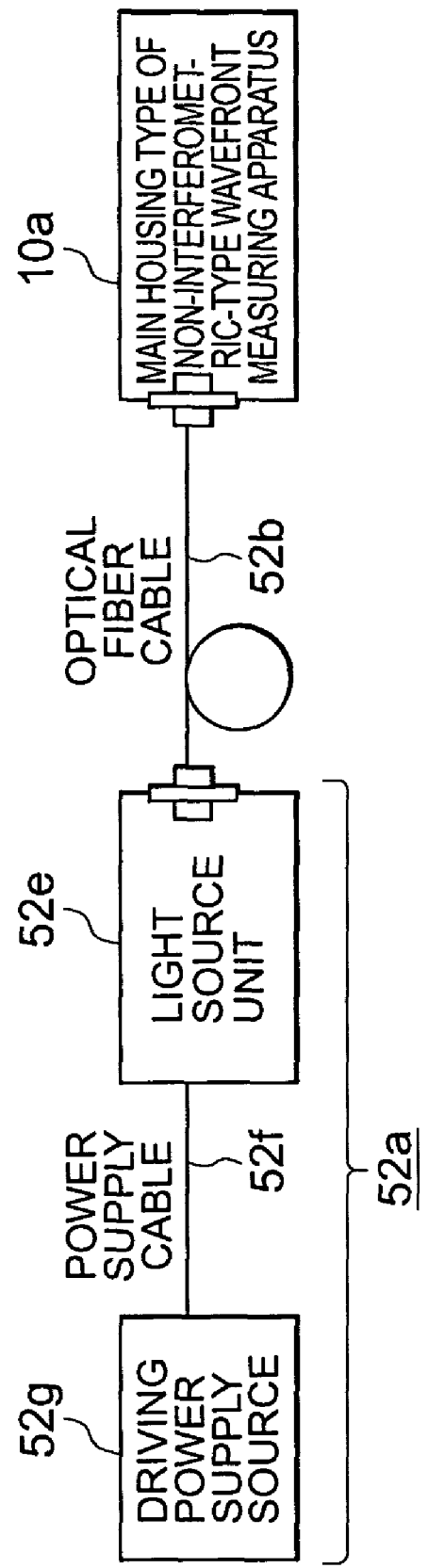
FIG. 14 is a view for illustrating an exemplary arrangement in which a high-luminance light source unit and a main housing of the non-interferometric type wavefront measuring unit are disposed separately from each other.

FIG. 14 is a view for illustrating an exemplary arrangement in which the high-luminance light source unit 52a and the main housing 10a of the non-interferometric type wavefront measuring apparatus are disposed separately from each other. In the case of the instant example, the main housing 10a of the wavefront measuring apparatus and the high-luminance light source unit 52a are separated by using an optical fiber cable 52b. Further, in the high-luminance light source unit 52a, a light source unit 52e and a driving power supply 52g for the light source unit 52e are separated from each other through the medium of a power supply cable 52f.

By virtue of the structure mentioned above, the main housing 10a can be implemented in a small size and light weight, and at the same time the influence of heat generated by the light source unit 52e can be reduced. Furthermore, by interconnecting the main housing 10a and the light source 52e by using the optical fiber cable 52b and optical fiber connectors provided at both ends of the optical fiber cable, it is possible to increase the fiber length without difficulty.

Figure 15:
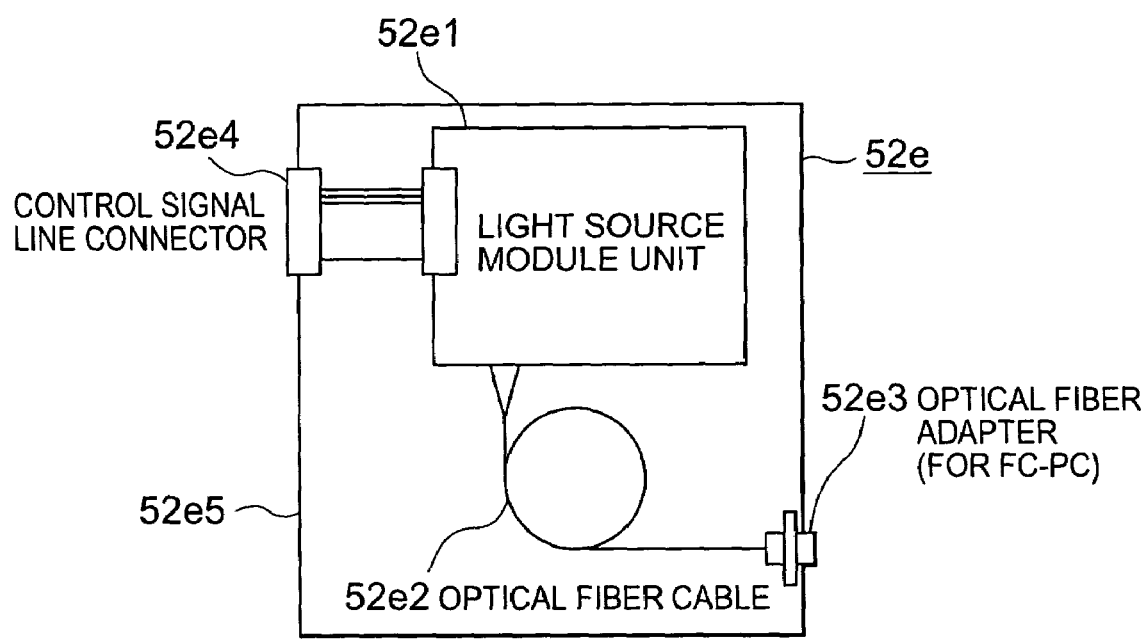
FIG. 15 is a view showing an internal structure of a light source.

FIG. 15 shows an internal structure of the light source unit 52e. The light source unit 52e is comprised of a light source module unit 52e1, an optical fiber cable 52e2, an optical fiber adapter 52e3, a control signal line connector 52e4 and a light source unit fixing case 52e5.

As the light source module unit 52e1, a reference light source of high luminance (several thousands [W/cm²] or more) and low coherence (on the order of several tens [μm] or less) is employed. In the case of the instant embodiment now under consideration, a SLD (Super Luminescent Diode) is employed as the light source. However, other light source such as a high luminance LED (Light Emitting Diode) may equally be employed. In other words, any light source may be employed so far as the conditions of high luminance and low coherence can be satisfied.

With the light source of high luminance, there can be ensured adequate signal-to-noise ratio with a short-time exposure. Further, owing to the low coherence characteristic, unwanted interference phenomena between the internal reflection light rays reflected on the front and rear surfaces of the optical element and the propagating light rays can be suppressed.

Further, in the case of the instant embodiment of the invention, a light source having the visible wavelength at the center of light emission is employed as the light source module unit 52e1. Furthermore, a mechanism capable of electrically or mechanically controlling the light intensity of the light source module unit 52e1 from the external is provided.

Parenthetically, by increasing the light intensity, the luminous flux emitted from the main housing 10a of the wavefront measuring apparatus and propagating through the space can be made to be visible. In that case, the luminous flux can be used for effecting a rough alignment between the under-test optical system 51 and the optical system deviation estimating apparatus, whereby the setup of the instrument under test can be facilitated.

Furthermore, the light source module unit 52e1 is equipped with a temperature sensor and a Peltier cooler for maintaining the temperature of the reference light source to be constant although they are not shown, wherein the light source fixing case 52e5 serves also as a heat dissipating means for the Peltier cooler. With this arrangement, the temperature of the light source unit 52e can be maintained to be constant, whereby stabilization of the emitted light wavelength can be enhanced regardless of change of the ambient temperature or the heat generation by the light source module unit 52e1 itself.

Figure 16:
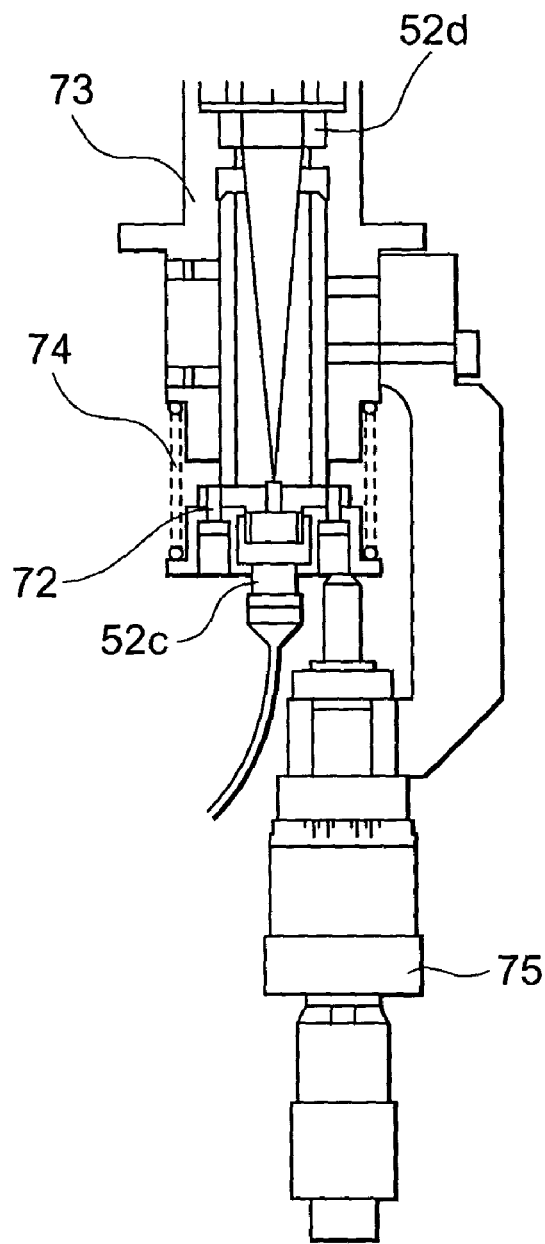
FIG. 16 is a view showing an exemplary arrangement of a major portion to be build in the main housing of the non-interferometric type wavefront measuring apparatus (upon distance/position adjustment)

FIG. 16 is a view for illustrating an exemplary arrangement of a major portion to be built in the main housing 10a of the non-interferometric type wavefront measuring apparatus (upon distance/position adjustment). The major portion to be assembled in the main housing 10a is comprised of an optical fiber connector 52c, a collimate lens 52d, an optical fiber connector holding fixture 72, a collimate lens holding fixture 73, a spring 74 and a micrometer 75.

A ferrule peripheral portion of the optical fiber connector 52c and a fixing bore surface of the optical fiber connector holding fixture 72 are fittingly secured together with a minimum tolerance. Further, the collimate lens 52d is also fittingly secured to the collimate lens holding fixture 73 with a minimum tolerance.

Furthermore, the optical fiber connector holding fixture 72 has a fitting surface having a center axis which coincides with that of a fitting surface of the collimate lens holding fixture 73 (a first fitting surface and a second fitting surface which is fittingly engageable with the first meshing surface). A moving mechanism (composed of a micrometer 75 and a spring 74) is additionally provided for moving the optical fiber connector holding fixture and the collimate lens holding fixture relative to each other in the optical axis direction of the collimate lens 52d. By virtue of the arrangement described above, adjustment of the collimate lens 52d and the optical fiber connector 52c in the out-of-axis direction is rendered unnecessary, and additionally deviation of the optical axis upon mounting/removal of the optical fiber can be suppressed to a minimum.

For the calibration mentioned previously, the spot image is picked up plural number of times with the reflecting mirror 24 being positioned at different distances from the non-interferometric type wavefront measuring apparatus, whereon the distance between the collimate lens 52d and the end face of the optical fiber connector 52c is adjusted with the aid of the micrometer 75 so that displacement of the spot image picked up becomes minimum.

At this juncture, it should be mentioned that the optical fiber connector holding fixture 72 and the collimate lens holding fixture 73 are made of different materials e.g. stainless steel and aluminum, respectively. Owing to this feature, the sliding movement of these holding fixtures can be realized smoothly. Incidentally, as the different materials to this end, there can also be mentioned stainless steel and zirconia. In addition, ceramic and a metal or a combination of metals which differ in respect to the trend for ionization may be employed.

Figure 17:
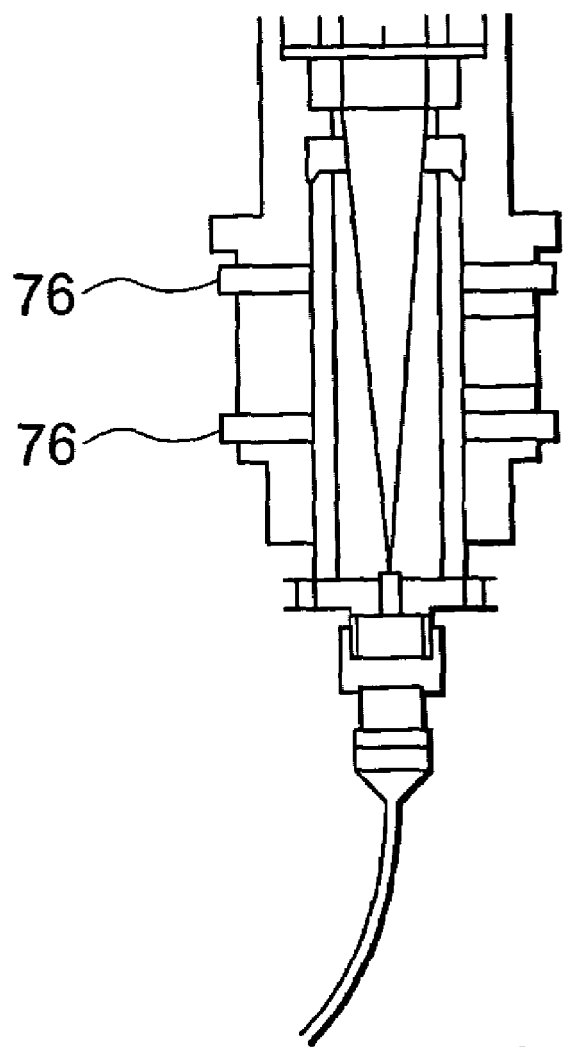
FIG. 17 is a view for illustrating the major portion in the state after adjustment of distance/positions of an end face of an optical fiber connector and a collimate lens.

FIG. 17 is a view for illustrating the major portion in the state after the adjustment of the positions of the end face of the optical fiber connector 52c and the collimate lens 52d or distance therebetween. After adjustment of the position or distance of or between the end face of the optical fiber connector 52c and the collimate lens 52d has been done, the optical fiber connector holding fixture 72 and the collimate lens holding fixture 73 are fixedly secured by means of fixing screws 76 serving as the relative position securing means, while the micrometer 75 and the spring 74 employed as the moving mechanism for the adjustment are detached from the major portion. With the structure described above, the main housing 10a of the non-interferometric type wavefront measuring apparatus can be implemented in further reduced size and weight.

EMBODIMENT 3

Next, description will be made of another embodiment of the invention which is designed for estimating deviation or divergence in the optical system on the basis of the results of wavefront measurement.

Incidentally, in the case of the instant embodiment of the invention, it is presumed that the wavefront is measured through an interferometry. It should however be appreciated that non-interferometric measuring means described previously in conjunction with the embodiments 1 and 2 can be employed essentially to the same effects.

Figure 18:
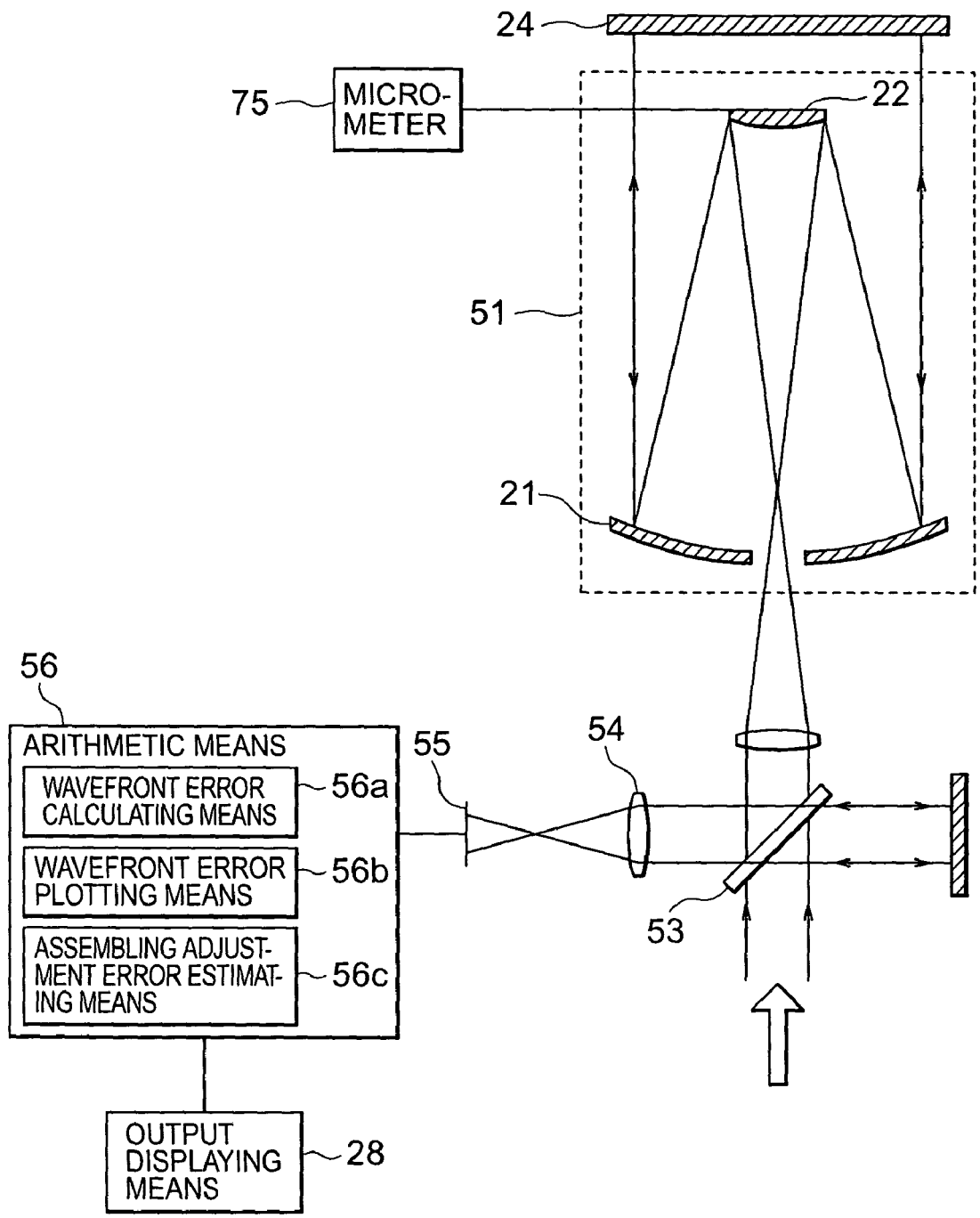
FIG. 18 is a view illustrating the optical system deviation estimating apparatus according to a third embodiment of the present invention.

FIG. 18 is a view showing the optical system deviation estimating apparatus according to a third embodiment of the present invention. In FIG. 18, reference numeral 56 denotes an arithmetic means, and 28 denotes an output displaying means. In the arithmetic means 56, there are incorporated a wavefront error calculating means 56a, a wavefront error plotting means 56b and an assembling adjustment error estimating means 56c.

A plurality of micrometers 75 are mounted on a frame (not shown) for supporting a secondary mirror 22. By pushing in and pulling out the secondary mirror 22 by the means of the micrometers 75 under manipulation of the operator, the position, the angle and the orientation of the secondary mirror 22 can universally be adjusted.

An image pickup means 55 is disposed at an interference fringe detecting plane for taking the image of the interference fringes, which image is then converted into video or image data. The wavefront error calculating means 56a is designed to arithmetically determine wavefront error distribution on the basis of the image data derived from the interference fringes as picked up. On the other hand, the wavefront error plotting means 56b is designed to process the measured values of the arithmetically determined wavefront errors in accordance with a method described later on to thereby output the result of the processing to the output displaying means 28. The output displaying means 28 is constituted by a CRT display or the like for displaying the output of the wavefront error plotting means 56b in the form of characters and/or graphics which are visibly presented to the operator.

Figure 19:
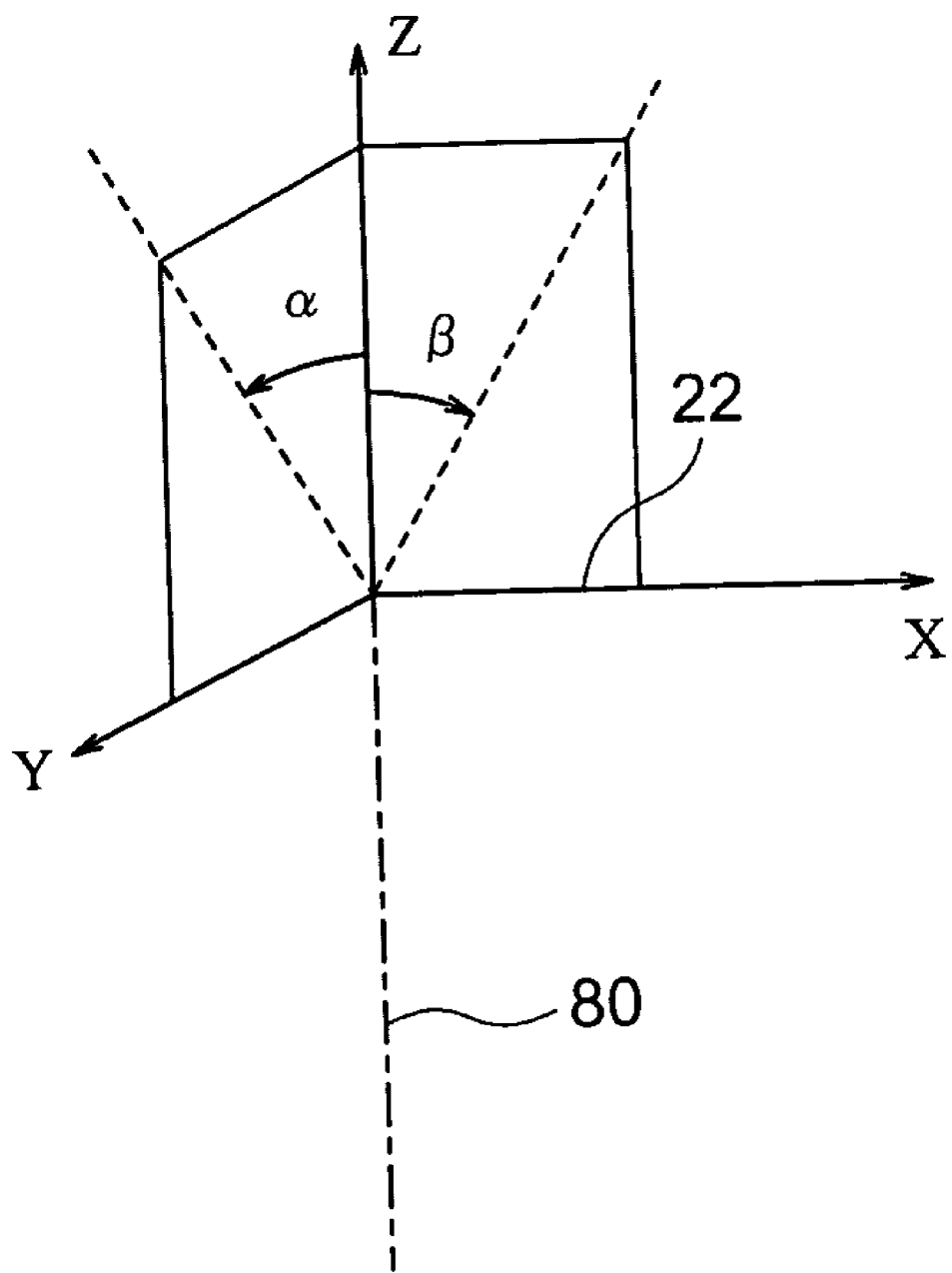
FIG. 19 is a view for illustrating assembling adjustment factors relating to the secondary mirror.

Next, description will be made of assembling adjustment factor for the secondary mirror 22. FIG. 19 is a view for illustrating the assembling adjustment factors relating to the secondary mirror 22. Incidentally, in FIG. 19, like reference numerals and symbols as those used in FIG. 18 denote same contents. Accordingly, repeated description thereof is omitted. Reference numeral 80 denotes the optical axis of the primary mirror 21. The positional error which is one factor of the assembling adjustment errors of the secondary mirror 22 is defined by a three-dimensional orthogonal coordinate system XYZ having the origin which represents the ideal position of the intersecting point between the optical axis and the reflecting surface of the secondary mirror. Further, the origin of the coordinate system XYZ lies on the optical axis 20. The XY-plane intersects orthogonally the optical axis 20, while the axis Z extends on and along the optical axis 20.

An angular error which is one factor of the assembling adjustment errors relating to the secondary mirror 22 is defined as an angle formed between the optical axis of the secondary mirror 22 and the optical axis 80. Of the angular error, the component projected onto the YZ-plane is represented by $\beta$ while the component projected onto the XZ-plane is represented by $\alpha$.

As the assembling adjustment factors for the secondary mirror 22, there can be mentioned the five factors X, Y, Z, $\alpha$ and $\beta$. In the description of the instant embodiment of the invention, it is presumed that the assembling adjustment error factors X, Z and $\beta$ are sufficiently small and thus the adjustment is performed solely for the error factors Y and $\alpha$.

Figure 20:
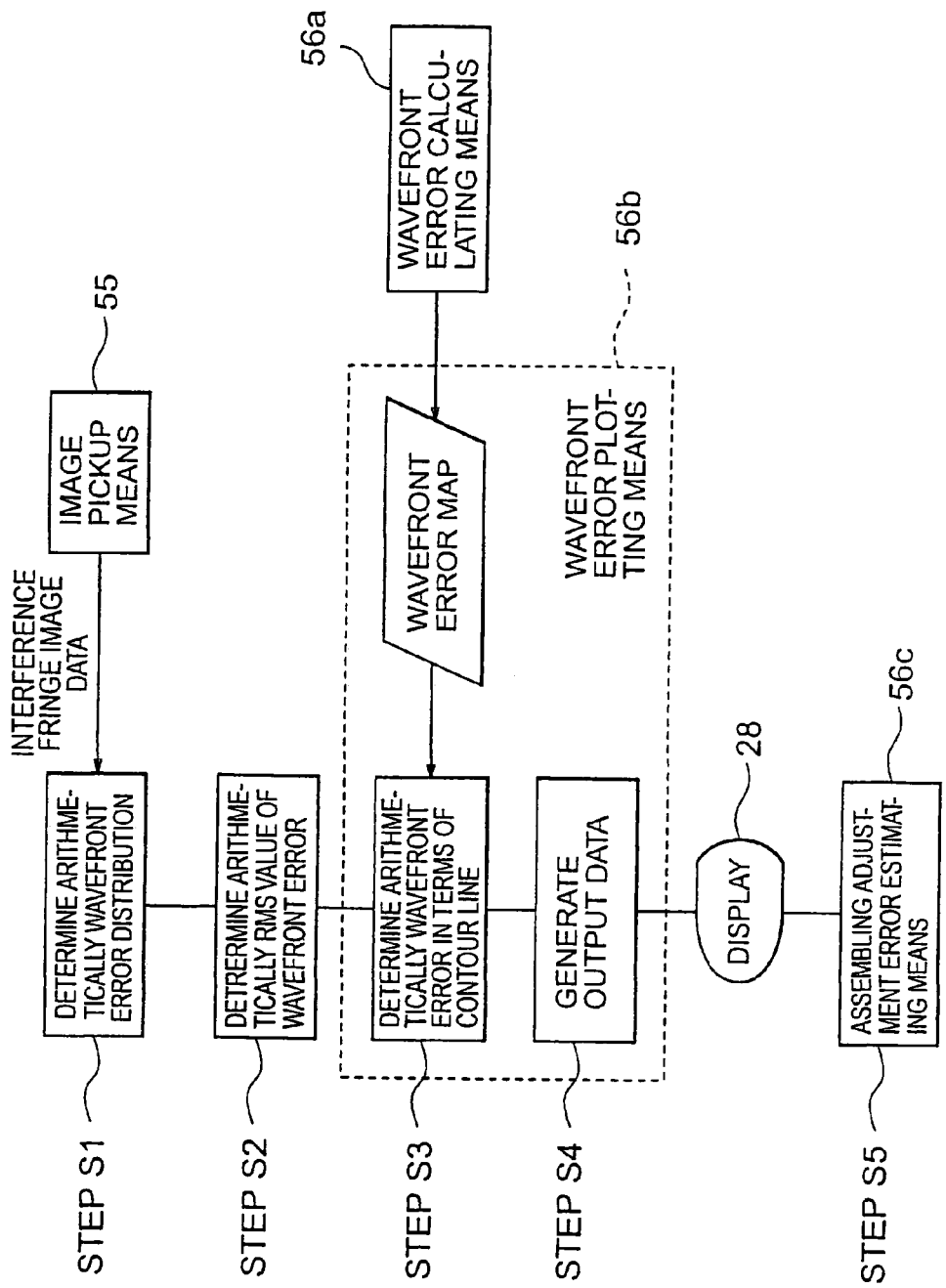
FIG. 20 is a flow chart for illustrating flow of processings executed by an arithmetic means according to the third embodiment of the invention.

FIG. 20 is a flow chart for illustrating flow of processings executed by the arithmetic means 56. In a step S1, a two-dimensional distribution of the wavefront error is arithmetically determined on the basis of the interference fringe image data derived from the output of the image pickup means 55. In a step S2, RMS value of the wavefront error is computed from the two-dimensional distribution of the wavefront error determined in the step S1.

In a step S3, the wavefront error determined in the step S2 is plotted on a wavefront error map which is generated by the wavefront error calculating means 56a, as will be described later on. In a step S4, graphic or chart or characters to be outputted to the output displaying means 28 are generated. Incidentally, the processings in the steps S3 and S4 are executed by the wavefront error plotting means 56b.

Figure 21:
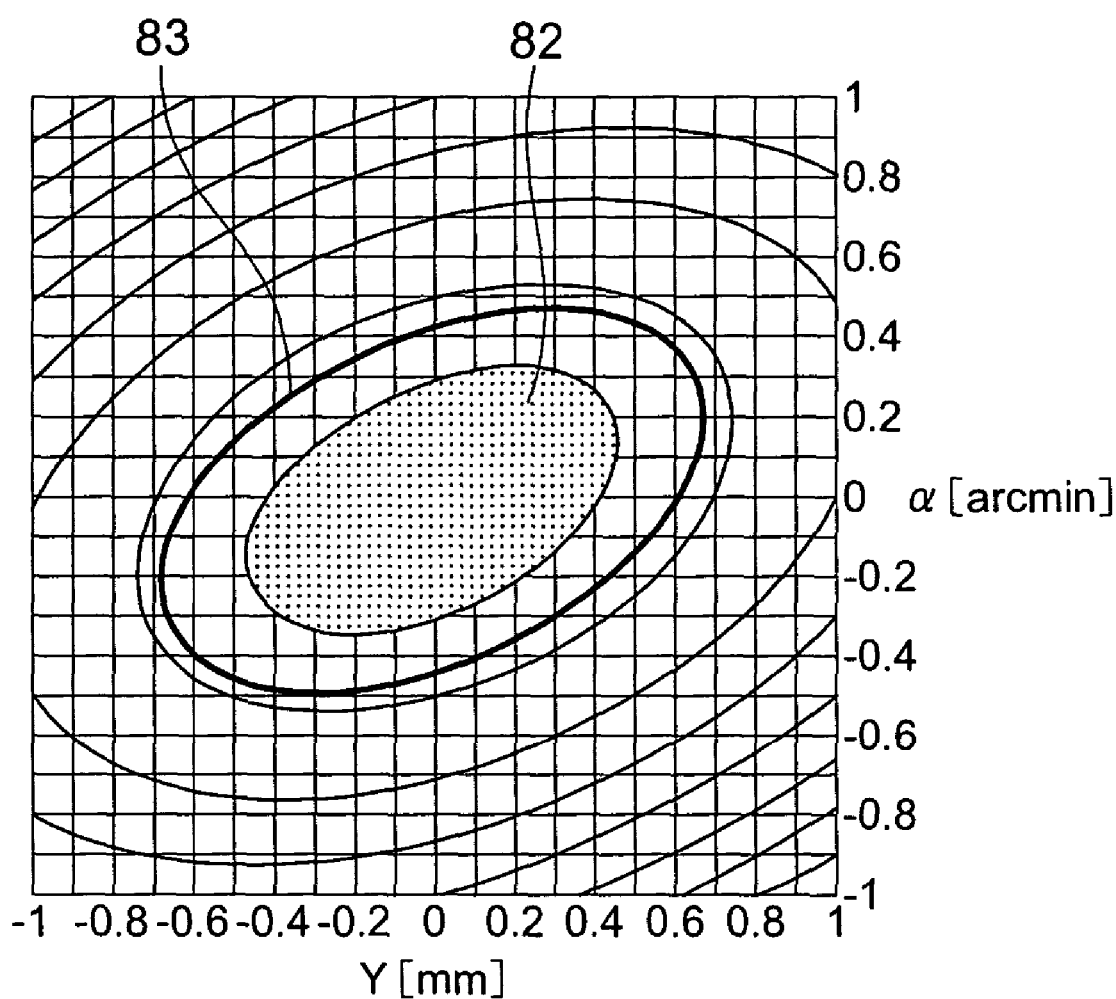
FIG. 21 is a view showing an example of a wavefront error map of a contour representation which is used in a step S3 shown in FIG. 20.

FIG. 21 is a view showing an example of the wavefront error map of contour representation which is used in the step S3 shown in FIG. 20. The wavefront error calculating means 56a generates the wavefront error map by resorting to the plotting method described below. Namely, by making use of design data of the reflecting telescope which is the optical system under test, the wavefront error calculating means 56a numerically determines the wavefront error due to the assembling adjustment error by resorting to a ray tracing technique, to thereby generate two-dimensional map data or alternatively the function (formulae) which contains the assembling adjustment error as a parameter.

On the basis of the data obtained in this way, the wavefront error plotting means 56b plots the wavefront error in terms of contour representation or three-dimensional diagram in which the assembling adjustment error components are taken along the orthogonal coordinates axes, respectively, as can be seen in FIG. 21.

In a step S5, the assembling adjustment error estimating means 56c estimates the assembling adjustment error on the basis of the representation outputted from the wavefront error plotting means 56b. In practical applications, operation of the assembling adjustment error estimating means 56c may be carried out under manipulation of the operator in accordance with his or her discretion.

Referring to FIG. 21, a region 82 represents the region in which the wavefront error is not greater than a permissible value. By displaying the wavefront error in this manner, the operator can easily know the precision of the assembling adjustment as desired. Further, a solid line 83 represents the contour indicating the measured wavefront error components determined arithmetically in the step S2 shown in FIG. 20. On the basis of the distances between the points on the contour 83 and the origin, magnitudes of the assembling adjustment error components can easily be known.

EMBODIMENT 4

In the case of the third embodiment of the invention, the wavefront error map is generated in the step S4 shown in FIG. 20 to be outputted straightforwardly to the output displaying means 28. However, such scheme can equally be adopted that the wavefront error plotting means 56b determines the assembling adjustment error components on the basis of the wavefront error map, whereon the assembling adjustment error components are displayed in the form of numerical values or graphs.

As the assembling adjustment error, combinations of all the error components Y and α on the contour 83 can be conceived, and it is impossible to specify the error at any single point. In that case, however, the position on the contour 83 can approximately be estimated on the basis of change of the output as brought about by changing the error component Y or α independently with the aid of the micrometer 75.

In the foregoing description, it has been presumed that the error factors or components X, Z and β of the assembling adjustment error are sufficiently small and thus the adjustment is performed only for the error factors or components Y and α. Needless to say, the presumption mentioned above can be expressed in more general form that in the case where given three of the assembling adjustment error factors or components are sufficiently small, then adjustment may be performed only on the two remaining error factors or components.

EMBODIMENT 5

For estimating the assembling adjustment error, the embodiments 3 and 4 of the invention described above is so implemented that manipulation of the micrometer 75 and measurement of the wavefront error are repetitively performed a number of times. Consequently, lots of time is required for the assembling adjustment.

With the instant embodiment, it is contemplated to improve the arrangements described hereinbefore in conjunction with the third and fourth embodiments such that estimation of the assembling adjustment error can be accomplished within a shorter time. The instant embodiment of the invention is essentially same as the third and fourth embodiments except for the difference in respect to the contents of the processings executed by the arithmetic means 56. Accordingly, in the description which follows, repeated elucidation of the matters already explained will be omitted.

Figure 22:
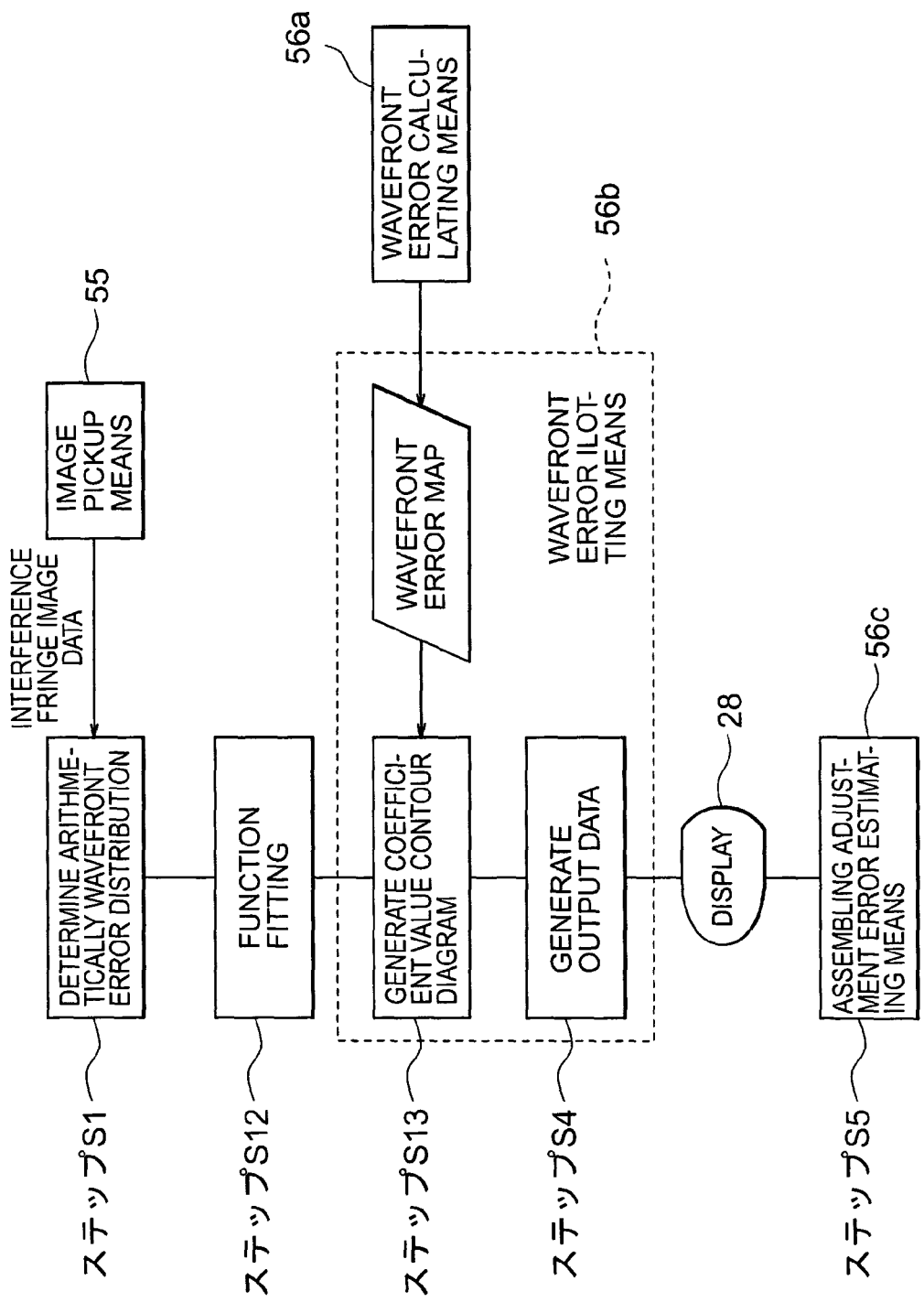
FIG. 22 is a flow chart for illustrating flow of the processings executed by an arithmetic means according to a fifth embodiment of the invention.

In the following, description will be made concerning the contents of the processings executed by the arithmetic means 56 according to the teaching of the invention incarnated in the instant embodiment. FIG. 22 is a flow chart for illustrating flow of the processings executed by the arithmetic means 56 according to the instant embodiment. In this figure, like reference symbols or numerals as those shown in FIG. 20 denote the equivalent functions. Accordingly, repeated description thereof is omitted. In a step S12, the wavefront error distribution determined arithmetically in the step S1 is fit to the polynomial WFE which is functions of n terms represented by the orthogonal coordinates (X, Y) on the wavefront error definition plane, as given by the undermentioned expression (1).

$$WFE(X,Y)=C_1 \cdot G_1(X,Y)+C_2 \cdot G_2(X,Y)+ \ldots +C_n \cdot G_n(X,Y) \quad (1)$$

where $C_k$ (k=1 to n) represents the coefficient of the k-th term, $G_k$ (k=1 to n) represents the function of the k-th term, and n represents the number of the terms. The output of the step S12 contains the coefficient values of the individual terms of the polynomial.

In a step S13, the coefficient values determined arithmetically in the step S12 are entered in the wavefront error map. In the following, description will be made of a method of plotting the wavefront error map and a method of estimating the assembling adjustment error on the basis of the wavefront error map. These methods are carried out in the step S13. The assembling adjustment error factors x, y, z, α and β of the secondary mirror 22 are generalized to $a_1, a_2, \ldots a_i$. The coefficient $C_k$ of the polynomial bears a functional relation to the alignment adjustment error $a_k$ and thus can be represented by $C_k (a_1, a_2, \ldots a_i)$.

It is supposed that a given coefficient $C_k$ is represented by a function $F_1(a_i)$ of one assembling adjustment error factor $a_i$ and bears no correlation to the assembling adjustment error factors except for error factor $a_k$.

$$C_k = F_1(a_i) \quad (2)$$

$$\frac{\partial C_k}{a_j} = 0 \quad (j \neq i) \quad (3)$$

Figure 23:
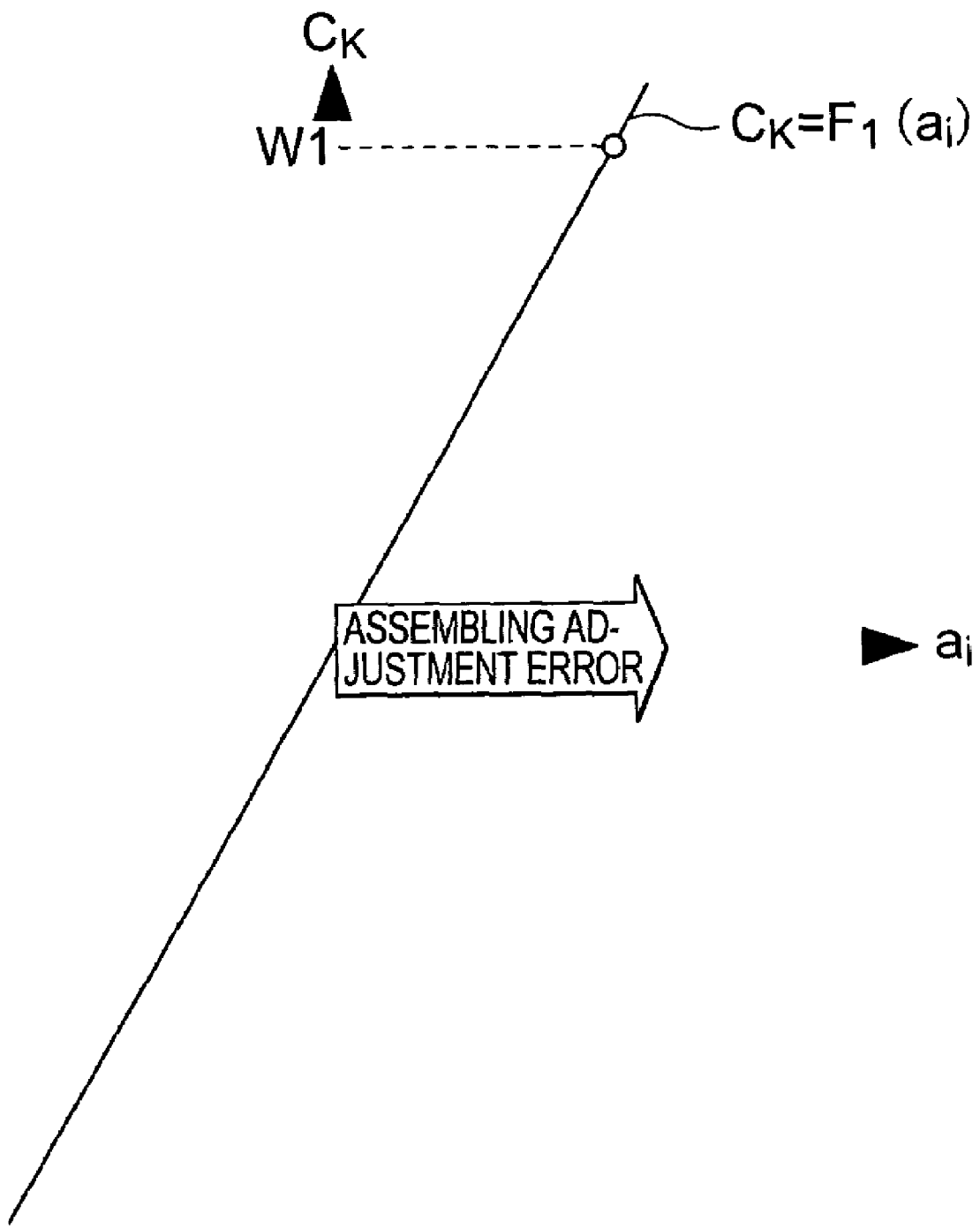
FIG. 23 is a view showing an example of the wavefront error map generated in accordance with the fifth embodiment of the invention.

When the coefficient $C_k$ determined in the step S2 is given by $C_k$=W1, then the wavefront error map such as illustrated in FIG. 23 is generated in a step S3. When the value W1 of the coefficient $C_k$ can be determined from the map shown in FIG. 23, the assembling adjustment error factor $a_i$ can easily be estimated. The function $F_1(a_i)$ mentioned previously is determined through a numerical calculation procedure based on the ray tracing for the design data of the optical system under test.

EMBODIMENT 6

Next, it is supposed that a given coefficient $C_{k1}$ can be represented by a function $F_2(a_i, a_j)$ of two given assembling adjustment error factors $a_i$ and $a_j$. Namely, $$C_{k1}=F_2(a_i,a_j) \quad (4)$$

Similarly, it is supposed that a coefficient $C_{k2}$ differing from the coefficient $C_{k1}$ is represented as follows.

$$C_{k2}=F_3(a_i,a_j) \quad (5)$$

Figure 24:
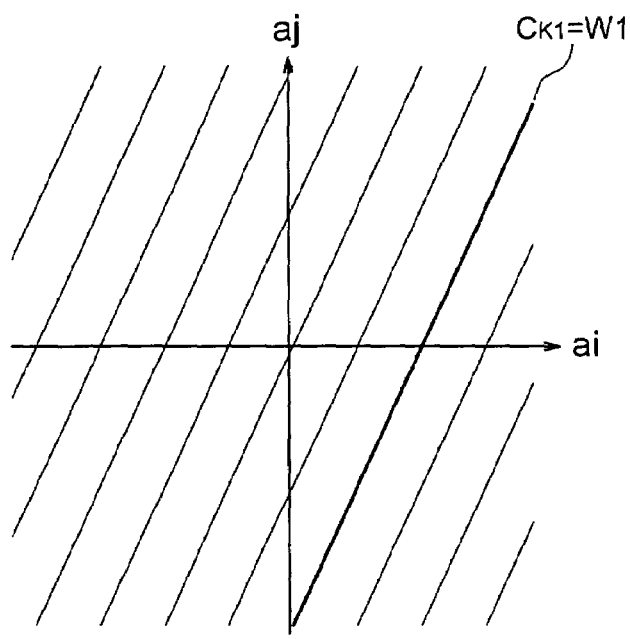
FIG. 24 is a view showing an example of the wavefront error map generated in accordance with a sixth embodiment of the invention.
Figure 25:
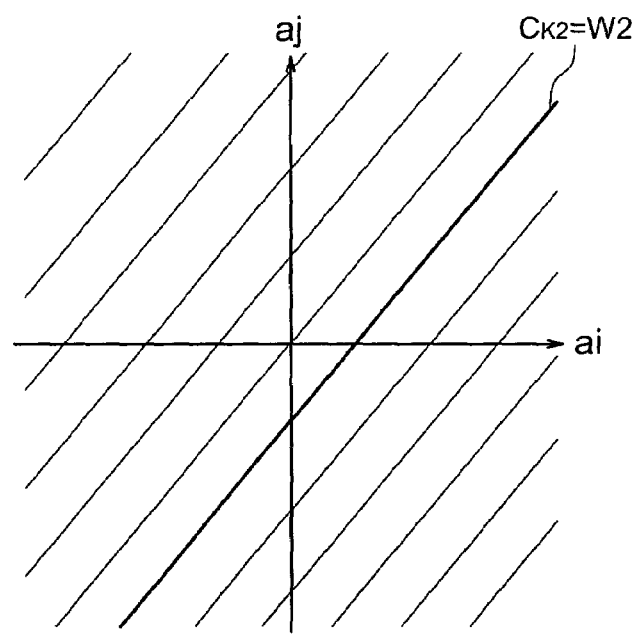
FIG. 25 is a view showing an example of the wavefront error map generated in accordance with the sixth embodiment of the invention.

According to the teaching of the invention incarnated in the instant embodiment thereof, wavefront error maps shown in FIGS. 24 and 25, respectively, are generated in the step S4. When the results of measurements of $Ck_1$ and $C_{k2}$ are given by W1 and W2, respectively, contours of the measurement values W1 and W2 are entered, as shown in FIGS. 24 and 25, respectively.

Figure 26:
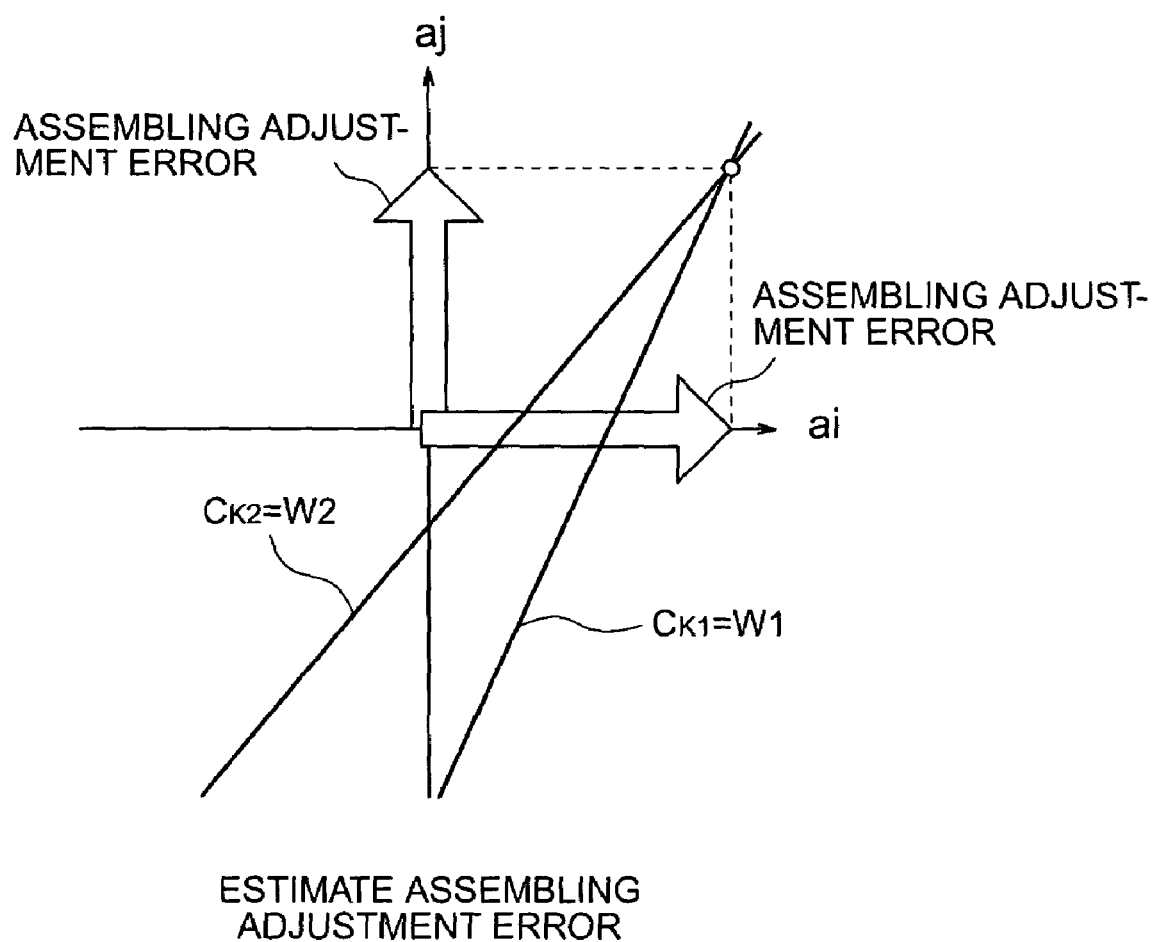
FIG. 26 is a view showing a method of estimating assembling adjustment errors as carried out by an assembling adjustment error estimating means.

The assembling adjustment error estimating means 56c is so designed that when the intersection of the contours of the measured value W1 and W2 on the wavefront error maps is represented by a single point, as shown in FIG. 26, the assembling adjustment error factors $a_i$ and $a_j$ are estimated from the coordinates of the intersection.

EMBODIMENT 7

In the fifth and sixth embodiments of the invention, the assembling adjustment error factors are estimated from the wavefront error maps illustrated. As a variation or modification of the fifth embodiment, an inverse function of the expression (2) is determined, whereon the assembling adjustment error factors are automatically estimated by the wavefront error plotting means 56b to be subsequently outputted to the output displaying means 28 in the form of numerical values, graphs or the like.

EMBODIMENT 8

Alternatively, as another modification of the embodiment 6, inverse functions of the expressions (4) and (5) are determined and then the assembling adjustment error factors are estimated by determining analytically the solution $(a_i, a_j)$ of these two inverse functions which are regarded as the simultaneous equations.

EMBODIMENT 9

In the following, description will be made of concrete examples of the assembling adjustment error estimating means mentioned previously in conjunction with the sixth to eighth embodiments. In the case of the instant embodiment of the invention, it is supposed that the reflecting telescope 51 is of the Gregory type. Further, as the polynomial given by the expression (1), Zernike polynomial is employed. Although the Zernike polynomial is represented generally in a polar coordinates system, the Zernike polynomial is defined with the orthogonal coordinates system (X, Y) through coordinate transformation according to the invention incarnated in the instant embodiment. Individual terms of the Zernike polynomial are shown in FIG. 27. In the Zernike polynomial, the coefficients of the polynomial are represented, respectively, by symbols Anm and Bnm (where n=0, 1, 2 . . . and m=0, 1, 2. . . ).

In conjunction with the instant embodiment of the present invention, the following has been made clear through analysis based on the ray tracing.

(1) Zernike coefficients $A_{11}$ and $A_{31}$ are represented in terms of the functions of the assembling adjustment errors x and β, respectively, independently of the other assembling adjustment error factors.

(2) Zernike coefficients $B_{11}$ and $B_{31}$ are represented as the functions of the assembling adjustment error factors y and α, respectively, independently of the other assembling adjustment error factors.

(3) Zernike coefficient $A_{20}$ is represented as the function of the assembling adjustment error factor z independently of the other assembling adjustment error factor.

According to the teaching of the present invention incarnated in the instant embodiment, the results of the analysis mentioned above are made use of for generating the wavefront error maps of $A_{11}$ and $A_{31}$, respectively, to thereby estimate the assembling adjustment error factors x and β. Further, by generating the wavefront error map of $B_{11}$, and $B_{31}$, assembling adjustment error factors y and α are estimated. Additionally, by generating the wavefront error map of $A_{20}$, the assembling adjustment error factor z is estimated.

Since the method of estimating the assembling adjustment error factor z is apparent from the description of the sixth and seventh embodiments in view of the condition (3) mentioned above, repeated description will be unnecessary. Furthermore, estimation of the assembling adjustment error factors x and β differs from that for the assembling adjustment error factors y and α in respect to the coordinate system as adopted and is utterly same as the latter in respect to the procedure. Accordingly, only the estimation method of x and β will be described.

Through analysis, the relational expression mentioned below is derived from the expressions (4) and (5).

$$\begin{cases} A_{11}(x, \beta) = px + q\beta \\ A_{31}(x, \beta) = rx + s\beta \end{cases} \quad (6)$$

where p, q, r and s represent constants, respectively.

The analysis procedure is carried out in the manner described above.

(i) For x=0, $A_{11}/\beta$ and $A_{31}/\beta$ are determined by calculation and represented by p and r, respectively.

(ii) For β=0, $A_{11}/x$ and $A_{31}/x$ are determined by calculation and represented by q and s, respectively.

(iii) The wavefront error measured is expanded to Zernike polynomial to thereby determine $A_{11}$ and $A_{31}$.

(iv) The quantities p, q, r, s, $A_{11}$ and $A_{31}$ determined in (i) to (iii) are placed in the expression (6) to solve the simultaneous equations of x and β.

Through the procedure described above, the assembling adjustment error factors x, y, z, α and β can independently be determined from the value of the wavefront error measured only once.

EMBODIMENT 10

The influence of A11 and B11 mentioned above in conjunction with the ninth embodiment exerted to the image forming performance is seen only in the change of the image forming position and any appreciable obscureness is involved in the formed image. Accordingly, the influence is generally negligible in most of the practical applications. The instant embodiment of the invention is directed to the assembling adjustment error estimation method on this presumption.

For the same reason as mentioned in conjunction with the ninth embodiment, description of the assembling adjustment error estimation method concerning z, y and α is omitted. Thus, the description which follows will be directed to only the method of estimating x and β.

Figure 28:
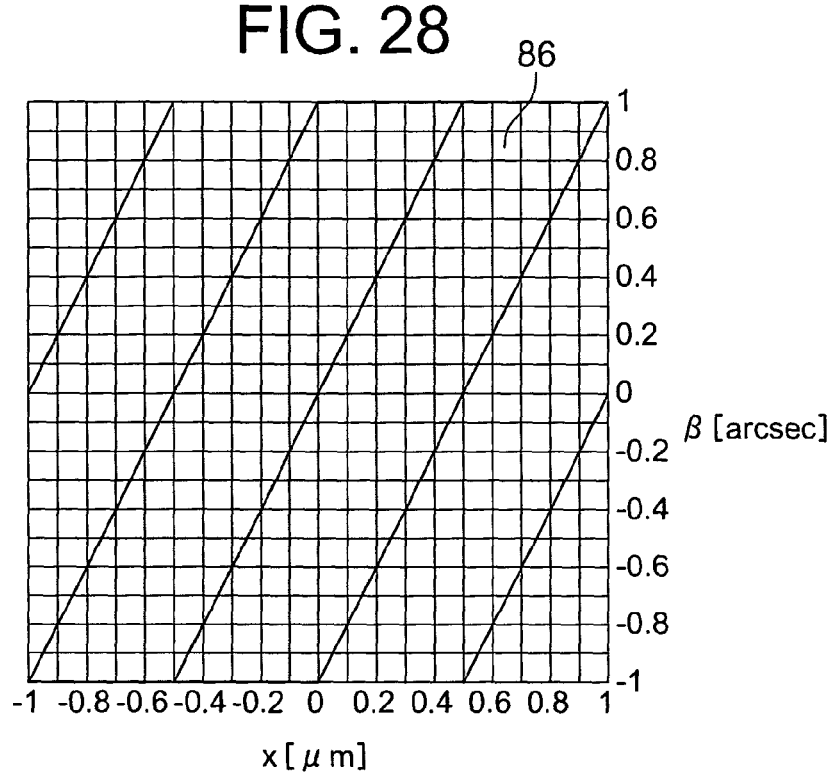
FIG. 28 is a view showing an example of the wavefront error map generated in accordance with a tenth embodiment of the invention.

FIG. 28 shows a wavefront error map used in the instant embodiment of the invention. In this figure, reference numeral 86 denotes an assembling adjustment error target.

When the wavefront error ascribable to the assembling adjustment error factors x and β of the optical system under test is approximated with the Zernike polynomial, the terms relating to $A_{11}$ and $A_{31}$ become predominant. Further, for the reason mentioned previously, $A_{11}$ can be neglected. Accordingly, it is sufficient to consider only $A_{31}$. Thus, representing by $WFE_1$ (λ PMS) the wavefront error which affects the image forming performance of the optical system under test, dependence of x and β of the wavefront error $WFE_1$ (λRMS) can be given by the following expression.

$$WFE_1 \cong \sqrt{\frac{A_{31}^2(x, \beta)}{8}} \quad (7)$$

Dependence of $A_{31}$ on x and β can be given by the expression (6). Thus, the contour concerning a given $WFE_1$ can be plotted on the wavefront error map by resorting to the expression (6) and (7).

At this juncture, it is presumed that the target of the assembling adjustment is to satisfy the condition given by the undermentioned expression, where $WFE_{1max}$ represents a threshold value set based on the permissible error of the wavefront error $WFE_1$.

$$WFE_1 \leq WFE_{1max} \quad (8)$$

From the expressions (6) and (7), it can be seen that $x$ and $\beta$ which satisfies the condition that $WFE_1 = WFE_{1MAX}$ are represented by two straight lines given by the following expression.

$$\beta = -\frac{r}{s}x \pm \frac{2\sqrt{2} \cdot WFE1}{s} \quad (9)$$

The region defined between the two straight lines mentioned above represents the assembling adjustment error target range 86.

As is apparent from the above, according to the teaching of the invention incarnated in the instant embodiment, the assembling adjustment error target range 86 is plotted in the form of a band-like zone on the wavefront error map. Next, description will turn to the method of estimating the assembling adjustment error by referencing this wavefront error map.

In a step S12, the wavefront error as measured is expanded to the Zernike polynomial to derive that $A_{31} = W1$. Subsequently, a straight line given by the undermentioned expression is plotted on the wavefront error map shown in FIG. 28.

$$W_1 = rx + s\beta \quad (10)$$

Figure 29:
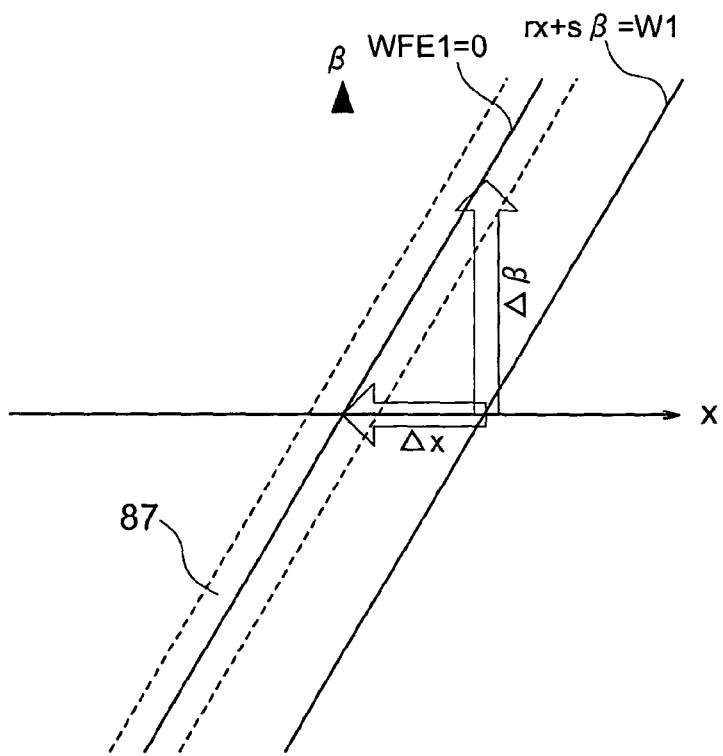
FIG. 29 is a view for illustrating a wavefront error map in which a straight line is translated or moved in parallel.

The straight line given by the expression (10) corresponds to the straight line which satisfies the condition that $A_{31} = 0$ and which is translated (i.e., moved in parallel) in the manner illustrated in FIG. 29. Thus, in order that $x$ and $\beta$ fall within the assembling adjustment error target range 86, it is sufficient to adjust either one of $x$ or $\beta$ by the magnitude indicated by arrow in the figure.

As is apparent from the above, by making use of the wavefront error map, the assembling adjustment error factors can easily be determined.

In the foregoing description, only $A_{31}$ is taken into consideration. However, in practice, second-order wavefront error will make appearance more or less in dependence on $x$, $\beta$. Accordingly, in the case where $x$ and $\beta$ are extremely large even though they lie within the assembling adjustment error target range 86, the second-order wavefront error may become non-negligible. Accordingly, it is necessary to prevent $x$ and $\beta$ from becoming extremely large. To this end, an alignment telescope method known heretofore may be adopted.

EMBODIMENT 11

In the tenth embodiment of the invention, the assembling adjustment error factors are estimated and determined visually by using the wavefront error map. As a variation or modification of the tenth embodiment, the arithmetic means 56 may be so designed as to estimate the assembling adjustment error factors and output them to the output displaying means 28 in the form of numerical value or graph. In that case, the adjustment quantities $\Delta x$ and $\Delta \beta$ can be given by the following expressions.

$$\Delta x = \frac{W1}{r} \quad (11)$$

$$\Delta \beta = \frac{W1}{S} \quad (12)$$

EMBODIMENT 12

In the case of the third to eleventh embodiments of the invention, the interference measuring method is adopted as the means for evaluating the wavefront error. Although the interference measuring method exhibits a high-resolution power, it is susceptible to the influence of the fluctuation of the atmosphere and the vibration. Besides, the interferometer apparatus is heavy on the order of several ten kilograms and requires much time and labor in handling. Moreover, a lot of time is taken for measuring the wavefront error even for rough adjustment, as described hereinbefore. In brief, the interferometer apparatus is inconvenient. With the invention incarnated in the instant embodiment, it is contemplated as an object to improve the interference measuring method by eliminating the disadvantages mentioned above.

Figure 30:
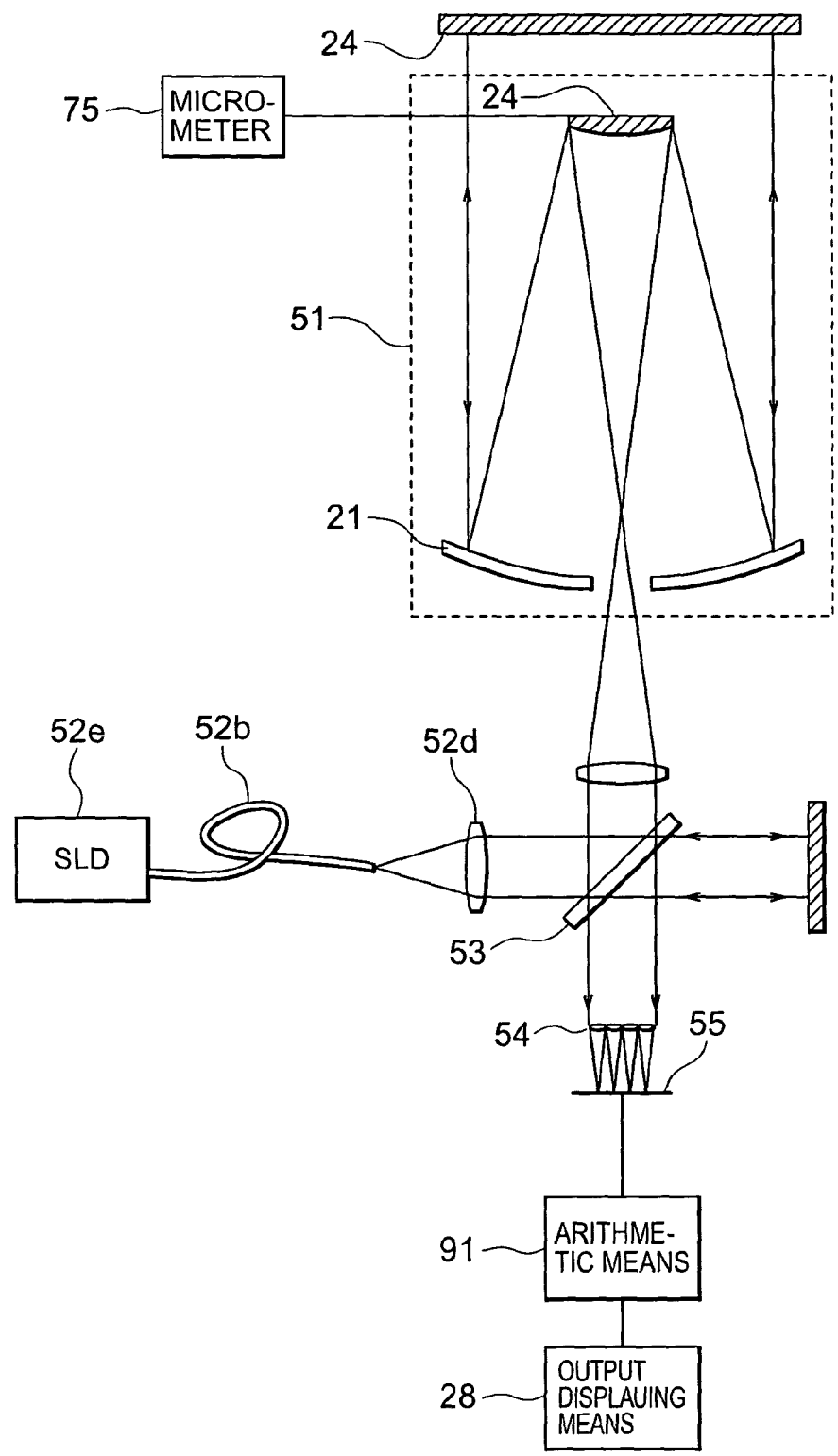
FIG. 30 is a view showing the optical system deviation estimating apparatus according to a twelfth embodiment of the present invention.

FIG. 30 is a view showing the optical system deviation estimating apparatus according to the instant embodiment of the present invention. In this figure, like parts or portions equivalent to those shown in FIG. 18 are denoted by like symbols or numerals, and description thereof is omitted. In FIG. 30, reference character 52e denotes a SLD (Super Luminescent Diode), 52b denotes an optical fiber cable, 54 denotes a micro-lens array and numeral 91 denotes an arithmetic means.

The wavefront error measuring method with the apparatus of the arrangement shown in FIG. 30 will hereinafter be referred to as Schack-Hartmann method. The SLD 52e is a light source which features high luminance, low coherence and a narrow wavelength band. Light emitted from this light source is guided to a predetermined location through the optical fiber cable 52b, wherein an exit end of the optical fiber cable 52b functions as a spot light source.

The spot light source is transformed into a collimated light beam by the collimate lens 52d, which collimated light beam impinges onto the reflecting telescope 51, the optical system under test via the half mirror 53. In the wavefront of the collimated light beam, wavefront error occurs due to twice transmission through the reflecting telescope, as described hereinbefore by reference to FIG. 18. The micro-lens array 54 divisionally focuses or condenses the wavefront containing the wavefront error. The image pickup means 55 picks up the image of the light beams (hereinafter referred to as the focused light spots) condensed through the micro-lens array 54. The arithmetic means 91 is designed to arithmetically determine the wavefront error on the basis of the image positions of the focused light spots picked up by the image pickup means 55.

Figure 32:
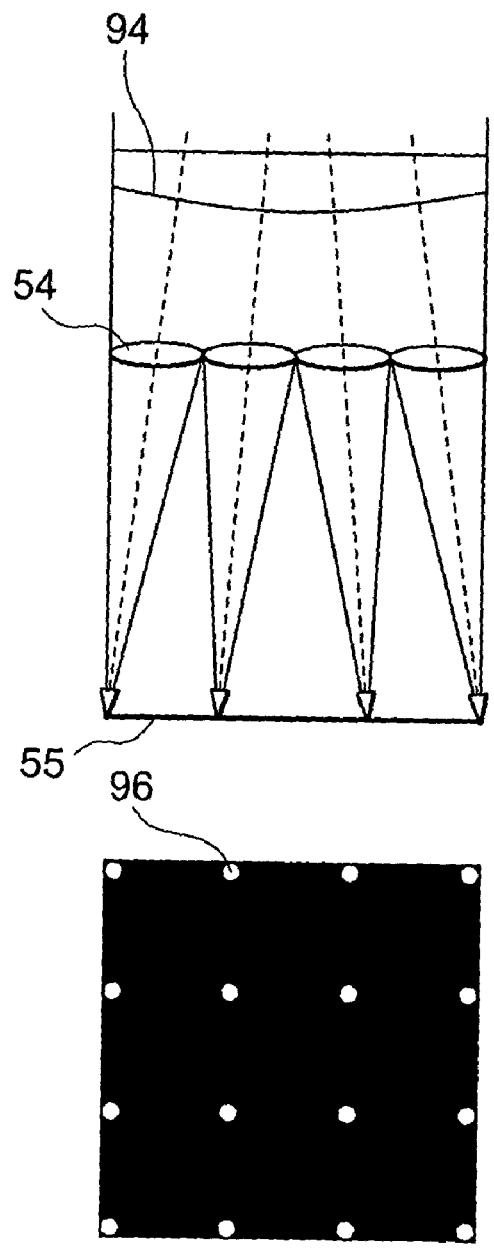
FIG. 32 is a conceptual view showing an image of focused light spots picked up by the image pickup means in the case where the assembling adjustment errors of the reflecting telescope are appreciably large.
Figure 33:
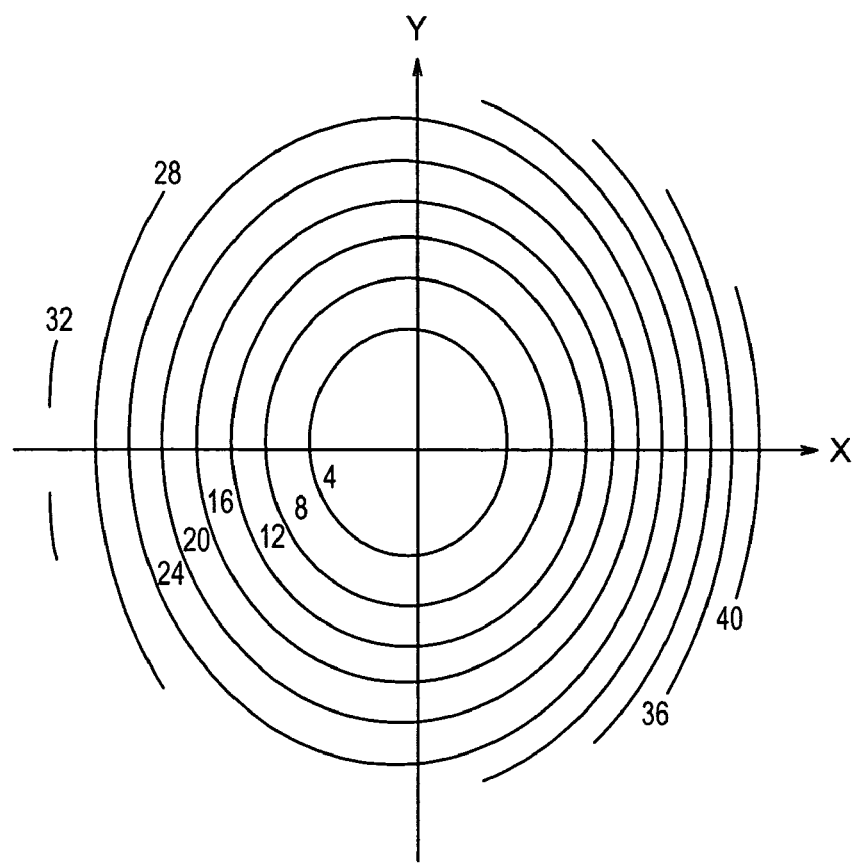
FIG. 33 is a contour diagram which represents one of conventional methods of visibly displaying measured wavefront errors.
Figure 34:
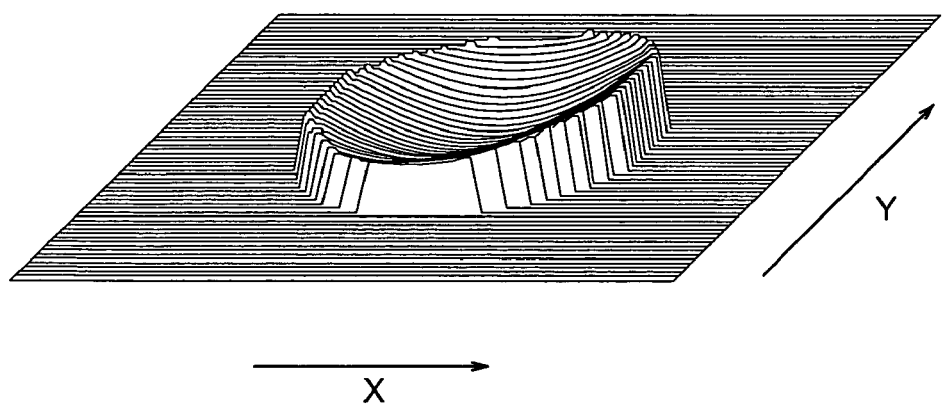
FIG. 34 is a three-dimensional wavefront diagram which represents one of conventional methods of visibly displaying the measured wavefront errors.

FIGS. 31 and 32 are conceptual views illustrating image of the focused light spots 96 picked up by the image pickup means 55. More specifically, FIG. 31 shows the image of the plane wave 93 in the case where the assembling adjustment error factors of the reflecting telescope 51 are sufficiently small and thus the wavefront incident onto the micro-lens array 54 suffers no wavefront error. On the other hand, FIG. 32 shows the image in the case where the assembling adjustment error factors of the reflecting telescope 51 is nonnegligible and thus the wavefront incident onto the micro-lens array 54 contains wavefront error. As can be seen from the figure, the positions of the focused light spots 96 change in dependence on the wavefront error.

The arithmetic means 91 estimates the wavefront error from the deviations of the image positions of the focused light spots 96 and fits the wavefront error to the Zernike polynomial.

The Schack-Hartmann method described above is not suited for the measurement of the wavefront error of high orders because the spatial resolution power is determined by the number of lenses of the micro-lens array. However, since it is sufficient to measure $A_{31}$ and $B_{31}$ representing the third-order wavefront and $A_2$ representing the second-order wavefront for evaluating the assembling adjustment error according to the teaching of the invention incarnated in the instant embodiment, application of the Schack-Hartmann method will provide no problem.

On the other hand, the Schack-Hartmann method provides an advantage that the dynamic range is large. Further, because the SLD 52e is employed, sufficient S/N ratio can be ensured with a short-time exposure. Besides, since the arithmetic processing is easy as compared with the interferometry, it is possible to perform the measurement at high rate. By virtue of this feature, the wavefront error can be measured even in the environment in which the influence of the fluctuation of the atmosphere is so remarkable that the measurement is rendered impossible with the interferometry. Furthermore, the apparatus is easy to handle for the rough adjustment.

Incidentally, in the case where degradation of accuracy of measurement of the wavefront error due to the fluctuation of the atmosphere is remarkable, then the measurement is repeated successively a number of times, whereon the averaging process may be performed for ensuring enhanced accuracy for the measurement.

Besides, by fitting the measured value to the Zernike polynomial, the wavefront error component ascribable to the fluctuation of the atmosphere is distributed to the individual terms of the Zernike polynomial. Thus, the per-term dispersion of the wavefront error is reduced. In this way, the fitting to the Zernike polynomial is effective for reducing the repetition number of measurements required for the averaging process.

INDUSTRIAL APPLICABILITY

This invention has provided the optical system deviation estimating apparatus designed for measuring wavefront propagating through space after having passed through an optical system under test for thereby estimating deviation quantities of optic disposition in the optical system under test on the basis of the measured wavefront, which apparatus includes a) the erected/inverted attitude setting means for changing the dispositional attitude of the optical system under test, b) the non-interferometric type wavefront measuring means for measuring the wavefronts at each of the attitudes as set up without making use of the interference phenomenon of light, c) the polynomial approximation means for expanding the measured wavefront values determined by the non-interferometric type wavefront measuring means to a polynomial, d) the averaging arithmetic means for averaging the measured values derived from the output of the non-interferometric type wavefront measuring means or alternatively the arithmetic values derived from the output of the polynomial approximation means, and e) the polynomial specific coefficient extraction arithmetic means for extracting specific coefficient values of the polynomial. By virtue of this structure, it is possible to measure or examine the optical system under test in the erected attitude and the inverted attitude to thereby cancel out the wavefront aberration components ascribable to gravity through the process of averaging the measured values obtained in each of the above-mentioned states. Besides, only the wavefront error ascribable to the alignment deviation can be measured through cooperation of the non-interferometric type wavefront measuring means and the polynomial specific coefficient extraction arithmetic means. As a result, the optical system destined for use in the zero-gravity environment can easily be measured or inspected on the earth.

In the optical system deviation estimating apparatus according to this invention, the erected/inverted attitude setting means can be provided with the horizontality measuring means for measuring a degree of horizontality relative to gravity. Owing to this arrangement, the optical system under test can be set up in the erected attitude and the inverted attitude with high accuracy by means of the horizontality measuring means. Thus, the wavefront error ascribable to the gravitational deformation can perfectly be canceled out.

Further, in the optical system deviation estimating apparatus according to this invention, the non-interferometric type wavefront measuring means can be directly coupled to the optical system under test. Owing to this feature, the setting-up of the apparatus (disposition and the optical axis adjustment) upon every wavefront measurement in the erected attitude and the inverted attitude can conveniently be simplified. Besides, parasitic errors which accompany change of the setup can be mitigated. Moreover, the measurement time can be shortened. The reduction of the time required for the setup is effective for reduction of work time and load involved in the measurements and adjustments carried out by changing the attitude repetitively. Additionally, the influence brought about by the change of the measurement environment (e.g. long-term change of the temperature) can be avoided.

Furthermore, in the optical system deviation estimating apparatus according to this invention, the non-interferometric type wavefront measuring means can be disposed at a position spatially distanced from the optical system under test. Thus, the measurement can be carried out with the same setting as other wavefront measuring device (e.g. interferometer or the like). Owing to this feature, calibration, for example, of the optical system deviation estimating apparatus can be facilitated.

Furthermore, in the optical system deviation estimating apparatus according to this invention, the non-interferometric type wavefront measuring means can be so designed as to split the light beam having passed through the optical system under test, to thereby determine inclinations of wavefronts of the split light beams, respectively. Thus, it is possible to average through integration the time-dependent change brought about by the fluctuation of the atmosphere.

Furthermore, in the optical system deviation estimating apparatus according to this invention, the non-interferometric type wavefront measuring means can be comprised of a) the collimated light beam generating means for generating a collimated light beam, b) the deflecting means for deflecting the collimated light beam outputted from the collimated light beam generating means toward the optical system under test, c) the imaging means for focusing the light beam having passed through the optical system under test while splitting the light beam, d) the image pickup means disposed on the focal plane of the imaging means, e) the centroid position measuring means for determining centroid positions of focused light intensity spots from the image picked up by the image pickup means, and f) the wavefront inclination arithmetic means for determining the inclination quantity of the wavefront on the basis of the centroid positions derived from the output of the centroid position measuring means. With the structure mentioned above, it is possible to average through integration the time-dependent change of the wavefront brought about by the fluctuation of the atmosphere.

Furthermore, in the optical system deviation estimating apparatus according to this invention, the non-interferometric type wavefront measuring means can be so designed as to determine the curvature of the wavefront of the light beam having passed through the optical system under test. Thus, on the basis of the measurement of the curvature of the wavefront, light condensation or focusing and divergence action of the optical system under test as well as the deforcal wavefront aberration thereof can effectively be estimated.

Furthermore, in the optical system deviation estimating apparatus according to this invention, the averaging arithmetic means can be so designed as to average through integration the image outputted from the image pickup means. Thus, the time-dependent change of the wavefront due to the fluctuation of the atmosphere and the vibration can effectively be averaged.

Furthermore, in the optical system deviation estimating apparatus according to this invention, the image pickup means having charge storing function can be employed as the image pickup means, while the averaging arithmetic means can be so designed as to average the values by making use of the charge storing function. Thus, the integrating means can integrally be combined with the image pickup means, whereby reduction of the processing time and the cost can be achieved.

Furthermore, in the optical system deviation estimating apparatus according to this invention, the averaging arithmetic means can be so designed as to average the coordinate values of positions of the focused light intensity spots as determined by the centroid position measuring means. Owing to this feature, the amount of data can be decreased with the arithmetic operation overhead as involved being reduced, whereby the processing time can effectively be shortened.

Furthermore, in the optical system deviation estimating apparatus according to this invention, the polynomial approximation means can be so designed as to expand the measured wavefront values to the polynomial of Zernike form. This arrangement is effective for the analysis of the wavefront error as well as for the estimation of the alignment error.

Furthermore, in the optical system deviation estimating apparatus according to this invention, the polynomial specific coefficient extraction arithmetic means can be so designed as to extract coma aberration coefficient term and focus coefficient term from the coefficient terms of Zernike form. The coma aberration coefficient term is effective for the estimation of the decentricity and the inclination of the optical system while the focus coefficient term is effective for the estimation primarily of the inter-lens distances in the optical system.

Furthermore, in the optical system deviation estimating apparatus according to this invention, the averaging arithmetic means can be designed for summing and averaging the wavefront values measured, respectively, in the erected attitude state and the inverted attitude state set up relative to the direction of gravity with the aid of the erected/inverted attitude setting means. Thus, the wavefront errors brought about by the gravitational deformations of the optical elements and change of the inter-lens distance in the optical system due to gravity can effectively be canceled out.

The optical system deviation adjusting apparatus according to this invention can be composed of the optical-element-disposition adjusting means for adjusting the optic dispositions of the individual optical elements of the optical system under test and can be so arranged as to adjust the optic dispositions of the optical elements of the optical system under test with the aid of the optical system deviation estimating apparatus described above. Thus, the optical system under test can be adjusted on the basis of the measured values. And, the optical system destined to be used in the zero-gravity environment can easily be adjusted on the earth. Besides, by arranging the optical-element-disposition adjusting means so that it can be driven externally, the measured value can be fed back to the optical-element-disposition adjusting means as the error signal. Thus, the adjustment of the optical system under test can be automated.

The optical system deviation estimating method according to this invention is designed for measuring wavefront propagating through space after having passed through the optical system under test for thereby estimating deviation quantities of the optic disposition in the optical system under test on the basis of the measured wavefront, and the method can include a) the erected/inverted attitude setting step of changing dispositional attitude of the optical system under test to a plurality of attitudes, b) the non-interferometric type wave front measuring step of measuring wavefronts, respectively, at the attitudes set up without resorting to the interference phenomenon of light, c) the polynomial approximation step of expanding measured wavefront values determined in the non-interferometric type wavefront measuring step to a polynomial, d) the averaging arithmetic step of averaging the measured values obtained in the non-interferometric type wavefront measuring step or alternatively the arithmetic values obtained in the polynomial approximation step, and the polynomial specific coefficient extraction arithmetic step of extracting specific coefficient values of the polynomial. By virtue of this method, it is possible to measure or examine the optical system under test in the erected attitude and the inverted attitude to thereby cancel out the wavefront aberration component ascribable to gravity through the process of averaging the measured values obtained in the erected and inverted attitudes. Besides, only the wavefront error ascribable to alignment deviation can be measured in the non-interferometric type wavefront measuring step and the polynomial specific coefficient extraction arithmetic operation step. In this way, the optical system destined for use in the zero-gravity environment can easily be measured or inspected on the earth.

In the optical system deviation estimating method according to this invention, the erected/inverted attitude setting step can include the horizontality measuring step of measuring the degree of horizontality relative to gravity. Owing to this feature, the optical system under test can be set up in the erected attitude and the inverted attitude with high accuracy by resorting to the horizontality measuring step. Thus, the wavefront error due to gravitational deformation can perfectly be canceled out.

Further, in the optical system deviation estimating method according to this invention, the non-interferometric type wavefront measuring step can be so designed as to split the light beam having passed through the optical system under test, to thereby determine inclinations of wavefronts of the split light beams, respectively. By virtue of the non-interferometric type wavefront measuring step mentioned above, it is possible to average through integration the time-dependent change of the wavefront due to the fluctuation of the atmosphere.

The optical system deviation adjusting method according to this invention can be composed of the optical element disposition adjusting step of adjusting the optic dispositions of the individual optical elements of the optical system under test and can be so designed as to adjust the optic disposition of the optical elements of the optical system under test by making use of the optical system deviation estimating method described above. Thus, the optical system under test can be adjusted on the basis of the measured values. And, the optical system destined to be used in the zero-gravity environment can easily be adjusted on the ground. Besides, by implementing the optical element disposition adjusting step such that it can be effectuated externally, the measured value can be fed back to the optical element disposition adjusting process as the error signal. Thus, the adjustment of the optical system under test can be automated.

Additionally, the optical system deviation adjusting apparatus according to this invention can further include the external driving means for driving externally the optical-element-disposition adjusting means, wherein the measured value outputted from the optical system deviation estimating apparatus can be fed back to the optical-element-disposition adjusting means as the error signal. By virtue of the arrangement described above, adjustment of the optical system under test can be automated.

Besides, in the optical system deviation estimating apparatus according to this invention, the reference light source of high luminance and low coherence can be employed in the collimated light beam generating means in combination with the image pickup means which is capable of performing image pickup operation at a high rate. Owing to this feature, the signal-to-noise ratio necessary for the processing can be obtained with a short-time exposure.

Moreover, in the optical system deviation estimating apparatus according to this invention, the collimated light beam generating means can include the light source capable of emitting the spot light beam as the reference light source, and additionally the collimating means for transforming the light beam emitted from the reference light source into the collimated light beam. With the structure of the collimated light beam generating means mentioned above, the collimated light beam can be generated with a simple method while the apparatus therefor can be manufactured at low cost.

Besides, in the optical system deviation estimating apparatus according to this invention, the collimated light beam generating means can include the light source having a luminescent center wavelength in the visible wavelength band as the reference light source. By virtue of this arrangement, it is possible to increase the intensity of the light source for thereby enhancing the degree of visibility upon rough alignment of the under-test object. Thus, the reference light source can be used as the light source for the rough alignment of the under-test object. Besides, the result of the measurement can be compared straightforwardly with a result of evaluation performed by using an interferometer in which the light source having the emission center wavelength in the visible wavelength band is employed. Moreover, when compared with the light source such as a conventional electric bulb, influence of the achromatic aberration can be reduced. Additionally, any achromatic means need not be incorporated in the beam diameter converting optical system.

Additionally, in the optical system deviation estimating apparatus according to this invention, the collimated light beam generating means can further include the waveguide means for guiding light emitted from the reference light source. With this arrangement, the reference light source and the main housing can be installed separately from each other, and thus the main housing can be implemented in small size and light weight. Besides, the influence of the light source to the main housing can be mitigated, whereby there can be realized the deviation estimating apparatus which ensures higher accuracy and enhanced reliability.

Furthermore, in the optical system deviation estimating apparatus according to this invention, the waveguide means can include the single mode fiber or alternatively the polarization-preserving fiber, and the optical fiber connector having the fiber terminating face polished in the planar surface or alternatively in the spherical surface. With the structure described above, the beam profile of the light source can be made to be of Gaussian type, whereby the influence of the wavefront aberration ascribable to the light emission distribution at the light source can be eliminated. Besides, the waveguide means can be detachably connected to the main housing owing to the optical fiber connector. Further, the fiber length can easily be extended.

Furthermore, in the optical system deviation estimating apparatus according to this invention, the collimating means can include the collimate lens, while the collimated light beam generating means can be composed of the collimate lens holding fixture for holding the collimate lens, the optical fiber connector holding fixture for holding the optical fiber connector, and the moving means for moving the collimate lens holding fixture and the optical fiber connector holding fixture relative to each other along the optical axis of the collimate lens while maintaining coincidence in center between the collimate lens and the optical fiber connector. With this structure, adjustment of the collimator lens and the optical fiber in the diametrical direction is rendered unnecessary. Besides, occurrence of optical axis deviation upon exchange of the optical fiber can be excluded.

Furthermore, in the optical system deviation estimating apparatus according to this invention, the moving means can be composed of the first fitting surface provided on the outer peripheral surface of either one of the collimate lens holding fixture or the optical fiber connector holding fixture and the second fitting surface provided on the other of the collimate lens holding fixture and the optical fiber connector holding fixture so as to engage with the first fitting surface, and the moving mechanism for moving the collimate lens holding fixture and the optical fiber connector holding fixture relative to each other. With the structure in which the mutually fitting or engaging surfaces are used as the relative moving means as described above, the number of discrete parts can be decreased and the cost can be reduced. Additionally, deviation error of the center axis can be decreased. Thus, there can be realized the apparatus which ensures high accuracy.

Furthermore, in the optical system deviation estimating apparatus according to this invention, the collimate lens holding fixture and the optical fiber connector holding fixture can be fabricated of different materials, respectively. Owing to this feature, sliding movement between the mutually fitting surfaces can be smoothed, whereby both the holding fixtures can be moved smoothly.

Furthermore, the optical system deviation estimating apparatus according to this invention can additionally include the relative position securing means for securing fixedly the relative position between the collimate lens holding fixture and the optical fiber connector holding fixture, wherein the moving mechanism can be detachably mounted on the collimate lens holding fixture and the optical fiber connector holding fixture. With this structure, the moving mechanism can be detached from the main housing, which in turn means that the main housing can be realized in small size and light weight.

Furthermore, in the optical system deviation estimating apparatus according to this invention, such arrangement can be adopted that the intensity of the reference light source is adjustable externally. By virtue of this feature, the degree of visibility can be enhanced by increasing the intensity of the reference light source upon rough alignment of the under-test object, whereby work efficiency involved in the rough alignment correspondingly can be enhanced.

Furthermore, the optical system deviation estimating apparatus according to this invention can further include the light source intensity control means for adjusting the intensity of the reference light source so that all pixel signal values acquired through the image pickup means become maximum without exceeding the predetermined threshold value. With this structure, the intensity of the reference light source can automatically be regulated correctively.

Moreover, the optical system deviation estimating apparatus according to this invention can further include the temperature sensor for measuring the temperature of the reference light source, the Peltier cooler for maintaining the temperature of the reference light source to be constant in response to the output of the temperature sensor, and driving means for driving the Peltier cooler, wherein the casing of the reference light source can be so arranged as to serve also as the heat dissipating means of the Peltier cooler. With this arrangement, the temperature of the light source can be maintained to be constant, ensuring stabilization of the emitted light wavelength.

Further, in the optical system deviation estimating apparatus according to this invention, the image pickup means can include the device of square pixels for enabling image pickup operation to be performed at a high rate. In that case, the arithmetic processing for calibrating the aspect ratio of the image is rendered unnecessary, and thus the processing procedure can be executed at a high rate on the whole.

Furthermore, the optical system deviation estimating apparatus according to this invention can further include the wavefront error calculating means for arithmetically determining the relation between the assembling adjustment error and the wavefront error, and the wavefront error plotting means for representing the wavefront error outputted from the wavefront error calculating means in the orthogonal coordinates system, wherein the assembling adjustment error of at least one element is taken along the coordinate axis. With the arrangement mentioned above, the relation between the assembling adjustment error and the wavefront error can be visibly displayed to the operator intelligibly. Besides, the operator can easily grasp the accuracy of the assembling adjustment error.

Furthermore, in the optical system deviation estimating apparatus according to this invention, the wavefront error calculating means can be so designed as to use coefficients of a given polynomial to which the wavefront error is expanded. By virtue of this feature, even for a plurality of factors subjected to the assembling adjustment (e.g. inclination and inter-lens distance of the primary mirror and secondary mirror), the assembling adjustment error can be estimated.

Furthermore, in the optical system deviation estimating apparatus according to this invention, the wavefront error calculating means can be so designed as to use Zernike polynomial as the polynomial for expanding the wavefront error. By virtue of this feature, even for a plurality of factors subjected to the assembling adjustment (e.g. inclination and inter-lens distance of the primary mirror and secondary mirror), the assembling adjustment error can be estimated by using conventional Zernike polynomial derived from the output of the wavefront measuring device.

Furthermore, the optical system deviation estimating apparatus according to this invention can further include the wavefront error calculating means for arithmetically determining the relation between the assembling adjustment error and the wavefront error, the wavefront error plotting means for representing two factors of the wavefront error outputted from the wavefront error calculating means in the two-dimensional coordinates system having coordinate axes along which the assembling adjustment errors are taken, respectively, wherein the wavefront error plotting means represents simultaneously two coefficients of the polynomial which are used by the wavefront error calculating means as the wavefront error factors, and wherein the deviation estimating apparatus can further include the assembling adjustment error estimating means for estimating assembling adjustment errors on the basis of the intersection between straight lines or alternatively curves representing the wavefront error factors and plotted by the wavefront error plotting means. By virtue of the arrangement described above, inclination and decentricity of two optics or optical elements (e.g. primary mirror and secondary mirror) can be estimated.

Further, in the optical system deviation estimating apparatus according to this invention, the wavefront error plotting means can be so designed as to plot the wavefront error in the form of a contour in the two-dimensional orthogonal coordinates system. Owing to this feature, the target or desired range of the assembling adjustment can be defined with high accuracy.

Further, in the optical system deviation estimating apparatus according to this invention, the wavefront error plotting means can be so designed as to plot the two factors of the wavefront error in a three-dimensional orthogonal coordinates system having coordinate axes along which the assembling adjustment error and the wavefront error are taken, respectively. With this arrangement, the target range of the assembling adjustment can be defined accurately. Besides, the viewing point can be changed variously. Thus, the intuitive intelligibility can be enhanced as compared with the contour plotting.

Furthermore, in the optical system deviation estimating apparatus according to this invention, the wavefront error plotting means can be so designed as to set as a threshold value a permissible value of the wavefront error to thereby represent a region underlying said threshold value in a predetermined color or pattern while representing a region overlying said threshold value in another color or pattern. Owing to this feature, the target range of the assembling adjustment can be defined accurately with the number of lines being reduced, presenting higher visibility when compared with the display with the contour.

The optical system deviation adjusting apparatus according to this invention can include an optical-element-disposition adjusting means for adjusting optic dispositions of individual optical elements of the optical system under test, and the apparatus can be arranged for adjusting optic dispositions of the optical elements of the optical system under test with the aid of the optical system deviation estimating apparatus described above. With the apparatus of the arrangement described above, the under-test optical system can be adjusted on the basis of the measured values (s). Further, the optical system destined for use in the no-gravity environment can easily be adjusted on the earth. Besides, by adopting the arrangement which makes it possible to drive the optical-element-disposition adjusting means externally, the measured value can be fed back to the optical-element-disposition adjusting means as the error signal. Thus, the adjustment of the optical system under test can be automated.

The invention claimed is:

1. An optical system deviation estimating apparatus for measuring wavefront propagating through space after having passed through an optical system under test for thereby estimating deviation quantities of optic disposition in said optical system under test on the basis of the measured wavefront, characterized in that said apparatus comprises
    a) an erected/inverted attitude setting device for changing dispositional attitude of said optical system under test in order to reduce an aberration in the measured wavefront,
    b) a non-interferometric type wavefront measuring device for measuring wavefronts, respectively, at the attitudes of said optical system as set up without making use of interference phenomenon of light,
    c) a polynomial approximation device for expanding measured wavefront values determined by said non-interferometric type wavefront measuring device to a polynomial,
    d) an averaging arithmetic device for averaging the measured values derived from output of said non-interferometric type wavefront measuring device or alternatively arithmetic values derived from output of said polynomial approximation device, and
    e) a polynomial specific coefficient extraction arithmetic device for extracting specific coefficient values of said polynomial, characterized in that
    said averaging arithmetic device is designed for summing and averaging the wavefront values measured, respectively, in the erected attitude state and the inverted attitude state set up relative to the direction of gravity with the aid of said erected/inverted attitude setting means.

2. An optical system deviation estimating apparatus set forth in claim 1, characterized in that
    said non-interferometric type wavefront measuring device includes
    a) a collimated light beam generating device for generating a collimated light beam,
    b) a deflecting device for deflecting said collimated light beam outputted from said collimated light beam generating device toward said optical system under test,
    c) an imaging device for focusing the light beam having passed through said optical system under test while splitting said light beam,
    d) an image pickup device disposed on a focal plane of said imaging device,
    e) a centroid position measuring device for determining centroid positions of focused light intensity spots from the image picked up by said image pickup device, and
    f) a wavefront inclination arithmetic device for determining an inclination quality of the wavefront on the basis of the centroid positions derived from the output of said centroid position measuring device.

3. An optical system deviation estimating apparatus set forth in claim 2, characterized in that
    said averaging arithmetic device is designed to average through integration the image outputted from said image pickup device.

4. An optical system deviation estimating apparatus set forth in claim 2, characterized in that
    said image pickup device includes a charge storing function, and that said averaging arithmetic device averages said values by making use of said charge storing function.

5. An optical system deviation estimating apparatus set forth in claim 2, characterized in that
    said averaging arithmetic means is designed to average the coordinate values of positions of said focused light intensity spots as determined by said centroid position measuring device.

6. An optical system deviation estimating apparatus set forth in claim 2, characterized in that
    a reference light source of high luminance and low coherence is employed in said collimated light beam generating device, and that said image pickup device is capable of performing image pickup operation at a high rate.

7. An optical system deviation estimating apparatus set forth in claim 6, characterized in that
    said collimated light beam generating device includes
    a light source capable of emitting a spot light beam as said reference light source, and additionally
    a collimating device for transforming the light beam emitted from said reference light source into a collimated light beam.

8. An optical system deviation estimating apparatus set forth in claim 6, characterized in that
    said collimated light beam generating device further includes
    a light source having a luminescent center wavelength in a visible wavelength band as said reference light source.

9. An optical system deviation estimating apparatus set forth in claim 6, characterized in that
    said collimated light beam generating device further includes
    a waveguide device for guiding light emitted from said reference light source.

10. An optical system deviation estimating apparatus set forth in claim 6, characterized in that
    said waveguide device includes
    a single mode fiber or alternatively a polarization-preserving fiber, and
    an optical fiber connector having a fiber terminating face polished in a planar surface or alternatively in a spherical surface.

11. An optical system deviation estimating apparatus set forth in claim 6, characterized in that
    intensity of said reference light source can be adjusted externally.

12. An optical system deviation estimating apparatus set forth in claim 1, characterized in that said polynomial approximation device is designed to expand the measured wavefront values to a polynomial of Zernike form.

13. An optical system deviation adjusting apparatus, characterized in that said deviation adjusting apparatus comprises an optical-element-disposition adjusting device for adjusting optic dispositions of individual optical elements of said optical system under test and is arranged for adjusting the optic dispositions of the optical elements of said optical system under test with the aid of said optical system deviation estimating apparatus set forth in claim 1.

14. An optical system deviation estimating apparatus set forth in claim 1, characterized in that said deviation estimating apparatus further comprises a wavefront error calculating device for arithmetically determining a relation between an assembling adjustment error and a wavefront error, and a wavefront error plotting device for representing said wavefront error outputted from said wavefront error calculating means in an orthogonal coordinates system having coordinate axes, wherein said assembling adjustment error of at least one element is taken along a coordinate axis.

15. An optical system deviation estimating apparatus set forth in claim 1, characterized in that said deviation estimating apparatus further comprises a wavefront error calculating device for arithmetically determining a relation between an assembling adjustment error and a wavefront error, a wavefront error plotting device for representing two factors of said wavefront error outputted from said wavefront error calculating device in a two-dimensional coordinates system having coordinate axes along which said assembling adjustment errors are taken, respectively, that said wavefront error plotting device represents simultaneously two coefficients of a polynomial which are used by said wavefront error calculating device as said wavefront error factors, and that said deviation estimating apparatus further comprises an assembling adjustment error estimating device for estimating assembling adjustment errors on the basis of an intersection between straight lines or alternatively curves representing said wavefront error factors and plotted by said wavefront error plotting device.

16. An optical system deviation estimating apparatus as set forth in claim 1, wherein said erected/inverted attitude setting device is configured to set the optical system under test in an erected attitude state and an inverted attitude state, and the aberration in the measured wavefront is substantially eliminated in accordance with the arithmetic averaging device averaging measured wavefront values in the erected attitude and inverted attitude states, respectively.

17. An optical system deviation estimating apparatus as set forth in claim 16, wherein the substantially eliminated aberration is ascribable to gravitational deformation.

18. A method for estimating a deviation of optical disposition in an optical system, comprising:

measuring wavefronts passing through the optical system without resorting to the interference phenomenon of light;

expanding values of the measured wavefronts to polynomials; and averaging values of the measured wavefronts or the polynomials, wherein the averaging is performed in such a manner to substantially eliminate aberrations in the measured wavefronts ascribed to at least one of atmospheric fluctuations and gravitational deformations in the optical system, and wherein the averaging includes at least one of:

integrating the measured wavefront values for a sufficient integrating time to substantially eliminate aberrations ascribed to atmospheric fluctuations; and summing and averaging the measured wavefront values obtained, respectively, when the optical system is at an erect and invert attitude setting to substantially eliminate aberrations ascribed to gravitational deformation.

\* \* \* \* \*